US012789867B2

(12) United States Patent
Graetz et al.

(10) Patent No.: US 12,789,867 B2
(45) Date of Patent: Nov. 10, 2026

(54) UNMANNED AERIAL VEHICLE SYSTEM FOR INSPECTING RAILROAD ASSETS

(71) Applicant: BNSF Railway Company, Fort Worth, TX (US)

(72) Inventors: Todd Graetz, Keller, TX (US); Gary Grissum, Fort Worth, TX (US); Michael Mischke, Fort Worth, TX (US)

(73) Assignee: BNSF Railway Company

( * ) Notice: Subject to any disclaimer, the term of this patent is extended or adjusted under 35 U.S.C. 154(b) by 9 days.

(21) Appl. No.: 18/642,332

(22) Filed: Apr. 22, 2024

(65) Prior Publication Data

US 2026/0008487 A1 Jan. 8, 2026

Related U.S. Application Data

(63) Continuation of application No. 16/103,643, filed on Aug. 14, 2018, now abandoned.

(Continued)

(51) Int. Cl.

*B61L 23/04* (2006.01)
*B64C 39/02* (2023.01)

(Continued)

(52) U.S. Cl.

CPC ............. *B61L 23/04* (2013.01); *B61L 23/041* (2013.01); *B61L 23/044* (2013.01);

(Continued)

(58) Field of Classification Search

CPC ...... B61L 23/04; B61L 23/041; B61L 23/044; B61L 23/047; B61L 23/048;

(Continued)

(56) References Cited

U.S. PATENT DOCUMENTS 4,389,033 A 6/1983 Hardman
4,979,392 A 12/1990 Guinon (Continued)

FOREIGN PATENT DOCUMENTS

CN 105551108 A 5/2016
CN 106954042 A 7/2017

(Continued)

OTHER PUBLICATIONS

Flammini et al., Railway Infrastructure Monitoring by Drones, Nov. 2-4, 2016, IEEE, https://ieeexplore.ieee.org/abstract/document/7841398 (Year: 2016).

(Continued)

*Primary Examiner* — David P. Merlino
(74) *Attorney, Agent, or Firm* — Enrique Sanchez, Jr.; Miguel Hernandez

(57) ABSTRACT

An aerial system control network, an unmanned aerial vehicle (UAV) system, and a method provide for inspecting railroad assets using a UAV. The aerial system control network includes a plurality of towers and a ground control system connected to the plurality of towers. The ground control system transmits, via a plurality of communication towers, a flight plan including a rail system and a flight path; receives, via the plurality of communication towers, data while the UAV is in monitoring the rail system; detects an interference along the flight path based on the received data, and adjusts the flight plan based on the interference.

18 Claims, 27 Drawing Sheets

Related U.S. Application Data

(60) Provisional application No. 62/548,636, filed on Aug. 22, 2017, provisional application No. 62/545,946, filed on Aug. 15, 2017.

(51) Int. Cl.

| | |
|---|---|
| ***B64U 10/14*** | (2023.01) |
| ***G06T 7/00*** | (2017.01) |
| ***G08G 5/26*** | (2025.01) |
| ***G08G 5/32*** | (2025.01) |
| ***G08G 5/34*** | (2025.01) |
| ***G08G 5/55*** | (2025.01) |
| ***G08G 5/57*** | (2025.01) |
| *B64U 20/83* | (2023.01) |
| *B64U 20/87* | (2023.01) |
| *B64U 70/97* | (2023.01) |
| *B64U 101/26* | (2023.01) |
| *B64U 101/30* | (2023.01) |

(52) U.S. Cl.

CPC ........... *B61L 23/047* (2013.01); *B61L 23/048* (2013.01); *B64C 39/024* (2013.01); *B64U 10/14* (2023.01); *G06T 7/001* (2013.01); *G08G 5/26* (2025.01); *G08G 5/32* (2025.01); *G08G 5/34* (2025.01); *G08G 5/55* (2025.01); *G08G 5/57* (2025.01); *B64U 20/83* (2023.01); *B64U 20/87* (2023.01); *B64U 70/97* (2023.01); *B64U 2101/26* (2023.01); *B64U 2101/30* (2023.01); *B64U 2201/104* (2023.01); *G06T 2207/10016* (2013.01); *G06T 2207/10032* (2013.01); *G06T 2207/30108* (2013.01); *G06T 2207/30184* (2013.01)

(58) Field of Classification Search

CPC ...... B64C 39/024; B64U 10/14; B64U 20/83; B64U 20/87; B64U 70/97; B64U 2101/26; B64U 2101/30; B64U 2101/31; B64U 2201/104; G06T 7/001; G06T 2207/10016; G06T 2207/10032; G06T 2207/30108; G06T 2207/30184; G08G 5/26; G08G 5/32; G08G 5/34; G08G 5/55; G08G 5/57; G05D 1/0094; G05D 1/0808; G05D 1/101

See application file for complete search history.

(56) References Cited

U.S. PATENT DOCUMENTS

| | | | | |
|---|---|---|---|---|
| 9,014,415 | B2 | 4/2015 | Chen et al. | |
| 9,390,489 | B1 | 7/2016 | Harvey et al. | |
| 9,678,507 | B1 | 6/2017 | Douglas et al. | |
| 9,718,564 | B1 | 8/2017 | Beckman et al. | |
| 10,308,265 | B2 | 6/2019 | Fahmy | |
| 11,636,671 | B1 | 4/2023 | Fathi et al. | |
| 2001/0002688 | A1* | 6/2001 | Uebel | B61L 23/041<br>246/122 R |
| 2005/0015508 | A1 | 1/2005 | Hankejh et al. | |
| 2006/0098843 | A1 | 5/2006 | Chew | |
| 2008/0144884 | A1 | 6/2008 | Habibi | |
| 2008/0169993 | A1* | 7/2008 | Matsuzawa | H01Q 21/205<br>343/814 |
| 2008/0215204 | A1 | 9/2008 | Roy et al. | |
| 2009/0219393 | A1 | 9/2009 | Vian et al. | |
| 2010/0100269 | A1 | 4/2010 | Ekhaguere et al. | |
| 2010/0215212 | A1 | 8/2010 | Flakes, Jr. | |
| 2011/0046817 | A1 | 2/2011 | Hamke et al. | |
| 2011/0282540 | A1 | 11/2011 | Armitage et al. | |
| 2012/0217351 | A1 | 8/2012 | Chadwick et al. | |
| 2014/0316616 | A1 | 10/2014 | Kugelmass | |
| 2015/0009331 | A1 | 1/2015 | Venkatraman | |
| 2015/0158513 | A1 | 6/2015 | Costa et al. | |
| 2015/0235094 | A1 | 8/2015 | Kraeling et al. | |
| 2016/0140851 | A1 | 5/2016 | Levy et al. | |
| 2017/0012697 | A1 | 1/2017 | Gong et al. | |
| 2017/0117676 | A1 | 4/2017 | James et al. | |
| 2017/0134963 | A1 | 5/2017 | Priest | |
| 2017/0193781 | A1 | 7/2017 | Bryson et al. | |
| 2017/0227470 | A1 | 8/2017 | Cesarano | |
| 2017/0229025 | A1 | 8/2017 | Klinger et al. | |
| 2017/0263132 | A1 | 9/2017 | Butler et al. | |
| 2017/0278406 | A1 | 9/2017 | Akselrod et al. | |
| 2017/0313332 | A1 | 11/2017 | Paget et al. | |
| 2017/0357273 | A1 | 12/2017 | Michini et al. | |
| 2018/0033320 | A1 | 2/2018 | Castelli et al. | |
| 2018/0052127 | A1 | 2/2018 | Tutzauer et al. | |
| 2018/0096609 | A1 | 4/2018 | De La Cruz et al. | |
| 2018/0350244 | A1 | 12/2018 | Clark | |
| 2018/0357909 | A1 | 12/2018 | Eyhorn | |
| 2019/0213724 | A1 | 7/2019 | Avrahami et al. | |
| 2019/0295423 | A1* | 9/2019 | Dow | G08G 5/55 |
| 2020/0105082 | A1 | 4/2020 | Joao | |
| 2020/0105149 | A1 | 4/2020 | Mahkonen et al. | |
| 2020/0143173 | A1 | 5/2020 | Kurz et al. | |
| 2020/0364954 | A1* | 11/2020 | Sugaya | G07C 5/0808 |

FOREIGN PATENT DOCUMENTS

| | | | |
|---|---|---|---|
| JP | 20190095246 | A | 4/2010 |
| JP | 201652849 | A | 4/2016 |
| WO | 2017106248 | A1 | 6/2017 |

OTHER PUBLICATIONS

International Search Report and Written Opinion, PCT Application No. PCT/US18/00235, issued Jan. 7, 2019, 12 pages.

Enoch, "BNSF aims high", Trains, Apr. 2017, pp. 20-21.

Vantuono, "Railroader of the Year: CARL ICE", Railway Age, Jan. 14, 2016, 10 pages.

Wilner, "BNSF drones will patrol the track", Railway Age, Mar. 21, 2015, 2 pages.

* cited by examiner

500

600

605

700

1000

1100

1900

2000

UNMANNED AERIAL VEHICLE SYSTEM FOR INSPECTING RAILROAD ASSETS

CROSS-REFERENCE TO RELATED APPLICATION(S) AND CLAIM OF PRIORITY

The present application is a Continuation of U.S. patent application Ser. No. 16/103,643, filed Aug. 14, 2018, which claims priority under 35 U.S.C. § 119(e) to U.S. Provisional Patent Application No. 62/545,946, filed on Aug. 15, 2017, entitled "AN UNMANNED AERIAL VEHICLE SYSTEM FOR INSPECTING RAILROAD ASSETS," and U.S. Provisional Patent Application No. 62/548,636, filed on Aug. 22, 2017, entitled "AN UNMANNED AERIAL VEHICLE SYSTEM FOR INSPECTING RAILROAD ASSETS," the entireties of each are herein incorporated by reference for all purposes.

TECHNICAL FIELD

The present disclosure relates in general to railroad asset management and in particular to an unmanned aerial vehicle system for inspecting railroad assets.

BACKGROUND

The safety and efficiency of railroad operations is heavily dependent upon constant analysis of trains, right-of-way, rail track and other assets/facilities. There are a wide variety of factors that can affect track conditions and impact train movement, including criminal activity, and extreme weather events that can lead to track flooding and rail bed erosion or overheating (track can buckle or distort in high heat). Earthquakes, landslides, and abandoned vehicles and other objects at grade crossings can block track.

Vigilance is always the best defense against these hazards. As a result, pursuant to Federal Railway Administration (FRA) regulations and company policies, track/right of way and bridge maintenance employees routinely inspect the tracks and the underlying infrastructure, such as bridges, tunnels, support structures, and signals. At present, this work is done primarily by company personnel in motor vehicles, on foot, in specialized rail equipment, or in rail-mounted hi-rail vehicles. This is often a labor-intensive and sometimes arduous job. While a railroad may do all it can to make human inspections as safe and accurate as possible, there is an irreducible element of risk involved whenever employees are required to go out on track and rail structures. Employees may need to climb over or onto track structures, which can be slippery, rough, and/or exposed to the elements. Some structures, such as bridges, are high above the ground. Trains moving through inspection zones can increase risk as well, especially in high-traffic areas.

SUMMARY

Embodiments of the present disclosure provide an aerial system control network, an unmanned aerial vehicle (UAV) system, and a method for inspecting railroad assets using an unmanned aerial vehicle.

In one example embodiment, an aerial system control network provides for inspecting railroad assets using an unmanned aerial vehicle. The aerial system control network includes a plurality of towers and a ground control system connected to the plurality of towers. The ground control system transmits, via a plurality of communication towers, a flight plan including a rail system and a flight path; receives, via the plurality of communication towers, data while the UAV is in monitoring the rail system; detects an interference along the flight path based on the received data, and adjusts the flight plan based on the interference.

In another example embodiment, an unmanned aerial vehicle (UAV) system provides for inspecting railroad assets using an unmanned aerial vehicle. The unmanned aerial vehicle (UAV) system includes a UAV and an aerial system control network. The aerial system control network includes a plurality of towers and a ground control system connected to the plurality of towers. The ground control system transmits, via a plurality of communication towers, a flight plan including a rail system and a flight path; receives, via the plurality of communication towers, data while the UAV is in monitoring the rail system; detects an interference along the flight path based on the received data, and adjusts the flight plan based on the interference.

In another example embodiment, a method provides for inspecting railroad assets using an unmanned aerial vehicle. The method includes transmitting, via a plurality of communication towers, a flight plan including a rail system and a flight path; receiving, via the plurality of communication towers, data while the UAV is in monitoring the rail system; detecting an interference along the flight path based on the received data, and adjusting the flight plan based on the interference.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
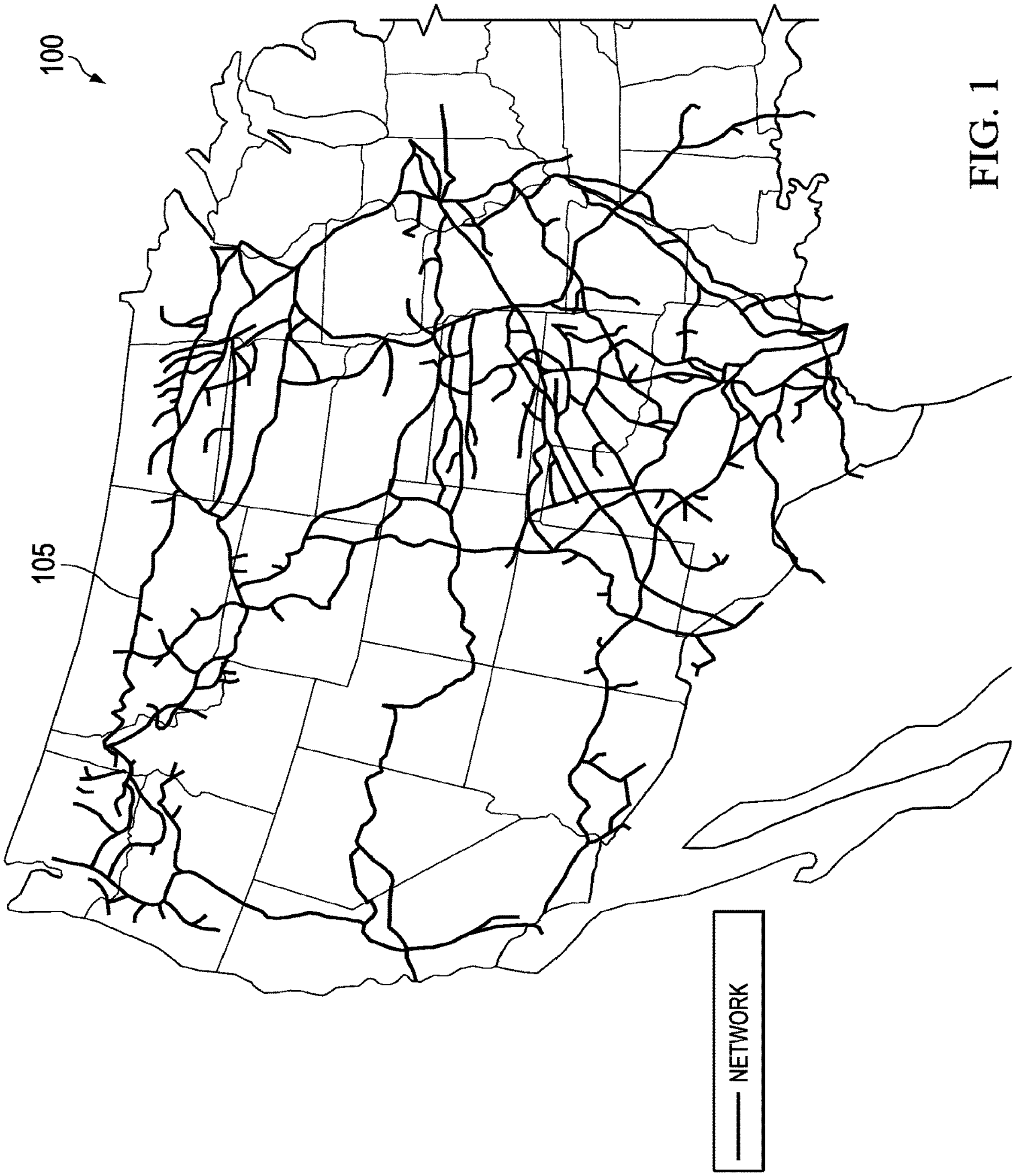
FIG. 1 illustrates an exemplary railway network according to the various embodiments of the present disclosure.

FIGS. 1 through 26, discussed below, and the various embodiments used to describe the principles of the present disclosure in this patent document are by way of illustration only and should not be construed in any way to limit the scope of the present disclosure. Those skilled in the art can understand that the principles of the present disclosure may be implemented in any type of suitably-arranged device or system.

Preferred embodiments of the principles of the present invention are based on an unmanned aerial vehicle (aircraft) capable of vertical takeoff and landing. Among other things, the aircraft includes an autopilot system that interfaces with the system command and control infrastructure. The aircraft also processes navigation information generated from geographic information systems, and supports various onboard sensors providing location information. The aircraft and overall right of way systems also feature equipment that are capable of transmitting to, and receiving information from, an onboard navigation beacon (ADSB) and/or a mode C transponder or its equivalent.

Embodiments of the aircraft have sufficient onboard electrical power generation capability to provide reliable power to all of the other various aircraft systems, such as the sensor, communications, and control subsystems. In addition, the aircraft preferably has sufficient liquid fuel capacity to support flight durations in excess of 8 hours. The aircraft also has the payload capability needed to support multiple sensors for gathering information and the communications and control subsystems need to pass that information in real time to a flight operations center. The aircraft preferably also includes onboard information storage media for local storage of gathered information. In addition, the system includes both onboard and external subsystems for facilitating emergency maneuvering and landing of the aircraft on the flight corridor.

In general, the onboard sensors take high resolution precise location photos no less than two times a second and ¼ foot or greater resolution from the operating altitude. Preferably, the sensor system also has built-in local computational capability, its own navigation system, and independent communication capability for communicating with other onboard subsystems including the autopilot. The sensors may include a photo sensor, a video camera, a thermal imager, and/or a multispectral sensor. In particular, the sensor system includes a real time day and night video camera for pilot situational awareness, which includes at least some limited real time protection capability.

The system also includes software focused on rail detection and analysis of right of way conditions, which advantageously support the inspection of linear assets, such as track, bridges, and the like. Among other things, the system software, both onboard and remote, includes machine vision software trained to understand and recognize critical conditions within an area with at least two linear borders. The system software is also capable of validating normal functional conditions on the linear area.

More specifically, the onboard software runs on the aircraft in a line between the sensors and the ground based communications systems. The onboard software processes data collected by sensors, which is then loaded onto ground based computational systems that in turn output quantitative and qualitative data about what the sensors have seen. The software system processes bulk data, creates another set of geo-located data, and then creates a third set of data. The system software creates several reports that are associated with the data of interest, creates a geo-location file that can allow the users to easily map the location of selected conditions of interest. Preferably, the bulk data remains unprocessed and the receivers receive only useable data that they truly need with bulk data stored for future data mining and use.

The system software also includes field information software, which could be used separately of this system or even with multiple aircraft. The field information software embodies an algorithm that maps functionality and determines what order the software should perform operations, which advantageously eliminates human error. In particular, the field information software receives media generated by the sensor system, transfers those data into a laptop or other processing system, and then starts the local software. The local software automatically codes, labels and transfers the data to a drive and files and appropriately transmits those data to whoever requires them (e.g., different departments in an organization). The field information software may be used for any gathered data related to a field location. The field information software is preferably based on a networked system, including a server or set of hardware devices. In some embodiments, the field information software runs after conclusion of a flight by the aircraft (i.e., performs post-flight data processing). Data may be distributed among the networked resources, which perform further analysis and ensure that the data are properly coded and stored. This helps maintain a chain of custody and minimizes data errors.

Right of way, corridors, and towers are important factors in an aerial railroad inspection system. The present system accesses the 900 MHz channels used for the automatic train control system (ATCS) implemented through the AAR, although the actual spectrum in use is not a strict requirement for practicing the present principles—other secured and licensed spectrum can be purposed. The hardware and software of the present system are optimized to use the low bandwidth AAR channel in a highly functional manner. For systems using the preferred AAR channels, the user normally requires a license, and redundant Ethernet controls including appropriate channels to communicate with the aircraft. These can be implemented with railroad telecommunications assets.

The aircraft is preferably a vertical takeoff and landing aircraft and operates (including landings) anywhere along a railroad asset network. Once the aircraft is in the air, the pilot commands the autopilot to start the flight. The flight commences and the aircraft flies according to a route programmed by geographical information systems to an actual railroad right of way and follows that right of way. In other words, when the pilot actuates the autopilot, the system software takes over and flies the aircraft as close as possible once over track. The software system also automatically enables the sensors to start taking two pictures per second of the track. At the same time, the sensor and software systems control the pitch, yaw, and roll of aircraft and sensors such that the appropriate sensor or sensors remain focused and placed over the track to ensure the required resolution and overlapping imagery. If analytics software determines after the flight that there was not enough overlap, or if sections of track were missed due to right of way occupancy, then the route is quickly re-flown and the sensor takes more images.

While the autopilot is on and the sensor are taking photos, the aircraft control system is leveraging space-based GPS, and where available, ground based GPS error correction, to keep the aircraft positioned over the row and maintain operating altitude and linear flight path compliance, which both guarantees sensor resolution and compliance with regulatory requirements regarding heights and width of flight path.

Again, preferably the aircraft and sensor have independent navigation systems. Advantageously, when both the aircraft and sensor(s) have independent navigational systems, computational power is preserved for critical items tasked to each component. For example, the sensor system may include sensor stabilization software and hardware and the sensor is also capable of disabling image gathering when not over private property.

Preferably, the aircraft broadcasts its location, speed, altitude and heading via the existing FAA surveillance network (SBS) and also to other aircraft equipped to receive these signals. In addition, the railroad's infrastructure may support supplementing the FAA SBS system using supplemental ADSB/transponder receivers, radar and other elements placed along the right of way. While the aircraft is in flight, its operating condition, location and overall health are transmitted to the pilot via the command and control link. During all phases of the flight, the aircraft has access to multiple command and control transceiver locations assuring a level of redundancy of command and control.

If the aircraft loses connection to the command and control system, after a period of time as determined by the operator and/or FAA rules, the aircraft can initiate its "lost link profile" and either return to launch via pre-determined pathways or in a loss of communication and power, auto descend and set itself down along the railroad right of way. The pilot can be aware of lost link condition and based on the last transmission form the aircraft would notify users on the row and dispatchers of the aircraft eminent landing. The sensors secondary communications and navigation systems may also assist with locating the aircraft.

If during flight there are other critical systems failures, the aircraft either automatically initiates one of several predetermined flight termination procedures returns to its launching location or other location of safety as programmed. During the course of flight, the pilot has the option of utilizing a second sensor for real time imagery of the row. This secondary sensor can also be used for some condition analysis, but is primarily for pilot awareness. If during the course of flight a critical condition is identified, the aircraft's sensor can utilize a secondary communications channel not connected to the primary to send immediate notification to the pilots.

At the end of a specified mission, the pilot engages the landing procedures, the aircraft leverages all of the aforementioned systems to arrive at the landing site, and engages the landing procedures for vertical landing. The landing procedure includes the enablement of an air to ground laser providing the aircraft with precision landing information. In final stages of fight before landing, the pilot uses the aircraft command and control system to assure a safe landing. The aircraft has multiple support systems on board to assure a safe landing. If anything is present on the ground or area of landing that would preclude a safe landing, the landing abort procedure is initiated and alternate landing site is used. After a safe landing, the pilot removes the sensor data storage drives and plugs them into a server. The server systems then commence an automated process of analytics and data delivery that results in delivery of customized reports and actionable data sets.

FIG. 1 illustrates an exemplary railway network 100 according to the various embodiments of the present disclosure. While a railway network is shown in FIG. 1, the principles of the present disclosure are equally applicable to other types of networks. The embodiment of railway network 100 shown in FIG. 1 is for illustration only. Other embodiments of the railway network could be used without departing from the scope of this disclosure.

The freight railway network, shown in FIG. 1, is roughly 32,500 miles of railroad track in mostly rural areas of the western United States. To safeguard this critical transportation infrastructure and the communities nearby, routine inspections are currently performed using a variety of on-track vehicles and equipment. To enhance those inspections while also improving occupational safety for railroad personnel, aerial surveillance of its railroad infrastructure can be performed using unmanned aircraft systems (UAS). These operations can be beyond visual line-of-sight (BVLOS) during day and night in visual meteorological conditions.

The tracks, comprising the freight railway network and the area around them ("the property") and the assets on the property are accurately surveyed using GPS (global positioning system) and other technologies, such as LIDAR (light detection and ranging). An enterprise-level geographical information system (GIS) contains this data and this information is used to plan and conduct flights directly over its property.

The unmanned aircraft (UA) is capable of vertical takeoff and landing (VTOL) and has 10 hours endurance flying at a cruise speed of approximately 40 kts with a sprint speed in excess of 60 kts. Navigation is via a GPS waypoint-based flight plan. The route of flight is directly above railroad tracks at above ground level (AGL) altitudes of 400 ft. and below. The cruise altitude is typically 380 ft. AGL. The autopilot can hold this altitude to within +/−10 feet in calm wind conditions and can correct when wind or environmental factors push the aircraft up or down. The navigation performance of the system can allow the UA to remain within a lateral corridor that is approximately +/−100 ft. of the centerline of the main railroad track. This lateral corridor corresponds to the bounds of the property. Most avoidance maneuvers or loiter orbits, when necessary to maintain safety, can be completed within +1-1,500 ft. of the main track centerline. Sensors carried onboard the UA are designed to have a narrow field of view so that data and images collected are of the track area only.

The rail network is organized into divisions and subdivisions. Each subdivision contains a length of track 50-300 miles in length. Subdivisions interconnect. Near each terminus of a rail subdivision is a yard facility covering many acres. These yards facilities can be staffed and equipped to support UAS operations. An operator can operate a UAS across the majority of its network by launching from a yard, flying along a subdivision, and landing at the next yard where the UA can be inspected, maintained, refueled, and relaunched. The operator can fly two missions per day on up to 100 subdivisions.

To monitor and control its UAS, the operator can leverage its experience with developing and deploying PTC (positive train control). The operator uses its existing telecommunications infrastructure, including privately-owned secured tower facilities and terrestrial backhaul network, for command and control (C2) of the UAS fleet, to implement voice communications over VHF aviation radios, and to provide the flight crews with weather information from a series of stations located along the tracks.

The telecommunications network is designed to be robust and redundant. The telecommunications network reaches back to a network operations center (NOC) at its headquarters. From the NOC, a train positioned on any subdivision in the network can be dispatched. The switches and signals along its route are controlled and crew coordination over voice radio is conducted entirely from this central location. Similarly, each UAS can be controlled from its ground control station (GCS) at a regional flight control center by one pilot-in-command (PIC) and one co-pilot from either a regional flight control center or from a central location. It is possible for the aircraft to be controlled from multiple locations during the duration of the flight. For example, a regional flight control center may initiate the flight and then 'hand-off' the aircraft to another flight control center without landing. Command and control can be accomplished using variations of CNPC (command non-payload control) or C2 (command and control) radios on dedicated spectrum. Voice communications are accomplished via remotely controlled aviation VHF transceivers mounted on towers along the row. UAS operations also leverage an existing network of local track-side weather stations.

The telecommunications infrastructure also is used to support an air traffic situation awareness system. This system is capable of displaying the position of both cooperative and non-cooperative air traffic to the pilot of the UAS. The UA itself is a cooperative aircraft. The UA can be equipped with a mode S transponder with ADS-B out.

UAS operations flight control centers are built at yard facilities, which can make conduct of inspection missions more efficient and cost effective. The flight crew plans safety inspection missions for an area as required. From a dedicated UAS maintenance and data processing facility at an operations flight control center, a ground crew can prepare a UA for its mission and supervises launch and recovery operations. Flying the UA from its GCS, the flight crew can take advantage of the range and endurance of the UA to fly over one or more subdivisions per the flight plan. Some data is streamed live during the flight operation, while the remaining data is post-processed back at the flight control center. All relevant data is transferred to cloud data storage for timely dissemination to appropriate end-users such as track inspectors, engineering personnel, and maintenance planners.

Figure 2:
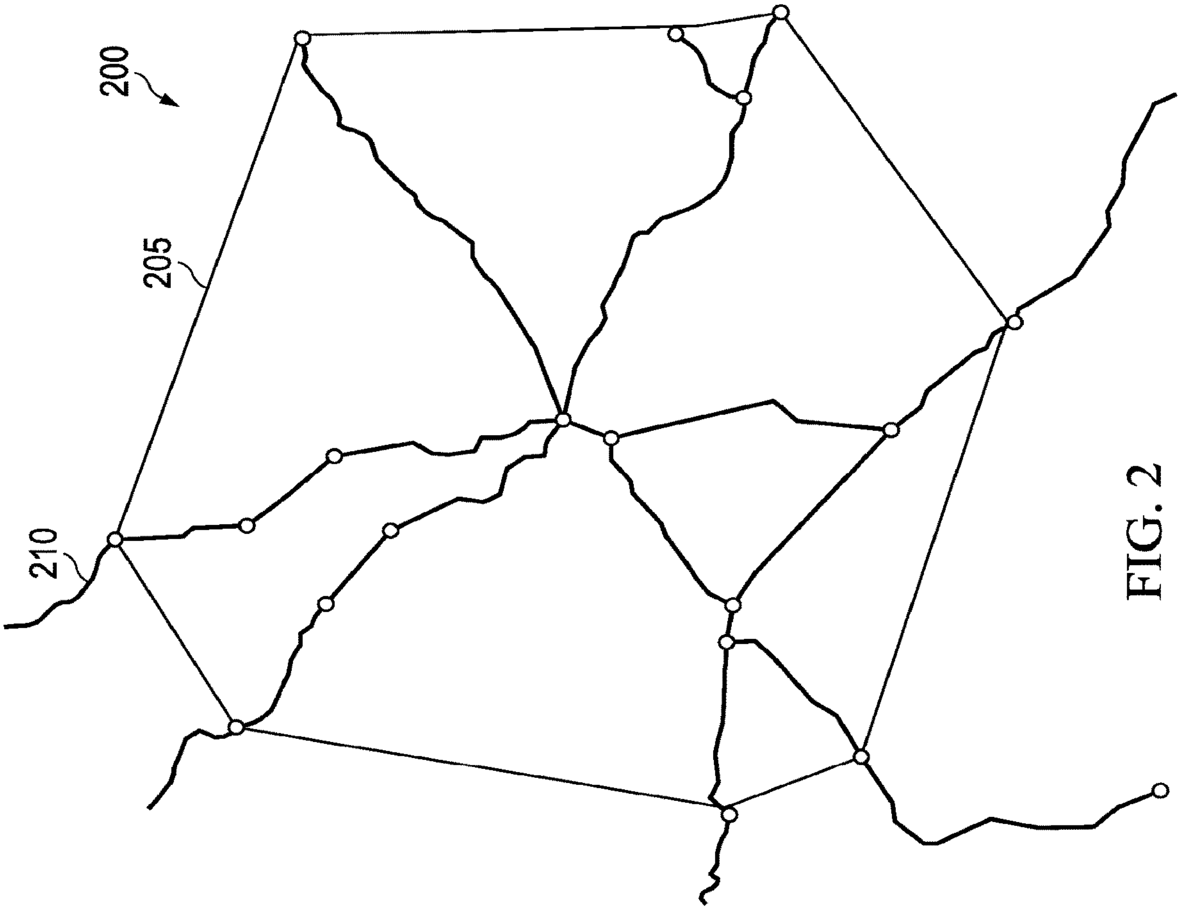
FIG. 2 illustrates an exemplary unmanned aircraft systems (UAS) operations flight control center according to the various embodiments of the present disclosure.

FIG. 2 illustrates an exemplary unmanned aircraft systems (UAS) operations flight control center 200 according to the various embodiments of the present disclosure. The embodiment of UAS operations flight control center 200 shown in FIG. 2 is for illustration only. Other embodiments of the UAS operations flight control center could be used without departing from the scope of this disclosure.

FIG. 2 illustrates the flight control center concept. At the rail yard, five subdivisions connect. Significant portions of four other sub-divisions are within 175 miles. Across this region are numerous flash flood locations, segments of tracks prone to heat induced buckling, territories without signal feedback for monitoring of critical assets, and several critical bridges. These connected subdivisions can benefit from aerial safety inspection and the timely detection of issues this technology provides.

A typical rail subdivision 205 starts in a rail yard on the outskirts of a populated area, extends into more rural areas, and terminates in another yard near a populated area. Along the way, the tracks 210 can be in proximity to primary and secondary roads, can pass through or near small towns or villages, and can pass near airports. However, since the UA can fly directly over property that is privately owned, the UAS may not fly directly over non-participants, except for very short durations (on the order of seconds) at road crossings. The UAS can feature several safety protocols designed to keep the UA over or on private property in the event of an emergency.

Because yards or sections of subdivisions may lie within airspace boundaries at the surface, the UAS is regulated when flying in Class G, Class E, Class D, Class C, and Class B airspace at or below 400 ft. AGL. The UAS functions to not require taking off or landing from towered airports. Procedures (as described herein) are used to operate in controlled airspace, in the vicinity of airports, and in locations with known aviation activity. Along with technology, numerous operational and procedural safety mitigations can be implemented, all with the intent of maintaining situation awareness of and coordinating with manned air traffic. Note that the UA is transponder equipped and the flight crew can have two-way voice communication. The position of the UA relative to airports and detected air traffic is monitored at the GCS using moving map displays with VFR sectional chart overlays. In this way, the BVLOS UAS operation is similar to manned aircraft operations, especially in Class B, C, and D airspace. Regarding 14 CFR 91.113, the position of other cooperative air traffic is known using an air traffic situation awareness system. For awareness of non-cooperative traffic, additional sensors like primary radars are used on a non-interference basis. For further redundancy, visual observers could be positioned at select locations during flights.

Figure 3A:
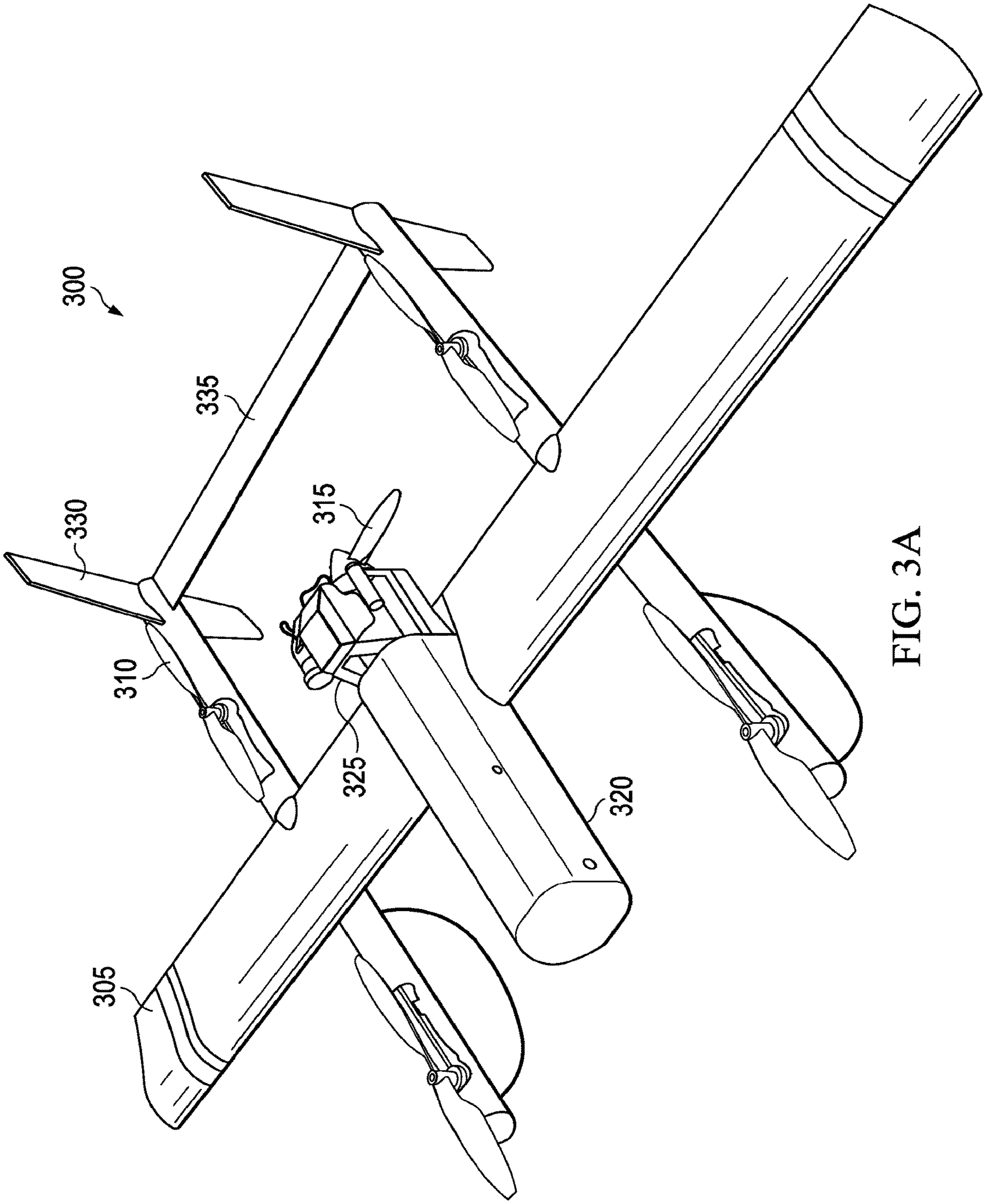
FIGS. 3A and 3B illustrate exemplary UASs according to the various embodiments of the present disclosure.
Figure 3B:
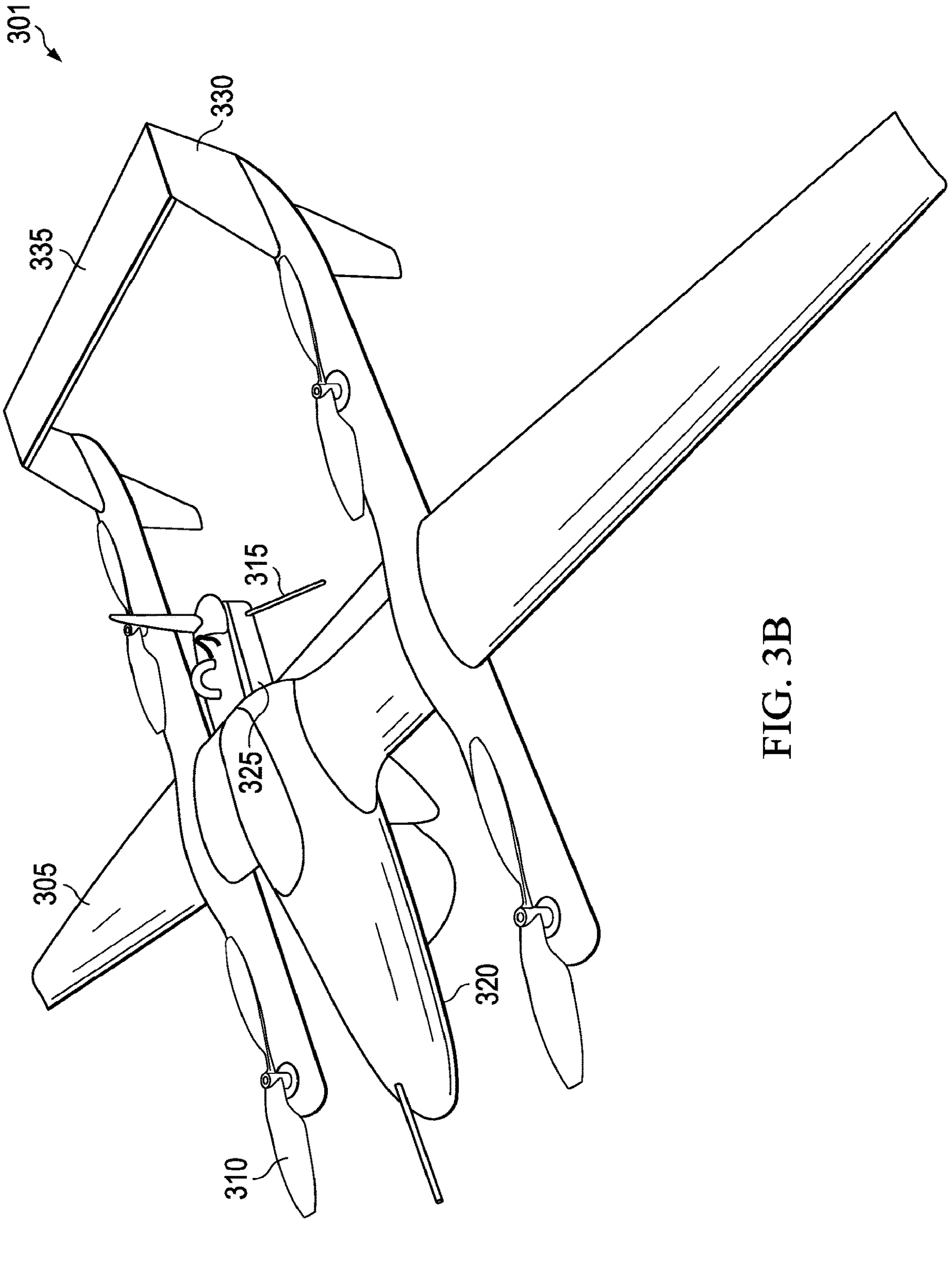

FIGS. 3A and 3B illustrate exemplary UASs 300, 301 according to the various embodiments of the present disclosure. The embodiments of UAS 300 shown in FIG. 3A and UAS 301 shown in FIG. 3B are for illustration only. Other embodiments of the UAS could be used without departing from the scope of this disclosure.

The UAS uses hybrid quad-rotor technology, which combines a fixed-wing aircraft for long duration forward flight with a quad-rotor system for vertical takeoff and landing. The hybrid quad-rotor technology enables launching and recovering the UA from small areas near the tracks or in a yard, while still having the ability to fly hundreds of miles to inspect entire subdivisions.

For BVLOS operations, examples of UAS include both the HQ-40, HQ-60B and HQ-60C hybrid quad-rotor aircraft. The HQ-40 is a small UAS with a wing span of 10 ft. and maximum gross weight of 45 lbs. The HQ-60B and C is a larger UAS with wing span of 15 ft. and a maximum gross weight of 115 lbs. The HQ-60B has more range, endurance and payload capacity than the HQ-40. These aircraft share the same flight computer and flight control software as well as many of the same sub-systems. Both aircraft can be piloted from the same GCS. Below is a brief description of both aircraft.

The HQ-40 consists of a single fuselage, single wing, two booms, two vertical stabilizers, and a single horizontal stabilizer. The forward flight engine is installed behind the fuselage. The quad-rotor system motors are installed in the booms. The aircraft uses two struts on the forward sections of the booms and the bottom of the vertical stabilizers as landing struts. The aircraft controls attitude with ailerons on the outboard sections of the wings and elevators on the horizontal stabilizer. The aircraft is equipped with a strobe and positon lights. It also features a high visibility paint scheme. FIG. 3A below shows the HQ-40 airframe. Table 1 and 2 list its physical measurements and performance characteristics.

TABLE 1

| HQ-40 Aircraft Measurements | | |
|---|---|---|
| **Aircraft Measurements** | | |
| Wingspan | 110 | inches |
| Length | 67 | inches |
| Body Diameter | 7.5 | inches |
| **Weight** | | |
| Empty | 33 | lbs. |
| Max Takeoff Gross | 45 | lbs. |

TABLE 2

| Performance Characteristics of HQ-40 | | |
|---|---|---|
| **Performance Characteristics** | | |
| Endurance | 5 hours (GX-35), 2 hours (B29i) | |
| Max Rang | 190 | NM |
| Max Operating Altitudes | 14,000 | ft MSL |
| Max Climb/Descent Rate | 1000 | fpm |
| Emergency Descent Rate | 2000 | fpm |

TABLE 2-continued

| Performance Characteristics of HQ-40 | | |
|---|---|---|
| Max Speed | 80 | kts |
| Max Turn Rate | 25 | deg/sec |
| Max Bank Angle | 45 | deg |
| Cruise Speed | 28 | kts |
| **Limitations** | | |
| Headwind | 25 | kts |
| Crosswind Turbulence | 20 | kts Mild to Moderate |
| Visibility | VMC conditions | |
| OAT Max/Min | 110 deg F/−2 deg F | |
| Launch Type/Procedure | Vertical | |
| Recovery Type/Procedure | Vertical | |

The HQ-60B consists of a single fuselage, single wing, two booms, two vertical stabilizers, and a single horizontal stabilizer. The forward flight engine is installed behind the fuselage. The quad-rotor system motors are installed in the booms. The aircraft uses structures located on the lower center section of the fuselage and on the bottom of the vertical stabilizers as landing struts. The aircraft controls attitude with ailerons on the outboard sections of the wings, elevators on the horizontal stabilizer, and a rudder on each vertical stabilizer. Each flight control surface is redundant and is independently controlled and actuated. The aircraft is equipped with a strobe and positon lights. It also features a high visibility paint scheme. FIG. 3B below shows the HQ-60B airframe and Tables 3 and 4 list its physical measurements and performance characteristics.

TABLE 3

| HQ-40 Aircraft Measurements | | |
|---|---|---|
| **Aircraft Measurements** | | |
| Wingspan | 150 | inches |
| Length | 96 | inches |
| Fuselage Length | 47.35 | inches |
| Body Diameter | 10 | inches |
| **Weight** | | |
| Empty | 53 | lbs. |
| Max Takeoff Gross | 115 | lbs. |

TABLE 4

| Performance Characteristics of HQ-40 | | |
|---|---|---|
| **Performance Characteristics** | | |
| Endurance | 15 | hours |
| Max Rang | 750 | NM |
| Max Operating Altitudes | 14,000 | ft MSL |
| Max Climb/Descent Rate | 500 | fpm |
| Emergency Descent Rate | 1000 | fpm |
| Max Speed | 80 | kts |
| Max Turn Rate | 20 | deg/sec |
| Max Bank Angle | 20 | deg |
| Cruise Speed | 50 | kts |
| **Limitations** | | |
| Headwind | 30 | kts |
| Crosswind Turbulence | 25 kts Mild to Moderate | |
| Visibility | VMC conditions | |
| OAT Max/Min | 110 deg F/−2 deg F | |
| Launch Type/Procedure | Vertical | |
| Recovery Type/Procedure | Vertical | |

HQ-series UAS (HQ-40 and HQ-60B) have been issued Special Airworthiness Certificates in the Experimental Category and have accumulated more than 360 hours of VLOS/EVLOS operations and more than 880 hours in BVLOS operations, with 18 hours of night BVLOS. This yields a total of 1,258 flight hours as of August 2017.

Figure 4:
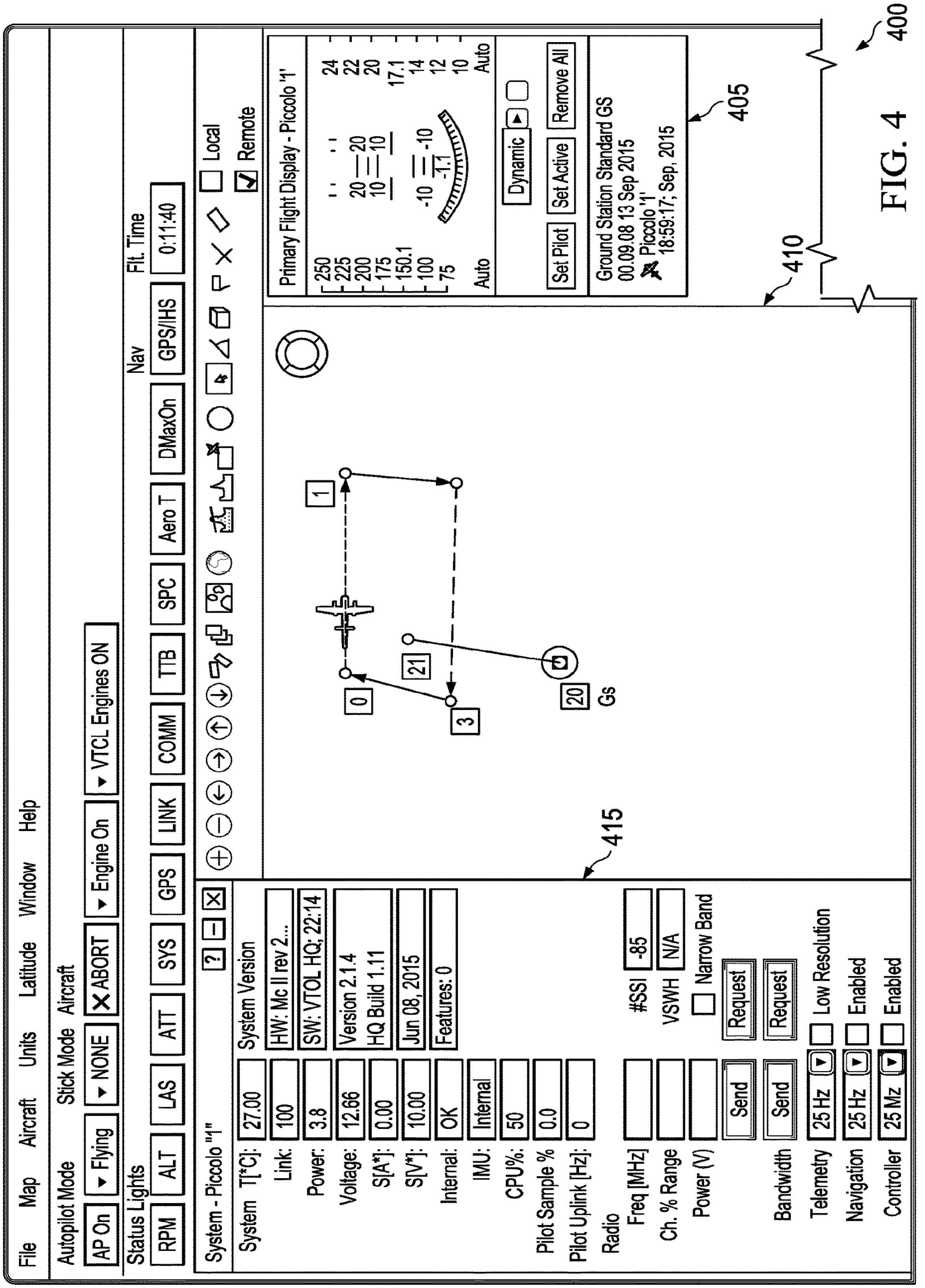
FIG. 4 illustrates an exemplary command center (CC) user interface (UI) according to the various embodiments of the present disclosure.

FIG. 4 illustrates an exemplary command center (CC) user interface (UI) 400 according to the various embodiments of the present disclosure. The embodiment of CC UI 400 shown in FIG. 4 is for illustration only. Other embodiments of the CC UI could be used without departing from the scope of this disclosure.

A GCS facility is outfit with equipment to support multiple individual flight crews, each flight crew can operate a single UAS on multiple subdivisions. Each GCS, shown in FIG. 5, can include the following: ground station laptop: PC computer running GCS software specific to the UA; ground station device containing communication radios for telemetry links and management of wireless links and bridges between aircraft and operator interfaces; ground station communications antenna(s); and ground station GPS antenna(s).

In addition to these components, the GCS can also include devices for connectivity with the telecommunications network, equipment and interfaces for use of rail and aviation voice radios, equipment and interfaces for communication with the flight control center, software for monitoring the locations of trains, and equipment and displays for the air traffic situation awareness system. The ground control station can also include electronics tools and a backup power system capable of supporting normal operations for the duration of a flight.

The HQ-60B uses the UAS autopilot (onboard the aircraft) and ground control system (GCS). This unit has seen well over 250,000 hours on DoD programs with great success. Autopilot software features easy-to-define mission parameters and restrictions, waypoint insertion, context menus for common functions, route copy between aircraft, easy route planning, high-performance smooth-zoom 2D and 3D terrain mapping, terrain database integration with web mapping servers for elevation and imagery, intuitive primary flight displays, and the ability to change airspeed, altitude, and heading commands at the displays. Displayed data can be configured per user requirements. A status bar provides a high-level alert interface.

The pilot can determine the attitude of the aircraft using the primary flight display (PFD) on the operator interface and the aircraft position using the geo referenced imagery in the center of the default display. The aircraft's position is overlaid on this imagery. The PFD and the aircraft position are updated at a maximum rate of 25 Hz.

Any commands that could be detrimental to the normal operation of the UA are safeguarded with a confirmation window. Inputs that could produce an undesirable outcome are guarded and require multiple steps to activate.

Figure 5:
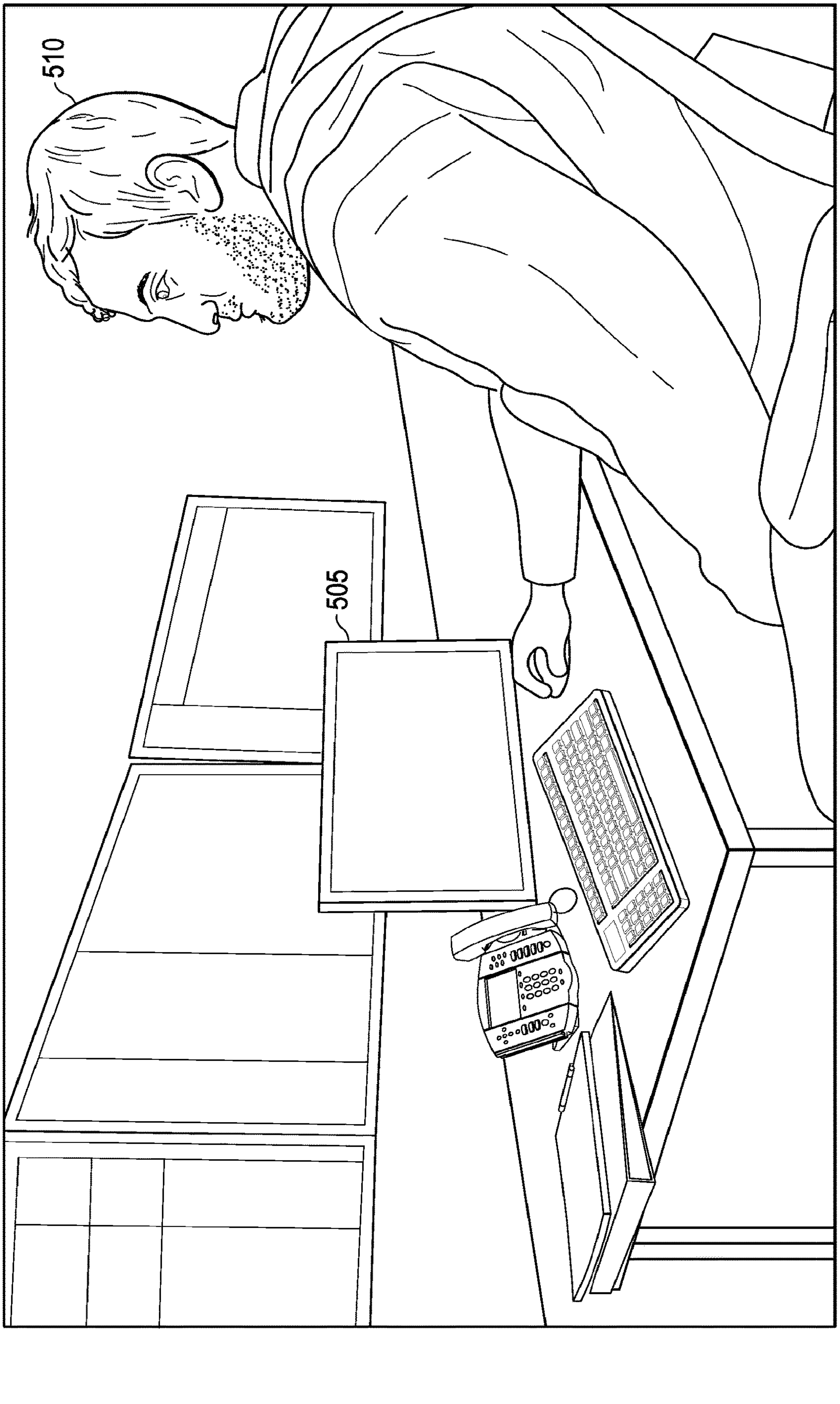
FIG. 5 illustrates an exemplary ground control system (GCS) facility according to the various embodiments of the present disclosure.

FIG. 5 illustrates an exemplary ground control system (GCS) facility 500 according to the various embodiments of the present disclosure. The embodiment of GCS facility 500 shown in FIG. 5 is for illustration only. Other embodiments of the GCS facility 500 could be used without departing from the scope of this disclosure.

Each flight control center can include a UAS launch and recovery station (LRS), where a ground crew prepares and maintains the UA and supervises launch and recovery operations. The HQ-60B system requires the following equipment for pre-flight preparation and post-flight activities: shore power supply: 30 V DC power supply; lithium polymer (LiPo) battery safe storage; LiPo charging stations: used to charge avionics and VTOL batteries; bulk fuel supply and transfer equipment; aircraft scale; tool and spares kit: includes tools required for maintenance and spares for wear items; launch abort system: enables the ground crew to abort a launch for safety reasons; webcam/VoIP equipment for communications with flight crew at GCS; local C2 (command and control) radio for launch and recovery.

Ground crews and flight crews can receive training on crew roles and responsibilities and on crew resource management. Specific duties of the ground crew are highlighted further herein.

Figure 6A:
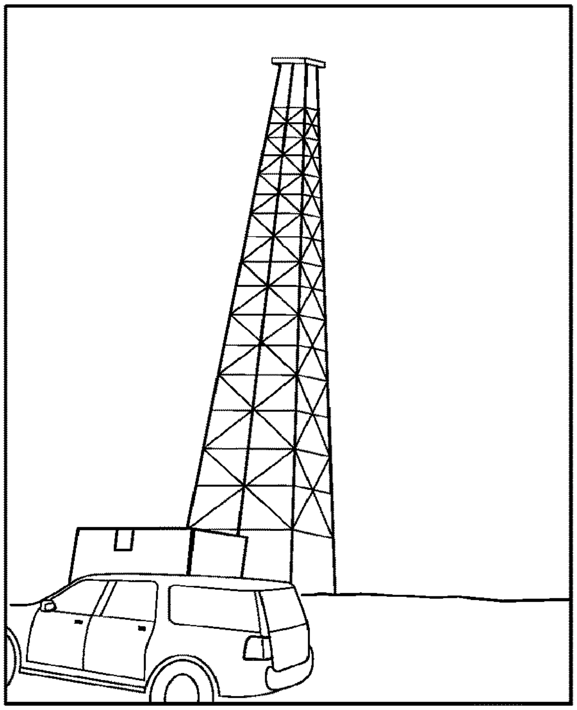
FIGS. 6A and 6B illustrate an exemplary telecommunications tower according to the various embodiments of the present disclosure.
Figure 6B:
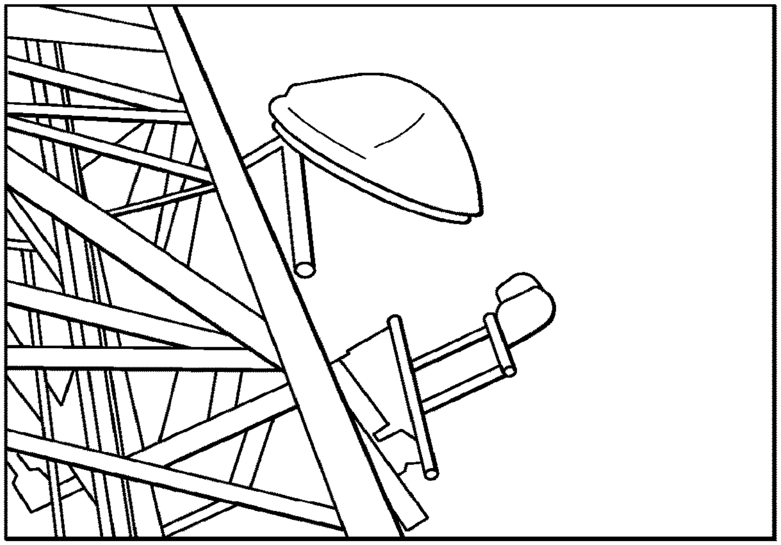
Figure 7:
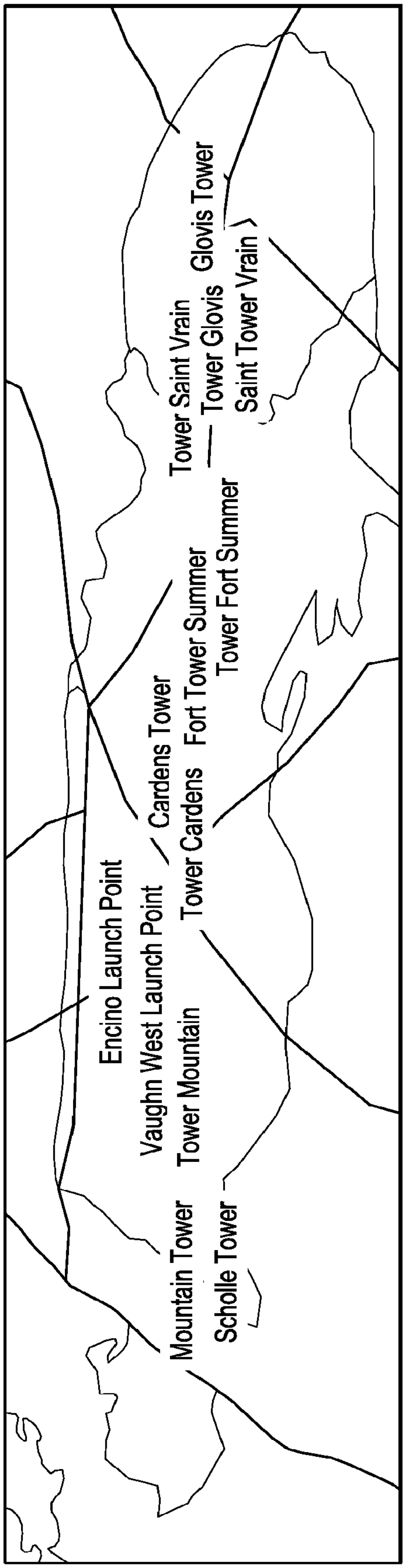
FIG. 7 illustrates an exemplary radio frequency (rf) coverage analysis according to the various embodiments of the present disclosure.

FIGS. 6A and 6B illustrate an exemplary telecommunications tower 600 according to the various embodiments of the present disclosure. The embodiment of the telecommunications tower 600 shown in FIGS. 6A and 6B is for illustration only. Other embodiment of the telecommunications tower 600 could be used without departing from the scope of this disclosure. FIG. 7 illustrates an exemplary radio frequency (if) coverage analysis 700 according to the various embodiments of the present disclosure. The embodiment of the rf coverage analysis 700 shown in FIG. 7 is for illustration only. Other embodiments of the rf coverage analysis 700 could be used without departing from the scope of this disclosure.

Command and control of the UA can be accomplished using a radio network. This does not involve a series of GCS instances conducting hand-off procedures. Rather, there is one GCS connected to a network of ground-based radios placed along the flight path of the UA at regular intervals to maintain persistent communications.

To maintain the C2 link between the UA and the GCS, the UA must be within line-of-sight (LOS) of one or more antennas in this network. The antenna placement on the network is designed for overlapping coverage, meaning that the UA can be within LOS of two radios at all times during flight along a subdivision. The radio network is connected to the GCS over a network designed for latency on the order of 50 milliseconds.

FIGS. 6A and 6B show a telecom tower. This tower is approximately 300 ft. tall and is located on high ground approximately 1.6 NM from the tracks. Towers of this type are positioned along the tracks at intervals of approximately 15 to 30 NM. FIG. 7 shows the RF coverage analysis for a C2 radio network using towers along a subdivision. Use of seven towers provides overlapping coverage at track elevation for the length of the subdivision. Existing towers can be used to install radio networks along other subdivisions. RF analysis and can conduct appropriate performance tests are conducted prior to conducting routine BVLOS UAS operations on those networks.

The autopilot used in the UA features a built-in C2/telemetry link on the ISM (industrial, scientific, and medical) band (2.4 GHz and 900 MHz). Integration of the CNPC/C2 radio adds a second C2 link to the aircraft. The requirements to perform a normal VTOL launch and recovery require a higher bandwidth telemetry link than does cruise flight. During launch, recovery, and local operations, the C2 link can be the 2.4 GHz radio. When the aircraft is flown away from the launch and recovery zone, the communications link is switched to over to the CNPC/C2 radio network by the flight crew.

Figure 8:
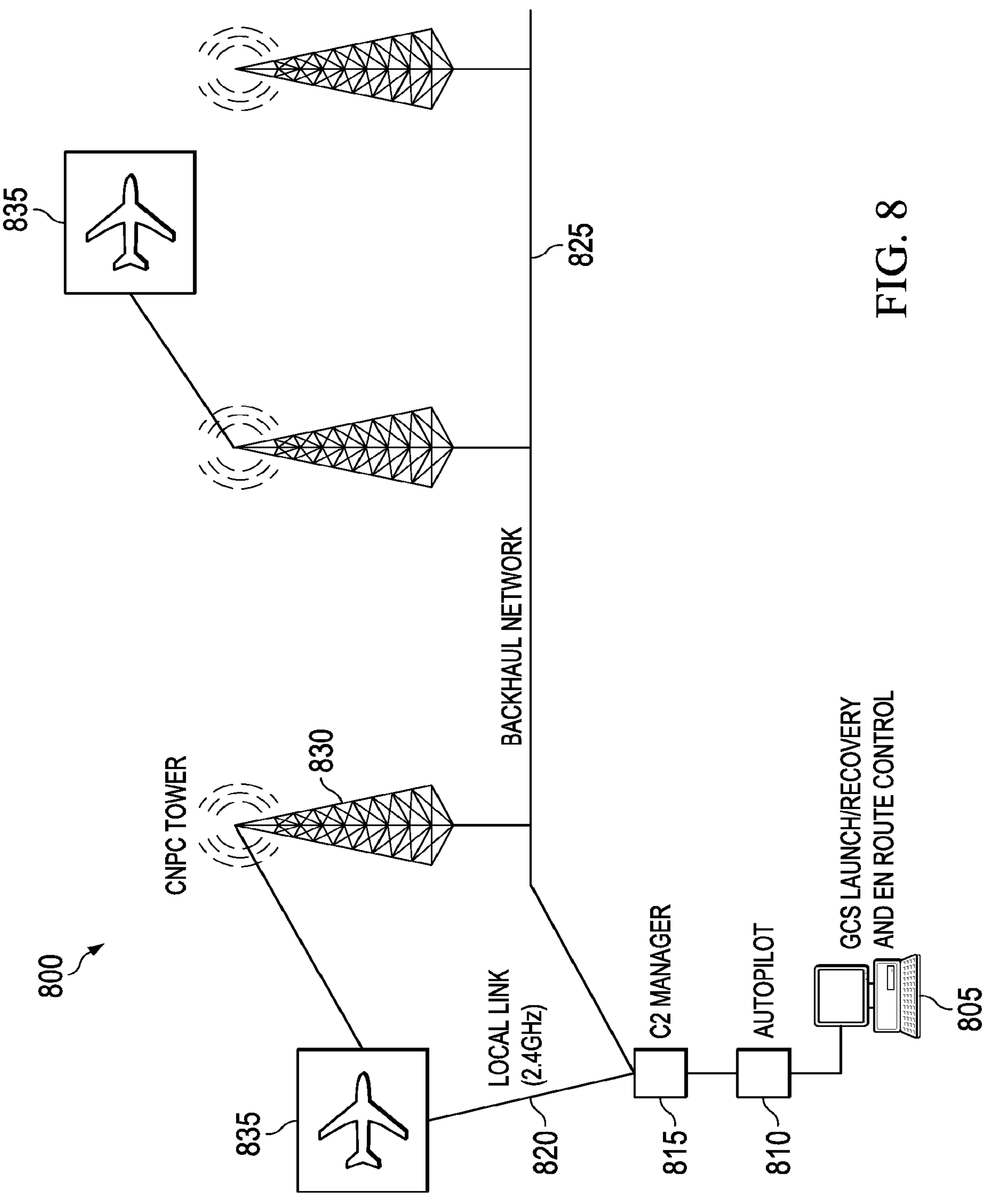
FIG. 8 illustrates an exemplary overall system schematic according to the various embodiments of the present disclosure.

FIG. 8 illustrates an exemplary overall system schematic 800 according to the various embodiments of the present disclosure. The embodiment of the system schematic 800 shown in FIG. 8 is for illustration only. Other embodiments of the system schematic 800 could be used without departing from the scope of this disclosure.

FIG. 8 is a diagram of communications flow. Command, control, and telemetry data are transmitted locally on the 2.4 GHz ISM band during launch and recovery. Once the aircraft is established in a cruise configuration, the UAS can be ingressed to the CNPC/C2 network through the closest CNPC/C2 tower. The pilot makes this change using a custom software application that runs on the ground station computer. This software also provides feedback to the pilot on the health and status of the CNPC/C2 system. If for any reason the link health of the CNPC network is not sufficient, the UA can be recovered at the flight control center over the local 2.4 GHz ISM link. If for any reason there is an issue with local C2 health, the flight may be postponed until issues are resolved. The health of all of the radios on the CNPC network can be monitored by the pilot. If during cruise flight, the link health of a radio is insufficient for continued flight, the pilot can alter the flight plan or perform an emergency vertical landing near the tracks.

Figure 9:
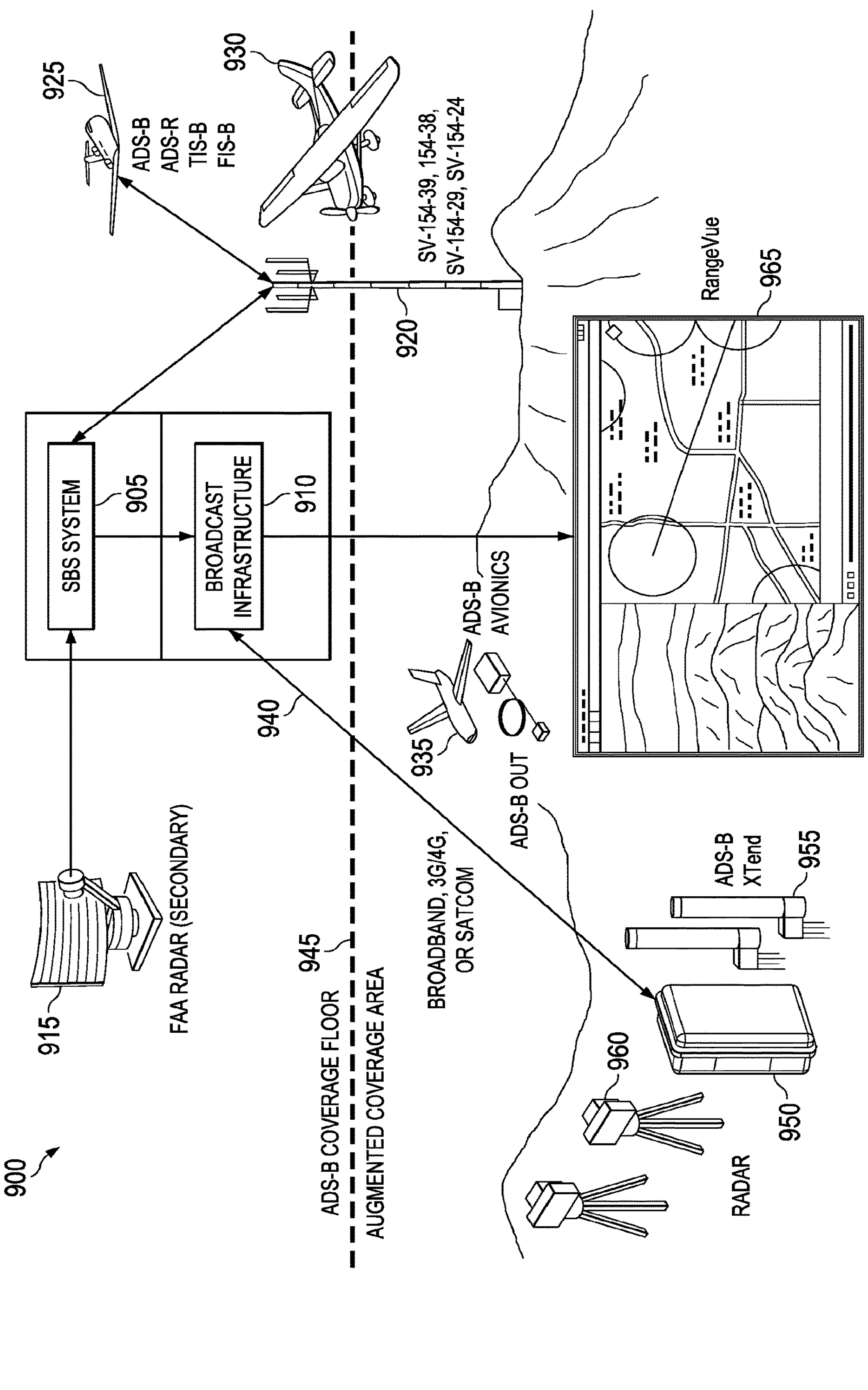
FIG. 9 illustrates an overview of an exemplary air traffic awareness system according to the various embodiments of the present disclosure.
Figure 10:
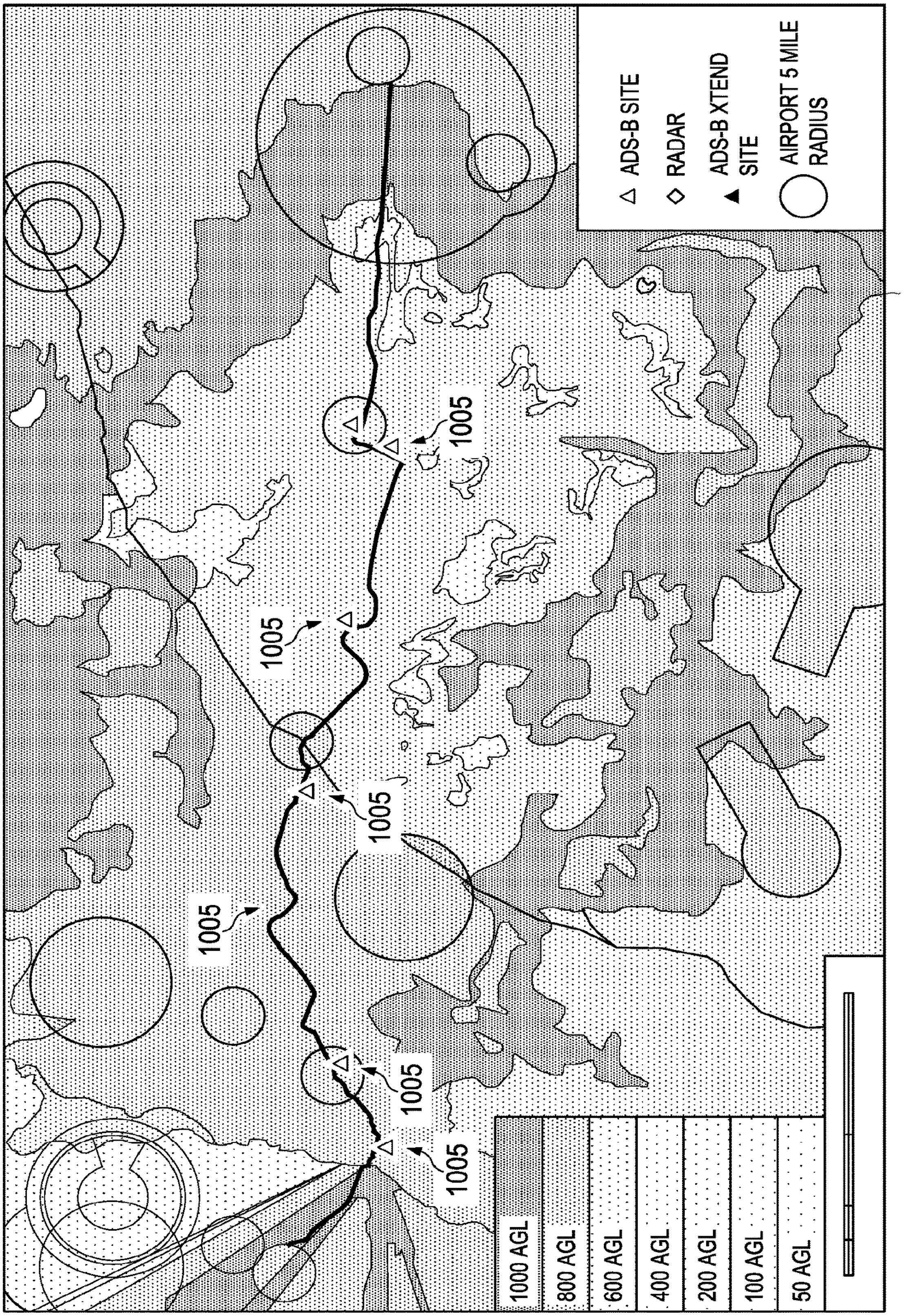
FIG. 10 illustrates an overview of an exemplary air traffic awareness system 1000 according to the various embodiments of the present disclosure.
Figure 11:
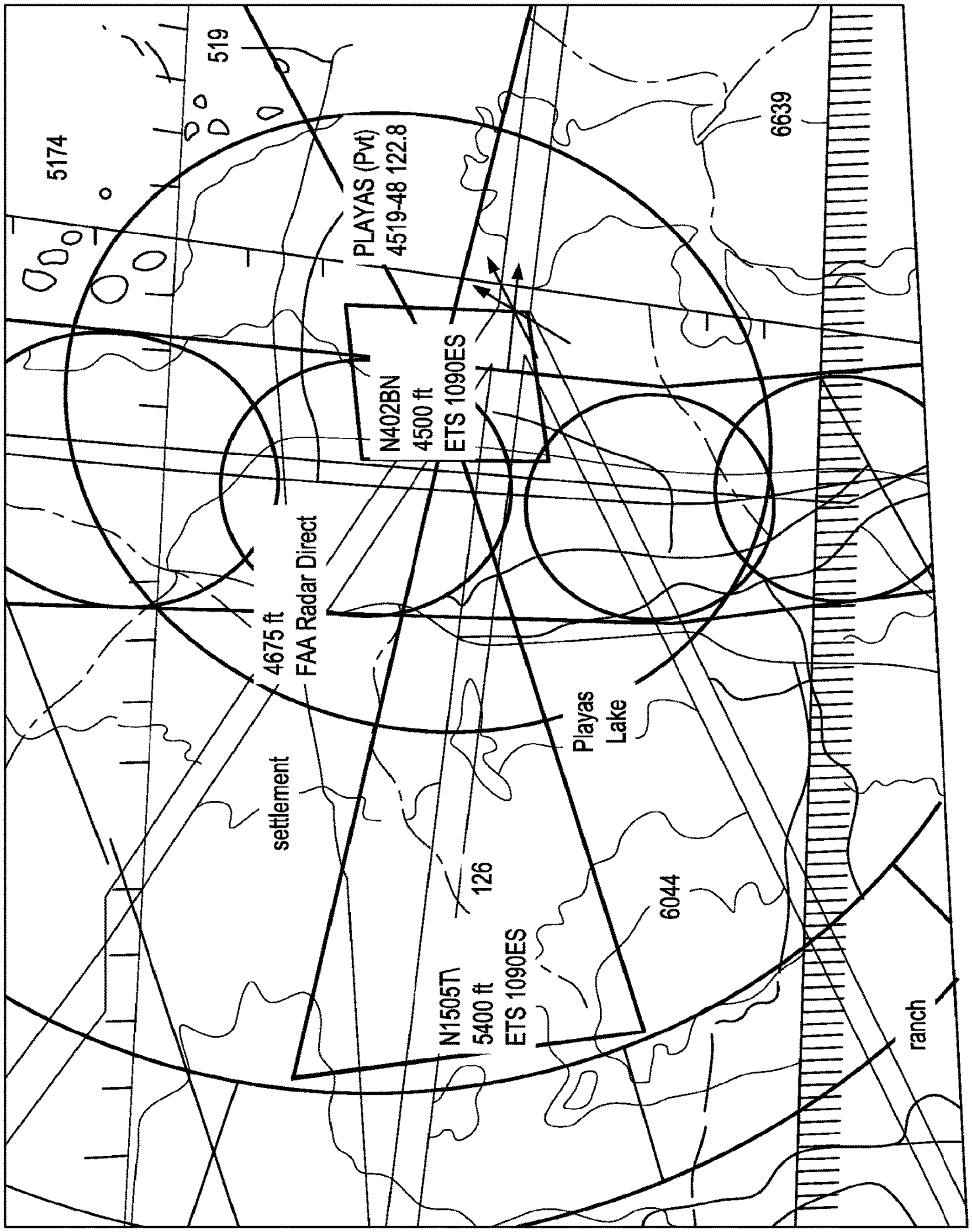
FIG. 11 illustrates an exemplary user interface display of air traffic according to the various embodiments of the present disclosure.

FIG. 9 illustrates an overview of an exemplary air traffic awareness system 900 according to the various embodiments of the present disclosure. FIG. 10 illustrates an overview of an exemplary automatic dependent surveillance-broadcast (ADS-B) site locations 1000 according to the various embodiments of the present disclosure. FIG. 11 illustrates an exemplary user interface display 1100 of air traffic according to the various embodiments of the present disclosure. The embodiments of the air traffic awareness system 900 shown in FIG. 9, the ADS-B site locations 1000 shown in FIG. 10, and the user interface display 1100 shown in FIG. 11 are for illustration only. Other embodiments of the air traffic awareness system 900, the ADS-B site locations 1000, and the user interface display 1100 could be used without departing from the scope of this disclosure.

The ability to "see and avoid" other air traffic in accordance with 14 CFR 91.113 is a critical. The air traffic situation awareness system can monitor cooperative and non-cooperative air traffic. Components of this system can include local sensors and dispatch system and range system software tools.

As shown in FIG. 9, the dispatch system is linked to the FAA air traffic management system (Surveillance Broadcast System) and can also be linked to networks of local sensors. local network of ADS-B Xtend receivers can be installed along each subdivision to augment ADS-B coverage below 500 feet AGL. An example of this is presented in FIG. 10. RF analysis led to installation of six additional receivers on the towers along the subdivision to provide ADS-B coverage to the ground (50 ft. AGL). Note that local sensor data may not be integrated into the SBS data feed.

Range system software is an air traffic display designed to provide situation awareness to the UAS pilot. This aids the pilot in avoiding nearby manned air traffic, which is unlikely to make visual contact with the UA. Using the dispatch system, data from FAA radars and from ADS-B, ADS-R, TIS-B, and FIS-B is fused with detections from local sensors to present the track of each air traffic target to the UA PIC on a range system. Various symbols and alerting features present a representation of both the UA and any air traffic targets as shown in FIG. 11.

One example of a local sensor for detection of non-cooperative traffic is radar which has been tested as part of this air traffic awareness system. This radar detects personnel, land vehicles, marine vessels, avian targets, and low-flying aircraft. With the radar configured to detect and generate tracks for GA aircraft sized targets, GA aircraft were tracked at a range of 5.4 NM (10 km) with a median range error of 20 feet (~6 meters). Track durations were approximately 70 to 110 seconds. Note that elevation data is not available, so radar tracks from this sensor are displayed in two dimensions only. Without any additional coordination, pilots must assume that targets are co-altitude and must act appropriately to avoid those targets.

For the test configuration and environment, the air traffic awareness system allowed the UA PIC to recognize GA air traffic (cooperative and non-cooperative) at a range of at least 3 NM. On average, there was at least 60 seconds between that initial recognition and the closest point of approach between the "Intruder" GA aircraft and the UA. In one study to model human visual acquisition of air traffic, the probability of visual acquisition of a Piper Archer (a typically sized GA aircraft) by two pilots actively scanning for air traffic was presented. The probability of visual detection was shown to be only 10% at a range of 3 NM (the probability was shown to be 100% at less than 0.5 NM). Results from another test indicated that recognition of intruders by the UA PIC using the range system occurred approximately 17 seconds in advance of recognition by ground-based visual observers. Test results indicate that the use of the air traffic situation awareness system provides a capability to detect air traffic that is equivalent to or better than ground-based or airborne visual observers.

The deployment of local sensors for non-cooperative traffic can be based on the following: (1) ADS-B coverage to the ground along the length of a subdivision for detection of cooperative air traffic. (2) At locations known to have a high concentration of non-cooperative air traffic. This knowledge may be the result of outreach efforts. Depending on the nature of the activity, this may lead to seasonal rather than year-round deployment of sensors (radar). (3) Risk assessments specific to the flight corridor over the tracks. The deployment initially can be based on actual air traffic data or based on modeling validated by that data. Sensors, or other mitigations (visual observers), can be placed in locations where the risk of mid-air collision exceeds that of locations that have been deemed to have acceptable unmitigated risk of mid-air collision (relative unmitigated risk).

Additional air traffic avoidance technologies can be utilized as they become accepted for operational use. Examples of such technology include alternative radars and on-board collision avoidance.

Two-way voice communications on aviation frequencies is an important safety mitigation. It allows pilots, who may not see each other's aircraft, to announce their intentions and coordinate their actions in a safe manner. The telecom infrastructure can be used to host CTAF, tower, and approach frequencies local to each subdivision using IP radio gateway/bridging systems. Such systems provide push-to-talk capability from tower mounted VHF transceivers. This is analogous to having a network of aviation ground station radios such as those used at airports for UNICOM/CTAF. In certain embodiments, the ground stations are facilitating air-to-air communications since voice radios are not carried aboard the UA.

This usage of aviation VHF transceivers is subject to FAA/FCC approvals. While this usage is an atypical deployment of such radios, the usage allows the UAS to operate BVLOS in the NAS in a manner consistent with manned aviation and has proven to be a critical element of safe integration of the UA into the NAS.

Guidelines and procedures in the AIM (aeronautical information manual) for flight under VFR are followed. The following is an overview of the procedures for a typical flight.

Flight planning can be conducted in the same manner as in manned aviation. The pilot in command (PIC) is familiar with all information applicable to the flight. Flight crews can use existing aviation tools and information sources along with software designed for the purpose of UAS flight planning over rail infrastructure. This software uses information collected from the GIS database, from site surveys, from publicly available data, and from approved navigation databases to aid in development of flight plans. Flight plans can take into consideration the following: mission objectives (subdivision, type of safety inspection, sensor), the local terrain, the local weather at the launch and recovery sites as well as along the route of flight, population along the route of flight, vertical obstructions, launch and recovery climb and descent paths, local airspace and air traffic considerations, and gatherings of people or special events near tracks. The intended flight time drives the fuel requirements for the flight(s). Takeoff time and total time aloft can be determined so that notifications to other NAS users (DoD, Ag, GA) can be delivered if necessary, and a NOTAM (Notice to Airmen) can be filed if one is required.

The outputs of the planning process are as follows: a set of GPS coordinates defining the launch and recovery locations; a set of GPS coordinates defining the landing pattern to the landing location; a set of GPS waypoints defining the flight route for normal operations; a set of GPS waypoints defining the flight route for operation under loss of C2 link; a set of GPS coordinates defining the airspace boundary (geo-fence) that is designed to prevent an excursion away from privately owned property; a description of suitable emergency landing areas (or areas to avoid) within and immediately beyond the geo-fence; map overlays of aviation charts, terrain, and demographics for use on moving map displays in the GCS; information and procedures for transitioning through any airspace or near any airports along the route of flight; schedule for issuing notifications and NOTAMs; and payload/sensor installation and fuel load plan for the ground crew.

If during any part of the flight planning process the UAS PIC believes that the flight cannot be conducted safely, the flight operation may be postponed until changes can be incorporated or adequate mitigations can be implemented. Examples include: special events where a large gathering people may be in close proximity to the tracks, a seasonal and highly localized crop spraying operation in close proximity to the tracks, or installation of a new vertical obstruction in a location where loitering may be required.

Both the flight crew and ground crew are responsible for pre-flight actions. At the GCS, the flight crew can configure all software and displays according to pre-flight checklists. UA configuration files can be verified, flight plan waypoints can be loaded into the autopilot interface, maps and map overlays can be loaded into the autopilot interface and into the air traffic situation awareness system. Commonly used radio frequencies can be pre-set. Any sensor interfaces can also be configured. Communications can be established with the ground crew at the launch and recovery station (LRS). At the LRS, the ground crew can perform pre-flight inspection of the UA, can install and configure the sensor(s) and fuel the UA in accordance with the flight plan. The ground crew proceeds to power on the systems of the UA in coordination with the flight crew after configuration of the software and displays.

The flight and ground crew each complete final GCS and UA pre-flight checks such as transfer of flight plans and boundaries to the autopilot, center of gravity calculation and verification, C2 and payload link checks, battery voltage checks, fuel quantity verification, flight control surface calibration checks, IMU checks, VTOL system checks, and pusher engine start and run-up checks. With these tasks completed, the flight and ground crew can coordinate to complete pre-takeoff checks including visual clearing of the launch area at the flight control center. A ground crew member mans the launch abort control. At the GCS, the flight crew can conduct any necessary pre-takeoff radio communication with ATC or make announcements over CTAF. A final go or no-go decision can be made by the PIC.

Vertical launch and transition to forward flight is executed through an autopilot mode. It involves a series of maneuvers that occur without manual manipulation of controls by the PIC. With a 'go' decision, the launch can be commanded from the GCS. During the launch and transition, the ground crew can abort the launch for any safety reason.

The vertical climb profile can take the UA to an altitude of approximately 60 ft. AGL. From there, the UA transitions to forward flight under power of the forward propulsion motor. Once the UA has transitioned to forward flight, the PIC at the GCs can verify the CNPC link health and can ingress the UA to the CNPC network. The PIC can then activate the flight plan and the UA proceeds to fly the preprogrammed route.

During the cruise flight phase, the vehicle follows the flight plan along the tracks to the specific areas of interest and can collect the necessary data. During the flight, flight crew can communicate with ATC and other NAS users and can monitor displays for the position of other air traffic. Weather, UA flight states, and health systems such as engine RPM, fuel level, battery life, GPS signal, and C2 link can also be continuously monitored. The telemetered position of the UA on the moving map can be used to ensure the aircraft is executing the flight plan properly. The PIC can take control at any time to alter the flight plan, or the course, speed, and altitude of the UA.

Critical for safe operation of the UA in controlled airspace are procedures designed to allow the BVLOS inspection mission to proceed safely and with minimal impact to manned aircraft operations. For operations in Class B, C, and D airspace, although the UA is cooperative, it may not be detected by FAA radar given the low cruise altitude. For routes impacted by this issue, reporting and loiter points can be established at the intersection of the tracks and the airspace boundary, and at locations between 1.5 and 3 nautical miles on either side of the intersection of tracks and the approach to any runways. These can be specified and named (Point Q (latitude/longitude), etc.) in a Letter of Agreement (LOA) with the controlling facility. Or, these points can be referenced by distances and association with landmarks (1.5 NM from intersection of rail track and Runway 36'). The UA PIC can call ATC on aviation voice radio at each reporting point with the direction of flight. In Class D, ATC acknowledgement of transmission constitutes approval to proceed to the next reporting point unless directed to hold. In Class B and C, acknowledgement of transmission and clearance to proceed must be given. If requested to hold at a reporting and loiter point, the UAS can fly in an orbit designed to avoid people and structures on the ground. The UA can continue on course when traffic is clear and ATC provides instructions to proceed to the next point.

Operations in Class E and Class G near airports are similar. The UA PIC can monitor CTAF and can make position reports. Based on the voice radio position reports and the movement of air traffic on the air traffic situation awareness displays, the PIC can coordinate with manned air traffic using reporting and loiter points. If necessary, the PIC can loiter well away from the runway centerline and wait for a manned aircraft to complete an instrument approach or landing pattern.

Note that unplanned loitering or turning maneuvers can cause an excursion of ~1,500 ft. laterally from the +/−100 ft. corridor over rail operator property. Executing such maneuvers in a safe manner requires knowledge of the vertical obstructions in the area and the local terrain. This information can be displayed to the pilot on the GCS moving map to aid situation awareness. Since the cruise altitude of the UA is −350 ft., the flight path is above most uncharted vertical obstacles (those less than <200 ft. tall). The pilot must descend or land next to or on the tracks if lateral maneuvering may impose a risk of impacting an obstruction.

As the end of the mission is reached, the ground crew at the LRS can be alerted to prepare the recovery site. As the UA nears the flight control center, the PIC can switch the C2 link from the CNPC C2 network to the local C2 network. The ground crew can clear and secure the landing area. In coordination with the ground crew, the PIC can then initiate the pre-defined landing pattern and approach. Upon reaching an altitude of approximately 60 ft. within a specified distance of the touchdown point, the aircraft can transition to vertical flight and can begin a vertical descent to the landing point. After reaching the landing point and touching down, the aircraft can spin down its motors, completing the recovery phase.

Following landing, the ground crew can conduct post-flight inspection of the UA per procedures using checklists. They can complete logs of UA flight time, VTOL and pusher motor run time, aircraft power on time, etc. Maintenance logs can be in accordance with 14 CFR 91.417. The UAS can be hangered and secured. Data can be transferred from on-board storage. At the GCS, the flight crew can log PIC/SIC flight times.

Engine Start: The autopilot features an engine kill/armed switch for both the pusher and VTOL motors. Both are set to kill at the GCS before pre-flight. A switch located on the side of the fuselage is set to 'off' and the arming plugs to the VTOL motors are removed by the ground crew. Pusher engine startup occurs at the end of the pre-flight checks. First, the pusher engine is enabled. Next, the switch is set to 'on'. The pusher engine is then started by a ground crew member using an electric starter. Once the pusher engine has passed its pre-flight checks, the plugs for the VTOL engines are inserted. VTOL engines are then enabled at the GCS. At that point, the ground crew can vacate the area in the vicinity of the aircraft.

Launch Abort: The launch phase of flight can be aborted for any reason. This can be accomplished from the GCS by the PIC, or from the launch abort control at the LRS. The launch abort control is a special device which can be connected to the GCS via the telecommunications network.

Lost Link Plan and Geo-fence Updates: Lost link flight plans and airspace boundaries (geo-fence) can be updated as required during long duration flights to ensure that up-to-date information is taken into account.

Weather: The UA is unable to operate in visible moisture or in high winds per its limitations. Local weather stations, aviation weather forecasts and reports, including weather radar, can be continuously monitored by the flight crew. In the event of unsafe weather conditions, the mission can be aborted and the UA can be landed on or near the tracks. The nearest ground crew can be dispatched to recover the UA.

Pilot in Command (PIC): The PIC is responsible for safe operation of the aircraft. The PIC can make sure all checklist items pertaining to the operation of the aircraft are followed during normal, abnormal and emergency situations. Pre-flight of the GCS and all phases of flight from "engine start" to "Shut Down" can be the pilot's responsibility. It can be the PIC's final authority as to a go, no go decision and any decisions pertaining to safety of flight. This includes decisions and actions related to maneuvering the UA to avoid air traffic based on information displayed on the air traffic situation awareness system.

Second in Command (SIC): The SIC can be responsible for aiding the PIC in providing traffic alerts and weather information. The SIC can also make position reports and handle any air-to-air, ATC or emergency communications. The SIC can communicate with ATC, when appropriate. If needed, the SIC can also communicate with entities to coordinate aircraft positioning and use.

Both the PIC and SIC can hold FAA Private Pilot certificates and 3rd class medical certificates.

Ground Crew A (GCA): The GCA can be responsible for preflight of the physical aircraft and ensuring that the logbook items relating to the physical aircraft components are filled out. The GCA can be required to make sure any aircraft maintenance required is completed before flight in accordance with any applicable Latitude maintenance manuals. The GCA can have the final authority in deciding if the aircraft is worthy of flight. During launch, it can be the GCA's responsibility to "abort" liftoff of the aircraft if anything abnormal or dangerous is observed. During landing, the GCA can be responsible for calling "abort" should the need arise. Upon recovery, the GCA can conduct a thorough post flight walk-around and document any damage, abnormality, or other issues that occurred with the aircraft.

Ground Crew B (GCB): The GCB can be responsible for site access and safety and can assist the GCA as needed. The GCB can ensure that the launch and recovery area are clear of personnel, objects, and equipment for departure and approach. In the case of a malfunction or injury to the GCA, the GCB can be responsible for disabling the engine ignition switch while the GCA is starting the engine. After launch and recovery, it can be the GCB's responsibility to ensure all equipment pertaining to the operation are collected and cleared from the site.

Ground crew can launch and recover the UA at night. As such, they can be trained to recognize and overcome visual illusions caused by darkness, and to understand physiological conditions which may degrade night vision.

Ground Crew can Hold FAA A&P Mechanic Certificates.

A UAS specific training program can be conducted under the direction of a qualified instructor. Ground instruction can be provide to flight crews on operation of all systems required for BVLOS operations—UA autopilot interface, C2 network control and health monitoring interface, Air Traffic Situation Awareness software, and the Aviation Radio software interface. Through ground instruction, both flight crew and ground crew can be trained on UA preflight, UA preventative maintenance, and launch and recovery operations. Through flight instruction, flight crews can gain proficiency in normal and emergency procedures.

Personnel may not perform flight duties in a position for which a documented training program has not been completed. Recurrent training can include a combination of ground and flight training.

Lost Voice Communications: Voice communication among crew members is important for safety. The PIC and SIC can occupy the GCS and can communicate directly with each other. The PIC and SIC can have voice communications with the Ground Crew members at the remote launch/ recovery site via VoIP (voice over internet protocol) and IP camera equipment. If voice communications cannot be established or maintained, the operation can be postponed until communications are established.

Voice communication is an important operational safety mitigation for BVLOS operations. The UA may not enter Class B, C, or D airspace, nor can it launch from within Class B, C, or D airspace without two-way voice communication with ATC. A loss of voice communication with ATC in Class B, C, or D controlled airspace can result in an immediate VTOL recovery of the UA on property at its present location. The UA may not enter Class E airspace, nor can it launch from within Class E airspace, without two-way voice communication over local CTAF. The UA may not fly within 2 miles of the approach to any airport without two-way voice communications over CTAF.

Lost Link: If a loss of C2 link occurs, warnings appear on the GCS and are accompanied by repeated audio warnings. This is triggered based on a timeout defined by the PIC and is typically 30 seconds. The autopilot handles a lost link event with a set of parameters that the PIC defines for the given flight mission, including a flight timer which defines the maximum amount of time the aircraft can fly. The flight timer is typically based on loaded fuel quantity or mission requirements. Also defined is a safe lost link location (latitude, longitude, altitude) where the aircraft can fly to via a prescribed set of waypoints called the 'Lost Link Flight Plan'. Once at the lost link location, the aircraft can fly in an orbit at a defined orbit radius. This location can be within the boundaries of the flight area and away from persons or structures. For most situations, it can be over or immediately next to railroad tracks. Attempts can be made to reestablish communications with the aircraft. If this is unsuccessful, several flight termination techniques can be used.

If lost link occurs during the launch, the aircraft can continue to its takeoff plan, then follow the lost link procedure. During climb, cruise, and descent, that aircraft can follow the lost link procedure. During landing, the aircraft can continue to follow the preprogrammed landing plan. Should the flight time expire (timer length set by PIC prior to operations) the aircraft can direct itself to a preprogrammed auto-land waypoint. The aircraft can perform a VTOL landing at the auto-land waypoint.

Lost GPS: In the event of a GPS failure, the aircraft reverts to an inertial navigation system (INS). Attitude and heading are maintained. The heading is determined using a magnetometer. The aircraft position estimate is propagated, thus the aircrafts position can drift with error in heading measurement and wind estimate. If the loss of GPS is transient, the autopilot can switch back to GPS guidance upon regaining a GPS signal. If the loss of GPS is sustained, flight termination may be executed.

Flyaway: Airspace boundaries, or geo-fences, can be established. For any situation where the autopilot is still functioning onboard the aircraft, but the aircraft is flying away from its planned course and not responding to commands to return to course (most likely the result of human error in flight planning, human error in lost communication flight planning, etc.), flight termination on airspace boundary violation can lead to a VTOL landing within 20 meters of the boundary.

Aircraft System Failure: A major system failure on the UA is likely to result in a controlled or uncontrolled crash of the aircraft. A VTOL motor failure can typically result in an uncontrolled landing. A failure of the forward flight motor can result in a forced, controlled landing as the HQ system has the ability to automatically transition to hovering flight and land in the event of pusher engine failure. Failure of a single flight control can result in a forced, controlled landing. Failure of multiple flight controls can likely result in an uncontrolled landing.

GCS Failure: In the event of a GCS failure, the aircraft can continue on its programmed flight plan. However, loss of control station functionality can eventually result in loss of command and control link. The aircraft can execute its loss link procedure until communications can be reestablished.

Flight Termination: The flight termination mode can be entered based on any of the following criteria: GPS fail (time out); GPS and C2 Link (time out); airspace violation (based on geofence boundary); min/max altitude violation (limits to prevent excursion above 400 ft. AGL);

In addition to the criteria list above, purposeful flight termination can be performed by the PIC at any time. Upon entering the flight termination mode, the aircraft can automatically perform an emergency VTOL recovery.

Any incident, accident, or any flight operation that transgresses the lateral or vertical boundaries of a flight area or any restricted airspace or warning area as defined by the applicable COA must be reported to the UAS integration office. Accidents and Incidents must be reported to the National Transportation Safety Board (NTSB) in accordance with 49 CFR section 830.5 per instructions contained on the NTSB Web site.

Quarterly after-action reports can document the operations conducted and future planned activities as well as any lessons learned from flight activities, including but not limited to anomalies encountered and effects on airspace and other users (if any). This information can be supplied to the FAA in support of future rulemaking.

To summarize, the following conditions apply to the BVLOS aerial inspection operation: (1) day and night VMC only; (2) launch and recovery: From private property only and not from airports; (3) flight route: cruise at and below 400 ft. above ground level (AGL), typically 350 ft. AGL; directly over privately-owned property only (within a +/−100 ft. lateral boundary from the main track centerline); In Class B, C, D, E and G airspace, but not over airport property; In remote, rural, suburban, and urban areas; bounded by 'geofence'; (4) UAS: hybrid fixed-wing configuration, capable of vertical takeoff and landing (VTOL); 15 hours endurance, 750 NM range; operational history of +475 hours and continuing with an experimental category (SAC-EC) airworthiness certificate; uses autopilot with DoD pedigree, +250,000 hours and continuing; equipped with mode S transponder and ADS-B out (TSO unit can be used if available); equipped with strobe and position lights, high visibility paint scheme; flight termination mode is emergency vertical landing; (5) 91.113: air traffic situation awareness system with fusion of FAA SBS feed and local sensors, moving map display of targets similar to other traffic display systems; (6) Two-way voice communications: enables coordination between pilots and with ATC.

The following hazards could result from this operation: UAS has a Near Mid-Air Collision (NMAC) with manned aircraft; and UAS impacts a person on the ground.

The risk to non-participating persons on the ground exists when a loss of control of the aircraft leads to a landing beyond property. This is mitigated by procedures, visibility enhancement (so that people on the ground might see an object approach them), and several safety features of the UAS including geofence and the flight termination mode, which is designed to execute an emergency vertical landing on private property (the railroad tracks) under a variety of circumstances.

The risk of collision with manned aircraft exists inherently in the National Airspace System. For this assessment, a conservative approach can be taken. The risk of near mid-air collision (NMAC) can be addressed rather than the risk of mid-air collision (MAC). This risk of NMAC increases if the UA makes an excursion from the planned flight route and cruise altitude, or if a manned aircraft is encountered in an unexpected manner (not detected by the air traffic situation awareness system, does not respond to request for coordination via two-way voice communications, maneuvers in erratic or unpredictable ways making the less maneuverable UA unable to avoid). These situations are mitigated by flying at or below 400 ft. AGL where there is less air traffic density. Other mitigations include the air traffic situation awareness system, filing of NOTAMs (and notification and coordination with DoD and other NAS users), and visibility enhancements (so that pilots of manned aircraft might see the UA in flight).

The following describes the safety mitigations used in these BVLOS operations and the model used for assessing the impact of failures of the mitigations to prevent the hazards.

For this risk assessment, a key assumption is that each individual safety mitigation is 100% effective in preventing a hazard under normal operations. If none of these mitigations fail, then no hazards occur. This is a simplifying assumption, used to avoid more complicated modeling of the relative effectiveness of the mitigations and their possible interactions.

Efficacy of CONOPS and crew: The BVLOS CONOPS and crew training have been developed by experienced aviation professionals and the efficacy of these continue to be evaluated under an R&D flight test program. For this risk assessment, it is assumed that the efficacy of the panning behind these operations and the highly trained humans who can execute these plans can fail to prevent a hazard 5% of the time in all airspace classes.

Two-way voice communications: voice communication is an important operational safety mitigation for BVLOS operations. This allows pilots of aircraft to coordinate their activities, even if they do not have visual contact with one another. However, human error is unavoidable. As shown in Table 5, it is assumed that this mitigation may fail at a rate of 25% in all airspace classes. It is also assumed that this mitigation has no effect on the risk of the UAS impacting a person on the ground. Falling debris due to a mid-air collision is not considered.

Air traffic situation awareness system: The ability to "see and avoid" other air traffic in accordance with 14 CFR 91.113 is a critical. The air traffic situation awareness system is not a certified ground-based detect and avoid (GBDSAA) system. It can monitor and display the position and track of cooperative and non-cooperative air traffic. This enables the pilot of the UA to avoid nearby manned air traffic. This capability is important in non-controlled airspace. The rates in Table 5 are estimated under the assumption that this system is more likely to fail to prevent an NMAC in environments where there is likely to be more non-cooperative, low altitude air traffic. Failure rates range from 5% in Class B, C, and D airspace to 20% in Class E and Class G airspace. It is assumed that this mitigation as no effect on the risk of striking a person on the ground.

UAS Mode S transponder with ADS-B: This equipment makes the UA a cooperative aircraft and (along with two-way radio communication) allows the UAS to enter Class B and C airspace per existing regulations. The rates in Table 5 are estimated under the assumption that this system is more likely to fail to prevent an NMAC in environments where there is likely to be more non-cooperative, low altitude air traffic. Failure rates range from 1% in Class B and Class C airspace and 10% in Class D airspace, to 20% in Class E and Class G airspace. It is assumed that this mitigation as no effect on the risk of striking a person on the ground.

Airport loiter points: procedures have been established to enhance safety for locations in proximity to airports. These procedures call for the UA to hold/loiter at locations away from the extended runway centerline and the approach path to runways when manned air traffic is in the pattern or on an instrument approach. These locations are planned and are known to be clear of vertical obstructions. The rates Table 5 are estimated under the assumption that this system is more likely to fail to prevent an NMAC in environments where there is likely to be more noncooperative, low altitude air traffic. Failure rates range from 10% in Class B, Class C, and Class D airspace to 20% in Class E and Class G airspace. It is assumed that this mitigation as no effect on the risk of striking a person on the ground. Falling debris due to a mid-air collision is not considered.

Airspace class specific procedures: procedures have been developed for operations in various classes of airspace. These include hold/loiter points prior to entering/exiting controlled airspace and use of emergency procedures and lost link flight plans tailored to specific locations to account for avoidance of ground population, vertical obstructions, and airport property. Failure rates Table 5 range from 5% in Class B and Class C to 10% in Class D, Class E, and Class G airspace. It is assumed that this mitigation as no effect on the risk of striking a person on the ground. Falling debris due to a mid-air collision is not considered.

Pre-flight checklists: proper execution of pre-flight checks ensures that the system is operating normally, as designed. A fully functioning system is most likely to be effective at preventing both an NMAC and at preventing injury to people on the ground. As shown in Table 5, it is estimated that this mitigation can fail to prevent an NMAC and prevent impact of persons on the ground at a rate of 25% in all airspace classes. Again, this is analogous to assuming that the pilot community is comprised of C students, which is conservative.

Strobe and high visibility paint: The UAS is smaller than a manned aircraft. High visibility paint, strobe, and position lights increase the likelihood that the UAS can be seen by other aviators and by people on the ground, especially at night. For this risk assessment, it is assumed that if visibility enhancements of the UA were to fail, NMAC would not be prevented at a rate of 10% and impact of people on the ground would not be prevented at a rate of 90%. This implies that people on the ground are more likely to see the lighting and paint scheme and take action than are pilots of manned aircraft.

NOTAM: A notice to airmen informs other NAS users of the UA flight activity. This is most likely to prevent an NMAC if the NOTAM is issued in a timely manner and is read and interpreted correctly by other NAS users. For this risk assessment, it is assumed that failure to issue, read, comprehend, and comply or properly use information in a NOTAM is subject to human error and thus can fail to prevent a hazard 25% of the time.

Table 5 below lists the safety mitigations presented above with estimates of the likelihood that a failure of that mitigation will fail to prevent a hazardous outcome.

TABLE 5

Likelihood that Failure of a Safety Mitigation leads to Hazard

| System state | Event | Two-way Voice Comms | Air Traffic Situation awarnesses System | UAS Mode S Transponder with ADSB | Airport Loiter Pixots | Procedures for Class B Airports | Procedures for Class C and Class D airports |
|---|---|---|---|---|---|---|---|
| Class B | NMAC | 25% | 5% | 1% | 10% | 5% | no |
| | Pedestrian Injured | no | no | no | no | no | no |
| Class C | NMAC | 25% | 5% | 1% | 10% | no | 5% |
| | Pedestrian Injured | no | no | no | no | no | no |
| Class D | NMAC | 25% | 5% | 10% | 10% | no | 10% |
| | Pedestrian Injured | no | no | no | no | no | no |
| Class E or G Airport | NMAC | 25% | 20% | 25% | 20% | no | no |
| | Pedestrian Injured | no | no | no | no | no | no |
| Class G | NMAC | 25% | 50% | 25% | 20% | no | no |
| | Pedestrian Injured | no | no | no | no | no | no |

| System state | Event | Procedures for Class E and Class G airports | Pro-flight Checklists | Stroke and High Visibility Paint | NOTAM | Pilot/ Conops Efficacy |
|---|---|---|---|---|---|---|
| Class B | NMAC | no | 25% | 10% | 25% | 5% |
| | Pedestrian Injured | no | 25% | 90% | no | 5% |
| Class C | NMAC | no | 25% | 10% | 25% | 5% |
| | Pedestrian Injured | no | 25% | 90% | no | 5% |
| Class D | NMAC | no | 25% | 10% | 25% | 5% |
| | Pedestrian Injured | no | 25% | 90% | no | 5% |
| Class E or G Airport | NMAC | 10% | 25% | 10% | 25% | 5% |
| | Pedestrian Injured | no | 25% | 90% | no | 5% |
| Class G | NMAC | 10% | 25% | 10% | 25% | 5% |
| | Pedestrian Injured | no | 25% | 90% | no | 5% |

System failures that lead to a loss of control causing the UA to deviate from its planned course are more likely to result in the hazards listed above. These failures and events were developed using knowledge of UAS sub-systems, how they fail, and what occurs when they fail. Failure conditions are listed below along with the resulting deviation from planned course over private property.

For this risk assessment, two key assumptions about system failures are: A single system failure has a 0.01 (1%) chance of occurring; multiple failures have a 0.0001 (0.01%) chance of occurring; Failure rates are per hour.

Flyaway: for any situation where the autopilot is still functioning onboard the aircraft, but the aircraft is flying away from its planned course and not responding to commands to return to course (most likely the result of human error in flight planning, human error in lost communication flight planning, etc.), flight termination on airspace boundary violation can lead to a VTOL landing within 20 meters of the boundary. The maximum deviation is 166 ft.

Ground control system (GCS) Failure: in the event of a GCS failure, the aircraft can continue on its programmed flight plan. However, loss of control station functionality can eventually result in loss of command and control link. The aircraft can execute its loss link procedure that can eventually result in a controlled landing on the rail operator's property. For example, a landing zone is 66 ft. in diameter, which is within the +/−100 ft. corridor of private property.

Lost GPS: In the event of a GPS failure, the aircraft reverts to an inertial navigation system (INS). Attitude and heading are maintained. The heading is determined using a magnetometer. The aircraft position estimate is propagated, thus the aircraft's position can drift with error in heading measurement and wind estimate. If the loss of GPS is transient, the autopilot can switch back to GPS guidance upon regaining a GPS signal. If the loss of GPS is sustained, flight termination may be executed and the deviation is 66 ft.

Lost link: If a loss of the command and control (C2) link occurs, warnings appear on the GCS and are accompanied by repeated audio warnings. This is triggered based on a timeout defined by the pilot and is typically 30 seconds. The autopilot handles a lost link event with a set of parameters that the pilot defines for the given flight mission, including a flight timer which defines the maximum amount of time the aircraft can fly. The flight timer is typically based on loaded fuel quantity or mission requirements. Also defined is a safe lost link location (latitude, longitude, altitude) where the aircraft can fly to via a prescribed set of waypoints called the 'Lost Link Flight Plan'. Once at the lost link location, the aircraft can fly in an orbit at a defined orbit radius until the expiration of the flight timer. If lost link occurs during the launch, the aircraft can continue to its takeoff plan, then follow the lost link procedure. During climb, cruise, and descent, that aircraft can follow the lost link procedure. During landing, the aircraft can continue to follow the preprogrammed landing plan. Should the flight time expire (timer length set by PIC prior to operations) the aircraft can direct itself to a preprogrammed auto-land waypoint. The aircraft can then perform a VTOL landing. The landing zone is 66 ft. in diameter and this is within the +/−100 ft. corridor of private property.

Lost voice communications: voice communication is an important operational safety mitigation for BVLOS operations. The UA cannot enter Class D or C airspace, nor can it launch from within Class D or C airspace without two-way voice communication with ATC. A loss of voice communication with ATC in Class D or C controlled airspace can result in an immediate VTOL recovery of the UA on property at its present location. The UA cannot enter Class E airspace, nor can it launch from within Class E airspace, without two-way voice communication over local CTAF. The UA cannot fly within 2 miles of the approach to any airport without two-way voice communications over CTAF. The landing zone is 66 ft. in diameter and this is within the +/−100 ft. corridor of private property.

Electrical power system distribution failure: There is only one electrical power distribution system, unlike larger transport aircraft that possess redundant electrical power distribution systems. The battery backup precludes some electrical power loss scenarios. Connector and cabling issues that could lead to loss of power distribution should be identified prior to flight via pre-flight and regular maintenance inspections. A total loss of electrical power can cause the autopilot to fail and can kill ignition to the pusher engine. Without power from the forward flight engine and without the ability to receive control inputs, the aircraft, which is statically stable, can glide along a trajectory dictated by the last control surface positions prior to the failure. In the worst case, at a glide ratio of approximately 8:1, the aircraft would continue flight straight ahead for an approximately 3200 linear ft. and then impact the ground.

Inflight computer failure: there is only one flight computer/autopilot. If this computer fails, the forward flight engine would be shut off automatically by what is called the deadman circuit on the power distribution board. This is a safety feature of the autopilot that is connected to the forward flight engine ignition. In the event that the deadman circuit loses a hardware signal from the autopilot, the engine is killed. Without power from the forward flight engine and without the ability to receive control inputs, the aircraft, which is statically stable, can glide along a trajectory dictated by the last control surface positions prior to the failure. In the worst case, at a glide ratio of approximately 8:1, the aircraft would continue flight straight ahead for approximately 3200 linear feet and then impact the ground.

The assumption for this failure scenario is that the inflight computer experiences a “hard” failure where no autopilot function is available. Note that killing the engine prevents a true flyway condition.

A worse-case scenario is one in which some function combination of functions within the flight computer fail in a manner that allows the UA to fly in a controlled manner without being responsive to pilot commands. Here, the UA could fly until fuel is exhausted. The UA has a range of at least 450 NM (27,337,750 feet). The developers of the autopilot are unaware of any occurrence of this failure in the operational history of the unit.

IMU sensor failure: The aircraft has only one IMU and no redundant sensors (gyros, accelerometers). A failure which provides erroneous data can likely result in uncontrolled flight. Emergency VTOL landing may not be possible. System status is monitored during flight. If a sensor failure leads to erratic flight behavior, the pilot can initiate flight termination leading to a crash landing on or near property, though results can vary depending on the sensor failure. For this failure, the deviation is assumed to be 600 ft.

Air data system failure: loss of the air data system can result in inaccurate altitude and airspeed readings. While the aircraft may climb or descend (depending on the failure), it can still remain on its flight path. The aircraft could experience aerodynamic stall due to an erroneously high airspeed reading. In this case, the aircraft can stall and crash near its current location. The alternative is that the airspeed is erroneously low and the aircraft dives for airspeed, colliding with the ground. In either case, lateral navigation is maintained. Loss of air data for any prolonged period can result in an uncontrolled aircraft.

There is a check prior to flight to confirm air speed sensor function to assure availability of this system. Air data system status is monitored during flight. If an air data system anomaly is quickly identified during flight, the aircraft can be landed on rail operator property. The landing zone is 66 ft. in diameter and this is within the +/−100 ft. corridor of private property.

Air traffic situation awareness system failure: loss of the SBS data feed and/or loss of the local sensor network, or a local sensor failure that corrupts the data fusion function can lead to inaccurate display of air traffic which could result in a mid-air collision. The flight crew can monitor the health of the system. This includes monitoring the system indicators, the progression of tracks of cooperative and non-cooperative targets, and the time sync with the system server. If an anomaly is quickly identified during flight, the aircraft can be landed on property. The landing zone is 66 ft. in diameter and this is within the +/−100 ft. corridor of private property.

Propulsion failure: a propulsion system failure with the autopilot still functioning allows the pilot to control the landing. By turning with 20 degrees bank angle, the UA can descend with a turn radius of 665 ft.

Table 6 below summarizes the amount of deviation from the flight path corridor most likely to occur if a single failure happens (the diagonal of the table) and if two failures occur. This information can be used to develop the probabilities in Table 7 below which can be used in Section 6 for determining the risk of the UAS impacting/striking people on the ground.

TABLE 6

Failures and their Resulting Worst-Case Course Deviations in Feet

| | Fly Away | GCS Failure | Lost GPS | Lost Link | Lost Voice | Elec Dist (checklist) | Inflight Computer | IMU Sensor | Air Data | Air Traffic SAS | Propulsion Failure |
|---|---|---|---|---|---|---|---|---|---|---|---|
| Fly Away | 166 | 166 | 166 | 166 | 166 | 3200 | 3200 | 166 | 166 | 166 | 3200 |
| GCS Failure | | 66 | 66 | 66 | 66 | 3200 | 3200 | 100 | 66 | 66 | 665 |
| Lost GPS | | | 66 | 66 | 66 | 3200 | 3200 | 600 | 66 | 66 | 665 |
| Lost Link | | | | 66 | 66 | 3200 | 273 . . . 3750 | 600 | 66 | 66 | 665 |

TABLE 6-continued

| Failures and their Resulting Worst-Case Course Deviations in Feet | | | | | | | | | | | |
|---|---|---|---|---|---|---|---|---|---|---|---|
| | Fly Away | GCS Failure | Lost GPS | Lost Link | Lost Voice | Elec Dist (checklist) | Inflight Computer | IMU Sensor | Air Data | Air Traffic SAS | Propulsion Failure |
| Lost Voice | | | | | 66 | 3200 | 3200 | 600 | 66 | 66 | 665 |
| Elec Dist | | | | | | 3200 | 3200 | 3200 | 3200 | 3200 | 3200 |
| Inflight Computer | | | | | | | 3200 | 3200 | 3200 | 3200 | 3200 |
| IMU Sensor | | | | | | | | 600 | 600 | 600 | 665 |
| Air Data | | | | | | | | | 66 | 66 | 665 |
| Air Traffic SAS | | | | | | | | | | 66 | 665 |
| Propulsion Failure | | | | | | | | | | | 665 |

Using the information developed above, the rate of occurrence of three different magnitudes of deviation incidents are estimated. The first is a deviation of 166 ft, the second is a deviation of 3200 ft, and the third is a longer deviation in which the UAS is considered to be rogue or uncontrolled (flyaway scenario). Any deviation less than a 100 ft. deviation from course is considered to be a normal part of UAS operations.

Table 7 shows the percentages for the occurrences of different deviations based on this analysis. Note that the most likely occurrence, in total, is up to 3200 ft, but greater than 166 ft. However, under a single failure, the UAS is most likely not to experience a deviation at all.

TABLE 7

| Deviation event percentages based on reliability analysis | | | |
|---|---|---|---|
| Deviation Incident | Total Occurrence Percent | Single Failure Occurrence Percent | Multiple Failure Occurrence Percent |
| No deviation (<100 ft) | 33.3% | 72.7% | 25.5% |
| 100-166 ft | 12.1% | 9.1% | 12.7% |
| 167-3200 ft | 53.0% | 18.2% | 60.0% |
| >3200 ft | 1.5% | 0% | 1.8% |

As noted above, it is assumed that a single failure has a 0.01 chance of occurring and that multiple failures have a 0.0001 chance of occurring (that is 1% and 0.01% respectively) per flight hour. Thus, combining these assumptions with the estimates in Table 7, we can estimate the probability of deviating from the prescribed path for the different magnitudes of deviation. These are listed in Table 8.

TABLE 8

| Probability of deviating front the prescribed path for different magnitudes of deviation. | |
|---|---|
| Deviation Incident | Probability of Deviation Incident, $P_{DI}$ |
| 100-166 ft | $9.22 \times 10^{-4}$ |
| 167-3200 ft | $1.88 \times 10^{-3}$ |
| >3200 ft | $1.82 \times 10^{-6}$ |

Based on this analysis, and because of the design of this UAS, shorter deviations are much more likely to occur than larger rogue deviations. Because the probability of a rogue deviation failure is magnitudes below that of the other two, it is ignored it for now. The probability of deviation incident is therefore, $P_{DI}=9.22\times10^{-4}+1.88\times10^{-3}=2.80\times10^{-3}$.

The following section describes the assumptions used in the analysis of near mid-air collision as well as a discussion of the methods for calculating the associated risk.

Key assumptions in this analysis are as follows: (1) Air traffic density is correlated with class of airspace—Class B has the most traffic, then Class C, D, E. Class G has the lowest traffic density. (2) Air traffic density is lower below 400 ft. AGL. (3) Air traffic below 400 ft. is uniformly disturbed within a given class of airspace. (4) Deviation incidents are not accounted for in determining risk of NMAC.

A near midair collision (NMAC) as defined by the AIM (7-6-3) is "an incident associated with the operation of an aircraft in which a possibility of collision occurs as a result of proximity of less than 500 feet to another aircraft, or a report is received from a pilot or a flight crew member stating that a collision hazard existed between two or more aircraft."

For this risk assessment, an NMAC volume is modeled as a sphere around the aircraft. An NMAC occurs if the spheres surrounding two aircraft intersect. The NMAC volume for the UA is a sphere with a 500 ft. radius. Since the UA has a wing span of −15 ft., this sphere encapsulates the UA itself and includes a 500 ft. buffer. The NMAC volume for manned aircraft is a sphere with a 700 ft. radius. Since the wing span of commercial airliners is approximately 200 ft., this encapsulates the largest of manned aircraft and also includes the 500 ft. buffer.

For this risk assessment, it is assumed that air traffic is uniformly disturbed within a given class of airspace. This allows for calculation of the likelihood of collision using a basic geometric (spatial) model. Under this assumption, the airspace is modeled as a collection of grid cells. Within each cell, air traffic is approximated as having a constant density.

It is also assumed that, except for the airspace immediately surrounding airports, the air traffic density is lower for altitudes below traffic pattern altitude (−800 ft. AGL) and even lower at and below 400 ft. AGL due to 14 CFR 91.119.

In reality, there are areas with higher concentrations of aircraft. Aircraft are more likely to follow certain routes (victor airways, IR and VR routes, and direct courses between airports). There is typically higher density near airports, particularly those near more populous areas and those warranting Class C and B airspace designations. However, this variation in the environment can only be accounted for with location specific data which is not readily available and use of more complex modeling.

Table 9 provides estimated frequency of air traffic in different class of airspace in units of aircraft per cubic mile per hour. These values can be used to calculate risk exposure for near mid-air collisions in different class of airspace.

TABLE 9

| Air traffic frequency below 800 ft AGL by airspace class | |
|---|---|
| Airspace Class | 'Near Ground' Frequency (nm^3/hr) (<800 ft AGL) |
| Class B | 50 |
| Class C | 30 |
| Class D | 15 |
| Class E | 10 |
| Class G | 5 |
| US Average | 0.68[1] |

Figure 12:
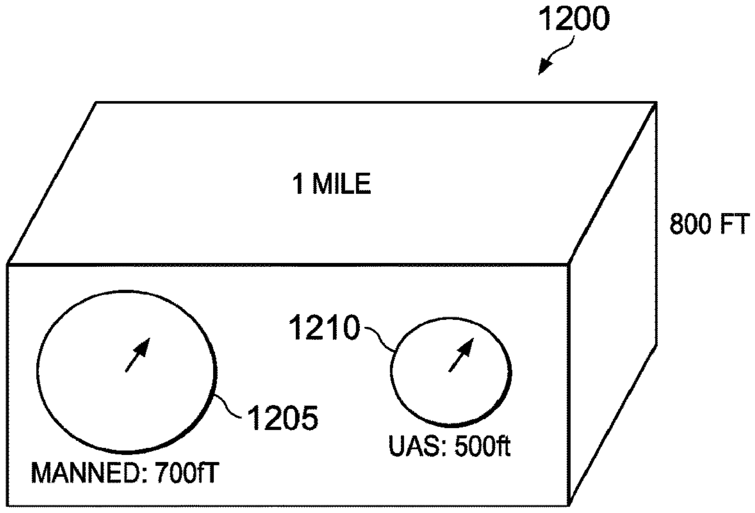
FIG. 12 illustrates an exemplary unmitigated near mid-air collision risk according to the various embodiments of the present disclosure.

FIG. 12 illustrates an exemplary unmitigated near mid-air collision risk 1200 according to the various embodiments of the present disclosure. The embodiment of the unmitigated near mid-air collision risk 1200 shown in FIG. 12 is for illustration only. Other embodiments of the unmitigated near mid-air collision risk could be used without departing from the scope of this disclosure.

The frequency of air traffic within a one cubic nautical mile (per hour) is applied to a cell that is 1 nm by 1 nm by 800 ft. This area reduction makes the air traffic density values conservative. Near mid-air collisions occur when either aircraft violates the NMAC volume of the other. To estimate this probability, a Monte Carlo simulation was performed in which one billion pairs of random points were selected within an airspace cell as shown in FIG. 12. The rate at which the distance between these pairs of points was less than 700 ft. was calculated. The criteria founded for NMAC was met at a rate of 39%. This value, $3.9\times10^{-1}$ can be referred to as the geometric risk for NMAC. This represents the unmitigated risk of near mid-air collision for all classes of airspace.

It should be noted that this is a very conservative estimate. It is assumed that an NMAC event can occur at all instances less than 1,200 ft. (less than 500 ft. is a dual NMAC event). However, in reality, aircraft positions follow trajectories, so any value below 1,200 ft. would have already triggered an NMAC event for the manned aircraft. This is an artifact of Monte Carlo simulation.

Again, a key assumption of this risk assessment is that the safety mitigations employed for these operations are completely effective. If none of them fail, then an NMAC does not occur. A worst-case scenario is one in which all of the possible mitigation system failures occur under the assumptions in Table 5. Table 10 below presents the probability of NMAC for different classifications of airspaces using the values and exposure assumptions from above.

TABLE 10

| Probability of NMAC for Airspace Classifications | |
|---|---|
| Airspace Class | $P_{NMAC}$ |
| Class B | $3.81\times10^{-9}$ |
| Class C | $2.29\times10^{-9}$ |
| Class D | $2.29\times10^{-8}$ |
| Class E | $3.05\times10^{-7}$ |
| Class G | $3.81\times10^{-7}$ |

Figure 13:
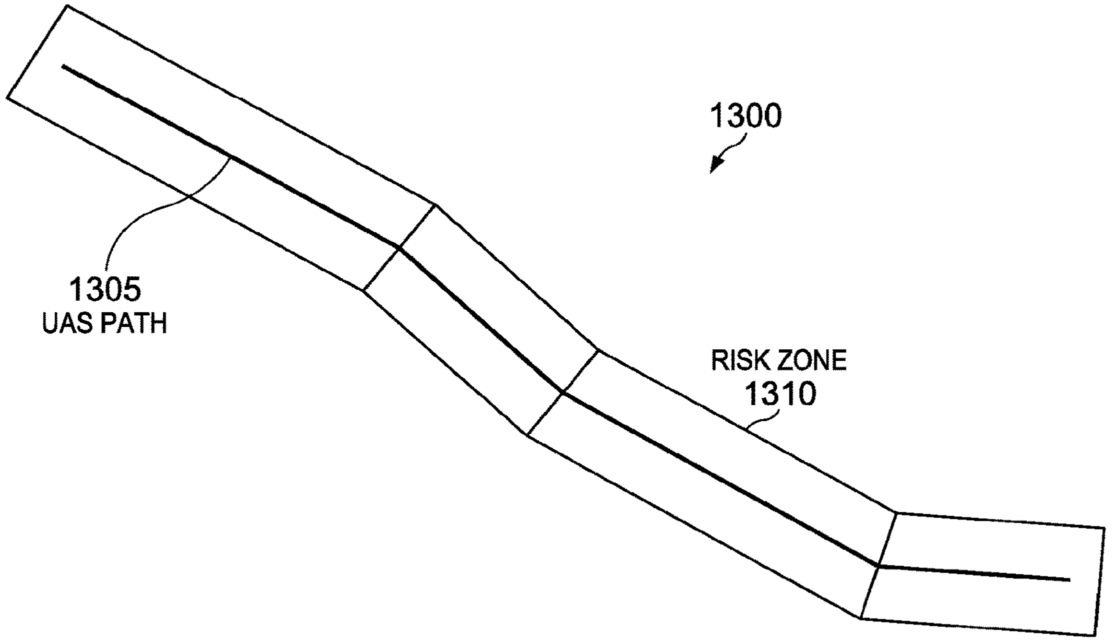
FIG. 13 illustrates an exemplary pedestrian risk zone according to the various embodiments of the present disclosure.

FIG. 13 illustrates an exemplary pedestrian risk zone 1300 according to the various embodiments of the present disclosure. The embodiment of the pedestrian risk zone 1300 shown in FIG. 13 is for illustration only. Other embodiments of the pedestrian risk zone could be used without departing from the scope of this disclosure.

The following section describes the assumptions used in the analysis of impacting persons of the ground as well as a discussion of the methods for calculating the associated risk.

Key assumptions in this analysis are as follows: (1) all people on the ground are unsheltered. (2) Ground population is correlated to class of airspace—Class B lies in metro areas, Class C lies in urban areas, Class D in suburban areas, Class E and G are in rural areas. (3) Ground population is uniformly disturbed within a given class of airspace. (4) Any individual who is on the rail road tracks is an active participant in the operation. Trespassers are not treated as a special case—they are engaged in unlawful activity and have accepted associated risks. (5) Humans at road crossings are assumed to be unsheltered and are accounted for in the uniform distribution of population density. This is conservative. (6) Course deviation incidents are accounted for in determining risk to persons on the ground.

For this risk assessment, it is assumed that population is uniformly disturbed within a given class of airspace. This allows for calculation of the likelihood of collision using a basic geometric (spatial) model. Given the flight path of the UAS operation, a ground risk zone is modeled on either side of the path as shown in FIG. 13. The length of each zone segment is 1 mile and the width is determined by the gliding capabilities of the UAS. In certain embodiments, the UA can glide 3,200 ft. from a starting altitude of 400 ft. AGL. The geometric risk to a pedestrian per mile is the ratio of the area of a typical human to the area of the segment in question. For the calculation, the area of a human (as seen from above) is assumed to be 2.25 square feet. The resulting geometric risk value is $6.66\times10^{-8}$ per segment.

Given a flight route, population densities along the route can be estimated in the area directly adjacent to the path. For this risk assessment, the population density associated with different classes of airspace has been estimated based on example census data for representative areas. Table 11 lists these population estimates.

TABLE 11

| Assumed population per segment by airspace classification | |
|---|---|
| Airspace Class | Population Per Segment |
| Class B | 10,000 |
| Class C | 1,000 |
| Class D | 100 |
| Class E | 10 |
| Class G | 1 |

Considering the worst-case scenario where all mitigation systems fail, the calculated probability of striking a human for different airspace classes with assumed populations per segment, for the values of assumed population, is given in Table 12. These values are the population density of a segment is applied to the geometric risk and reflect the magnitude of the unmitigated risk of striking a human. A more accurate analysis would use portions of census block data (or data from another source such as a land scan) collected along a specific flight path.

TABLE 12

Geometric Risk to Persons on the Ground for Airspace Classifications

| Airspace Class | Unmitigated Risk to Pedestrians |
|---|---|
| Class B | $6.66 \times 10^{-4}$ |
| Class C | $6.66 \times 10^{-5}$ |
| Class D | $6.66 \times 10^{-6}$ |
| Class E | $6.66 \times 10^{-7}$ |
| Class G | $6.66 \times 10^{-8}$ |

A key assumption of this risk assessment is that the safety mitigations employed for these operations are completely effective. If none of them fail, then a NMAC does not occur. A worst-case scenario is one in which all of the possible mitigation system failures occur under the assumptions in Table 5. Table 13 below presents the probability of striking a person on the ground for different classifications of air-spaces using the values and assumptions from above.

TABLE 13

Mitigated Risk to Persons on the Ground by Airspace Classification

| Airspace Class | $P_{SH/DI}$ |
|---|---|
| Class B | $7.49 \times 10^{-6}$ |
| Class C | $7.49 \times 10^{-7}$ |
| Class D | $7.49 \times 10^{-8}$ |
| Class E | $7.49 \times 10^{-9}$ |
| Class G | $7.49 \times 10^{-10}$ |

It is assumed that the probability of striking a human on the ground is also dependent also on an incident occurring. The UAS may not strike a non-participating human unless it deviates from its course. Thus, methods of assessing the reliability of the UAS, beyond the discussed mitigation systems, must be developed. In general, this is a difficult task because either there is very limited data, or no data exists, to make an accurate assessment of UAS component reliability. As such, estimates must be made.

Thus, we can now calculate $P_{SH}=P_{SH/DI}\ P_{DI}$, where $P_{DI}$ was defined above herein, and present Table 14 to include the probability of deviation incident.

TABLE 14

Probability of striking a human by airspace classification given a deviation incident

| Airspace Class | $P_{SH}$ |
|---|---|
| Class B | $4.19 \times 10^{-9}$ |
| Class C | $4.19 \times 10^{-9}$ |
| Class D | $4.19 \times 10^{-9}$ |
| Class E | $4.19 \times 10^{-9}$ |
| Class G | $4.19 \times 10^{-9}$ |

Some estimates suggest that the inherent risk of NMAC for General Aviation VFR flight in the NAS is approximately $1.33\times10^{-7}$ per hour. This risk assessment, which has used conservative assumptions, indicates that the proposed BVLOS operation is on the order of the existing level of risk and may not substantially increase risk in the NAS.

Estimates of risk of death by being hit by any falling object are approximately $1.44\times10^{-9}$ per hour ($3\times10^{-6}$ per year)[2]. This risk assessment, which has used conservative assumptions, indicates that the proposed BVLOS operation may not substantially increase risk to persons on the ground. Table 15 provides a summary of the operational risk analysis.

TABLE 15

Summary of Operational Risk Analysis

| Airspace Class | Probability of NMAC between UAS and Manned Aircraft (per hour) | Probability of the UAS Impacting Humans on the Ground (per hour) |
|---|---|---|
| Class B | $3.81 \times 10^{-9}$ | $4.19 \times 10^{-9}$ |
| Class C | $2.29 \times 10^{-9}$ | $4.19 \times 10^{-10}$ |
| Class D | $2.29 \times 10^{-8}$ | $4.19 \times 10^{-11}$ |
| Class E | $3.05 \times 10^{-7}$ | $4.19 \times 10^{-12}$ |
| Class G | $3.81 \times 10^{-7}$ | $4.19 \times 10^{-13}$ |

Figure 14:
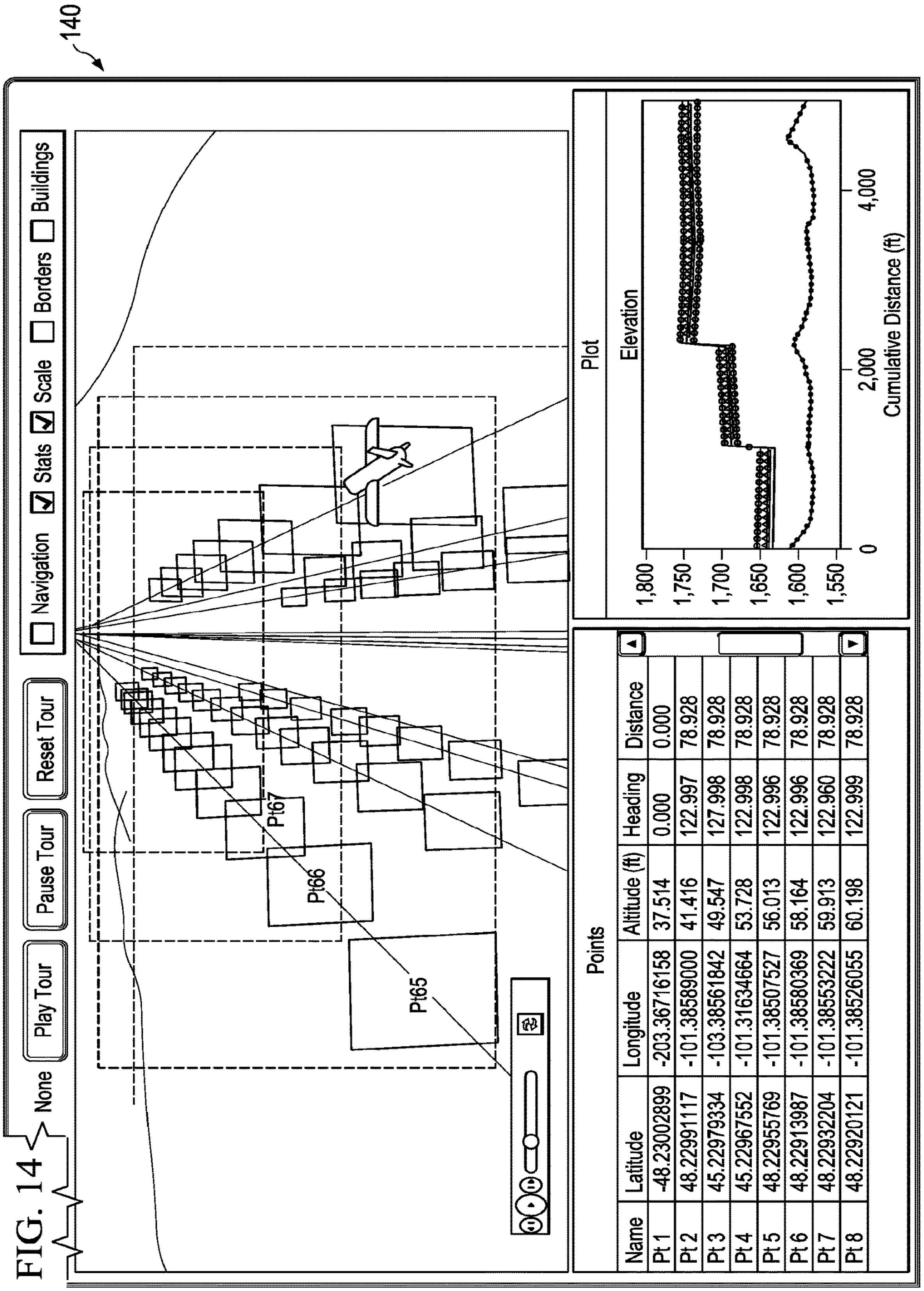
FIG. 14 illustrates an exemplary safe corridor airspace (SCA) interface according to the various embodiments of the present disclosure.

FIG. 14 illustrates an exemplary safe corridor airspace (SCA) interface 1400 according to the various embodiments of the present disclosure. The embodiment of the SCA interface 1400 shown in FIG. 14 is for illustration only. Other embodiments of the SCA interface 1400 could be used without departing from the scope of this disclosure.

Figure 15A:
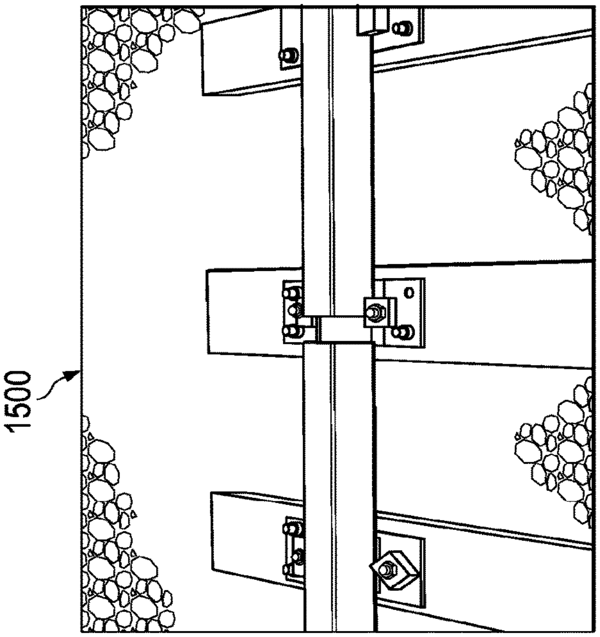
FIGS. 15A, 15B, and 15C illustrate exemplary faulty rail conditions according to the various embodiments of the present disclosure.
Figure 15B:
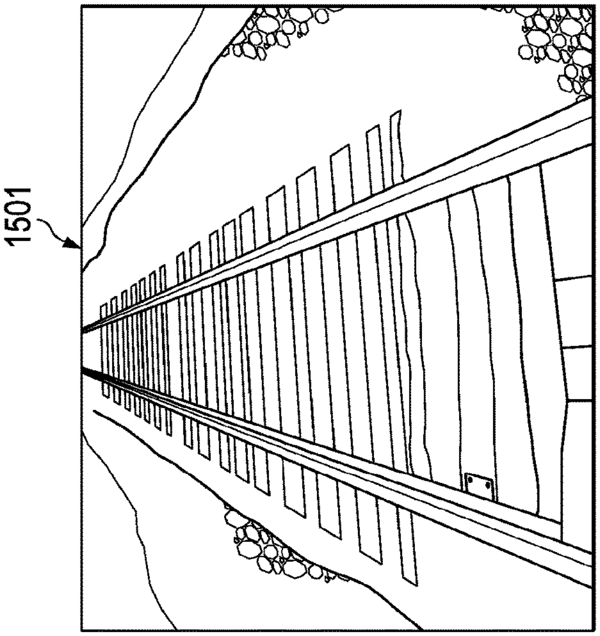
Figure 15C:
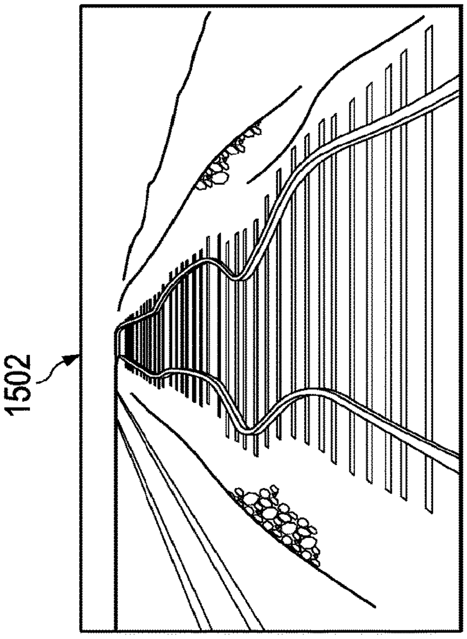

FIGS. 15A, 15B, and 15C illustrate exemplary faulty rail conditions 1500, 1501, and 1502 according to the various embodiments of the present disclosure. The embodiments of the faulty rail conditions 1500, 1501, and 1502 shown in FIG. 15 are for illustration only. Other embodiments of the faulty rail conditions 1500, 1501, and 1502 could be used without departing from the scope of this disclosure.

Faulty condition 1500 is called a broken rail or rail gap. Faulty condition 1500 is caused by rapid cooling is an area that pulls the rail apart.

Faulty condition 1501 is called a fouled ballast. Faulty condition 1501 is caused by mud buildup on rail ties. The fouled ballast causes erosion of the base of the rails and ties. Because the ballast takes the force of the train from the rail, the mud buildup causes the ballast to provide less forgiveness of the rail. The lack of forgiveness causes stress to components of the rail, such as rail ties, and potentially could loosen or come off the rail. The fouled ballast can be determined when a prevalence of new non-ballast appears in the image or that the ties are covered.

Faulty condition 1502 is called a curved rail, wavy rail, or misaligned rail. Faulty condition 1502 is caused by sever movement of the rail due to rapid heating. The rail expands an amount due to heat that causes the rail to push out. The expansion of the rails causes deviations in measurements between the rails.

The faulty conditions 1500, 1501, and 1502 can be detected by comparing the image to an image of the previous rail and also by comparing the image to an image or series of images of the rail taken previously.

All of the faulty conditions 1502 are analyzed for changes in pixel coloring, pixel density, and amount of pixels between components indicating a distance, etc. A changed is identified when one of the changes occurs between successive images in a single flight and also identified when one of the changes occurs in images of the same rail from different UAV flights.

The faulty conditions can also be detected based on specific measurements. For example, one standard for rail width is 1435 mm (4 ft 8.5 in). In this embodiments, when the image taken shows that the rail deviates from 1435 mm, a curved rail faulty condition 1502 is detected.

In order to avoid false detects or non-substantial detections, a threshold can be assigned for each faulty condition 1500, 1501, and 1502. For example, one standard for a gap between successive rails is 14.30 mm. For the purposes of including tolerance, a gap threshold could be 14.50 mm. When a gap is detected less than the 14.50 mm, the system would not identify a gap.

Also, the system could identify a length of each rail and use that to validate different gaps. For example, one standard rail length is 39 ft. For this length rail, the system can use the gap threshold in a range that would correspond to each rail. In the embodiment of the 39 ft. rail, the system could use the gap threshold to account for gaps between rails, but use a much smaller gap threshold between the ranges. For example, the system would use 5 mm as a gap threshold for a distance from an end of the rail greater than 1 ft. and use a 15 mm gap threshold for a distance for an end of the rail equal to or less than 1 ft.

The system also makes determination or fault based on the criticality of the fault. Certain faults can be deemed as critical or cautionary. Critical faults are faults that could potential derail or damage a train or significantly impede the train's movement. Cautionary faults are faults that require maintenance, but do not pose a risk for derailment, damage or significant impediment of the train.

Figure 16:
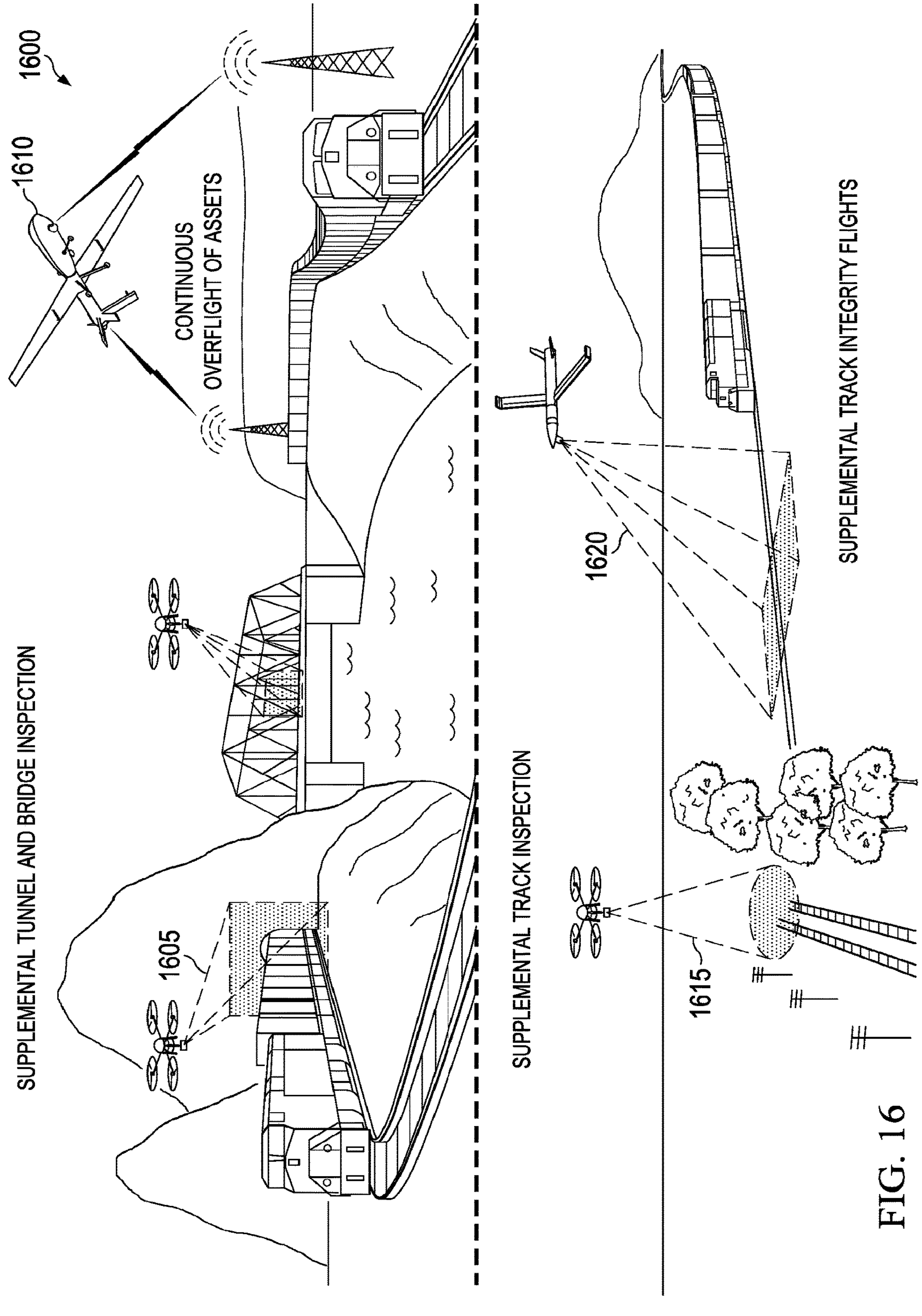
FIG. 16 illustrates an exemplary concept of operations according to the various embodiments of the present disclosure.

FIG. 16 illustrates an exemplary concept of operations 1600 according to the various embodiments of the present disclosure. The embodiment of the concept of operations 1600 shown in FIG. 16 is for illustration only. Other embodiments of the concept of operations 1600 could be used without departing from the scope of this disclosure.

Different concepts of operations 1600 includes, but are not limited to, supplemental tunnel and bridge inspection 1605, continuous overflight of assets 1610, supplemental track inspection 1615, and supplement track integrity flights 1620.

Figure 17:
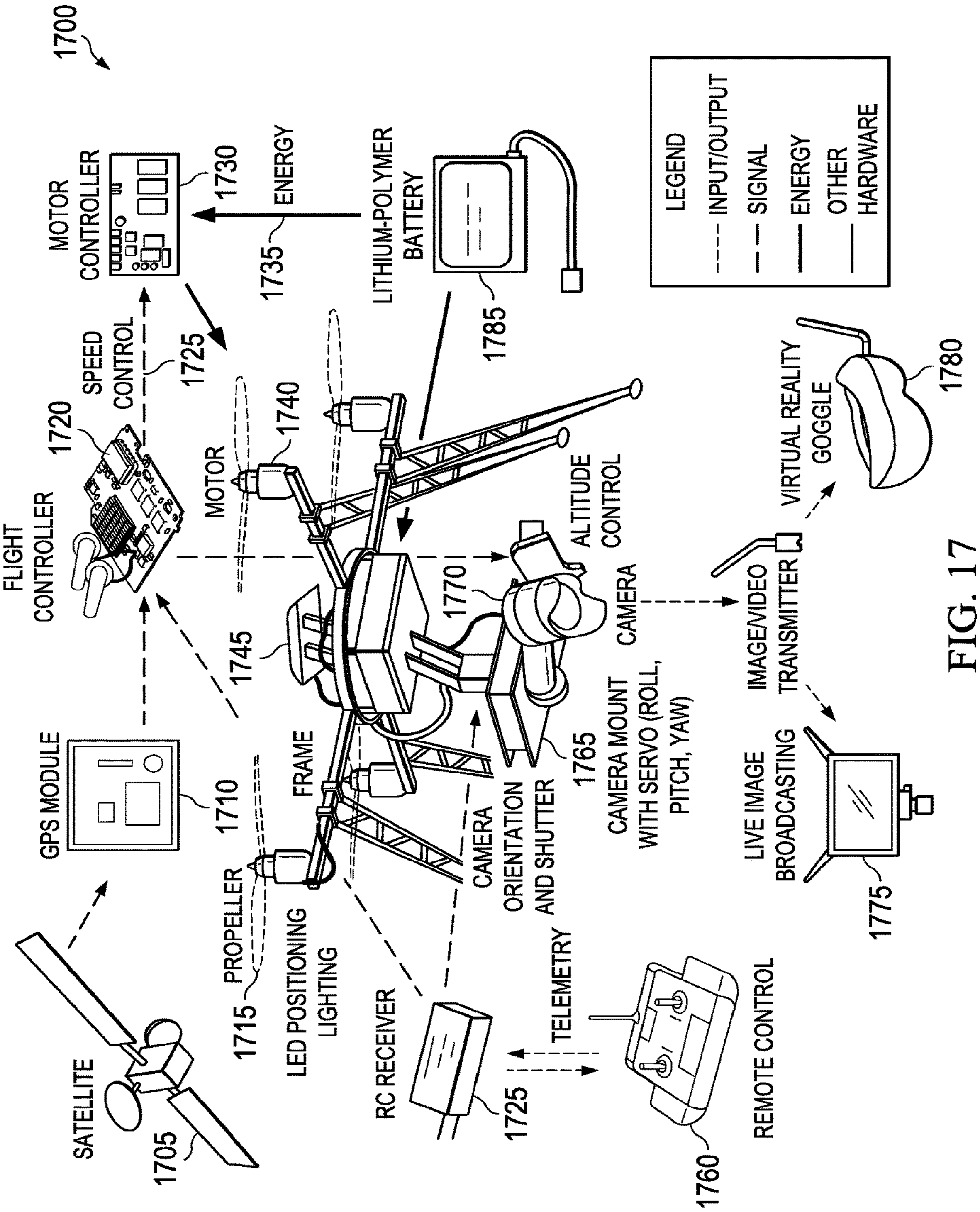
FIG. 17 illustrates an exemplary UAS ecosystem according to the various embodiments of the present disclosure.

FIG. 17 illustrates an exemplary UAS ecosystem 1700 according to the various embodiments of the present disclosure. The embodiment of the UAS ecosystem 1700 shown in FIG. 17 is for illustration only. Other embodiments of the UAS ecosystem 1700 could be used without departing from the scope of this disclosure.

The UAS ecosystem includes satellites 1705, GPS modules 1710, propeller 1715, flight control 1720, motor controller 1730, motor 140, frame 1745, LED positioning lighting 1750, RC receiver 155, remote controller 1760, camera mount 1765, camera 1770, live image broadcasting 1775, virtual reality goggle 1780, lithium-polymer battery 1785, etc.

Satellites 1705 allow communication between the UAS and flight control center.

A GPS module 1710 is a device capable of receiving location information from a GPS satellite. The GPS module is used for both tracking of the UAS and for the UAS to follow the programmed flight plan.

A propeller 1715 is rotably coupled to the UAS and provides the lift to the UAS. The propellers are used for takeoff and landing purposes. The UAS can include a plurality of propellers.

A flight control 1720 includes the programming for the flight plan for the takeoff and landing of the UAV. The flight control 1720 is installed in the UAS. The flight control 1720 controls the propellers according to the flight plan.

A motor controller 1730 is included in the UAS. The motor controller 1730 controls the motor 140 for A motor 140 provides forward thrust for the UAS. The UAS can include more than one motor 140.

A frame 1745 of the UAS provides the support and protection for the components of the UAS. The frame 1745 is structured in a manner that the UAS can continue to glide upon failure of the thrust or lift components or systems.

LED positioning lighting 1750 is installed on the UAS. The LED positioning lighting 1750 provide indication of the UAS to other aircrafts and identify the location of the UAS. The LED positioning lighting is also beneficial for low visibility environments, such as tunnels, fog, nighttime, etc.

An RC receiver 1755 is a wireless receiver built into the UAS. The RC receiver can communicate with towers or other satellites to receive signals. The command center transmits signals to the UAS through the RC receiver 1755.

A remote controller 1760 is installed in the frame 1745 of the UAS or communicates through the RC receiver 1755. The remote controller 1760 can be loaded with the flight plan before the flight occurs, or can receive an updated flight plan or be controller through the RC receiver 1755.

Camera mount 1765 is used to mount camera 1770. The camera mount 1765 provides support for the camera 1770. The camera mount 1765 can be attached to the base of the frame 1745.

Camera 1770 is used to capture image and video data in the rail system. More than one camera and different types of cameras can be attached to the UAS.

The camera 1770 is used to identify networks of rail roads for monitoring. The images of the railroads can also be used to regulate the flight plan. In other words, if the images do not confirm the location of the UAV from the flight plan, the flight plan can be adjusted. The UAV could also send a discrepancy indication to the command center indicating the difference in determined location from the flight plan or sensors versus the determined location from the image.

The camera 1770 is also used to identify faults in the rail system. The camera 1770 can detect an obstruction of the rail, such as a car stalled or parked on the tracks, trash or other debris, etc. In detecting the faults, the camera 1770 can be used to capture images of the rail that are analyzed for broken rail/rail gap 1500, fouled ballast 1501, curved rail 1502, etc.

Live image broadcasting 1775 is performed using the camera 1770 and the RC receiver 1755. The images/frame captured by the camera 1770 can be broadcast, such as to the command center. The live image broadcast can provide real-time image or video for a user to further analyze a fault situation.

Virtual reality goggle 1780 can be used by an operator on the ground or at the command center. The virtual reality goggles can display the live image broadcasting 1775 from the camera 1770.

Lithium-polymer battery 1785 is built into the frame 1745 of the UAS. The battery 1785 can be used to power the different components of the UAS.

Figure 18:
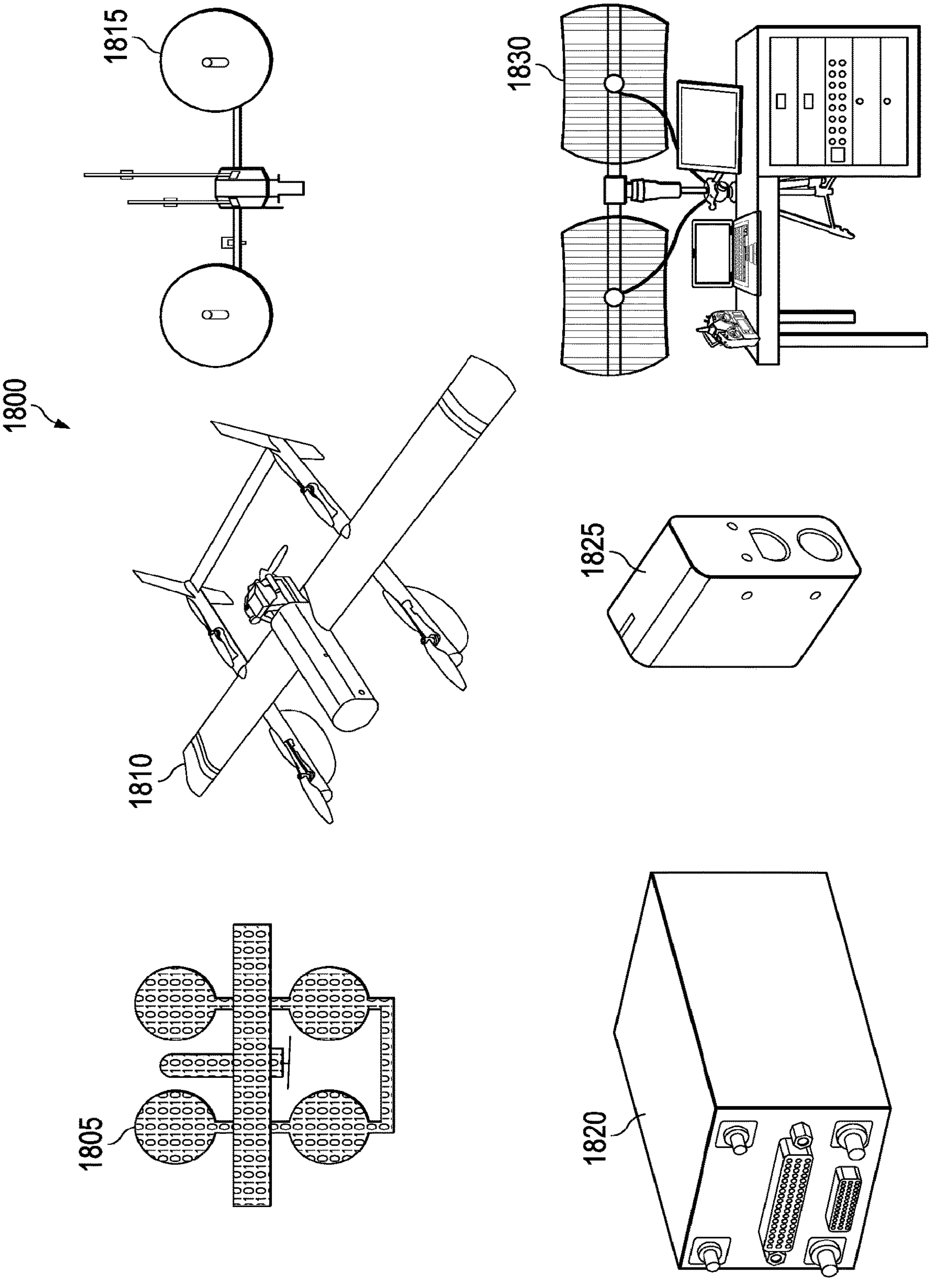
FIG. 18 illustrates an exemplary UAS system components according to the various embodiments of the present disclosure.

FIG. 18 illustrates an exemplary UAS system components 1800 according to the various embodiments of the present disclosure. The embodiment of the UAS system components 1800 shown in FIG. 18 is for illustration only. Other embodiments of the UAS system components 1800 could be used without departing from the scope of this disclosure.

The UAS system components 1800 include, but are not limited to, software 1805, UAS 1810, tracker control module 1815, autopilot 1820, laser altimeter above ground sensor 1825, rack mount ground control station 1830, etc.

Software 1805 can be installed in the UAS and at the command center. The software 1805 can perform any of the described functions in this application.

UAS 1810 is the unmanned aerial system. The UAS flies over the rail system to monitor the health of the tracks. The UAS also monitors the rail for obstructions.

Tracker control module 1815 tracks the UAS during the operation. The tracker control module 1815 can include the flight plan and detect when the UAS is deterring from the flight plan. The tracker control module 1815 can update the flight plan, determine an issue with the UAS itself, or indicate an alarm to a user at the command center.

Autopilot 1820 controls the UAS 1810. The autopilot 1820 can be installed in the UAS or on the ground and transmit the instructions through the RC receiver.

Laser altimeter above ground sensor 1825 determines the altitude of the UAS 1810. The laser altimeter 1825 is in communication with the command center.

Rack mount ground control station 1830 The rack mount ground control station 1830 provides for a command center for the UAS 1810. The control station 1830 can control the flight plan of the UAS and monitor the UAS while performing the flight plan.

Figure 19A:
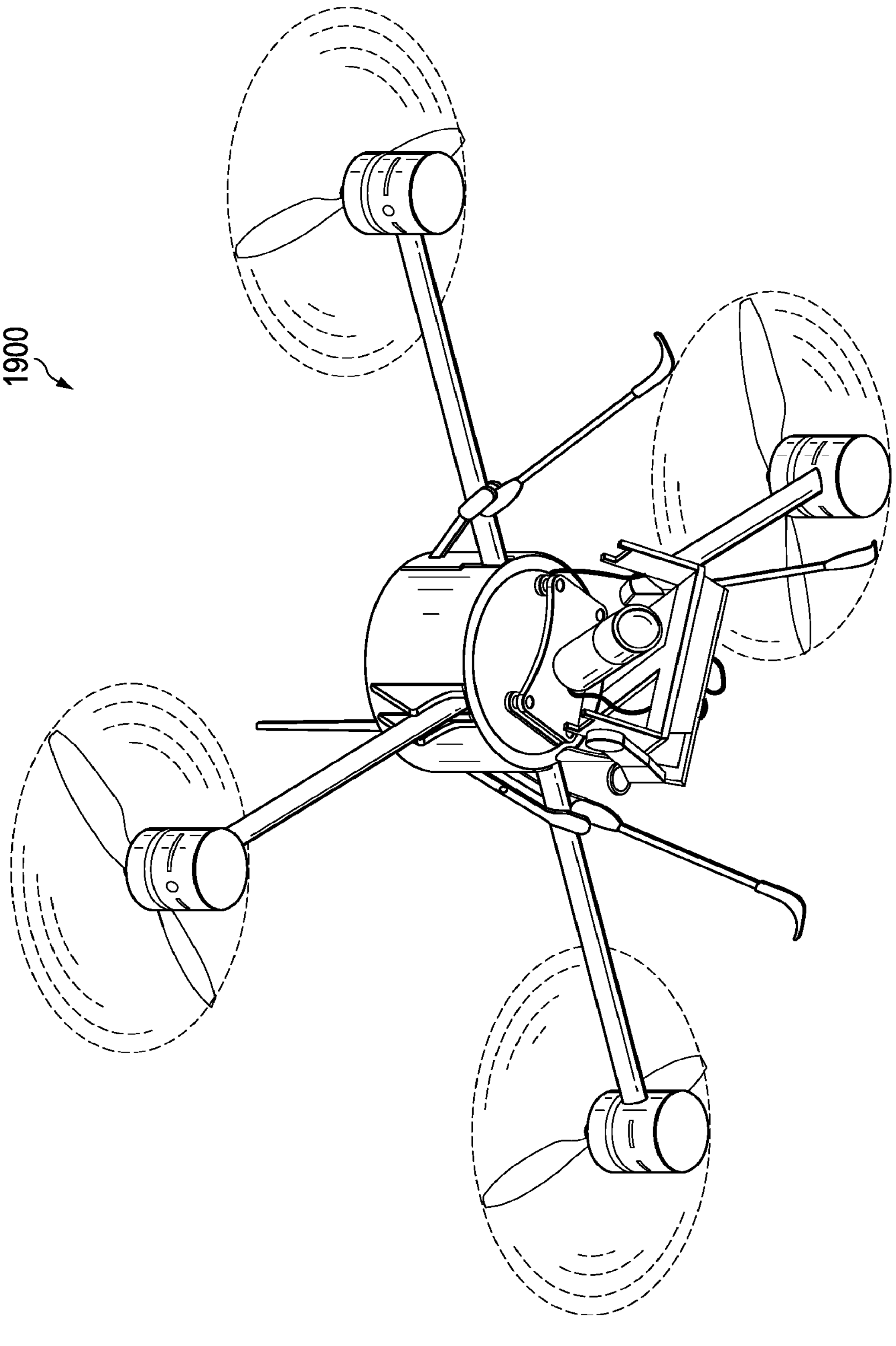
FIGS. 19A, 19B, and 19C illustrate exemplary UASs according to the various embodiments of the present disclosure
Figure 19C:
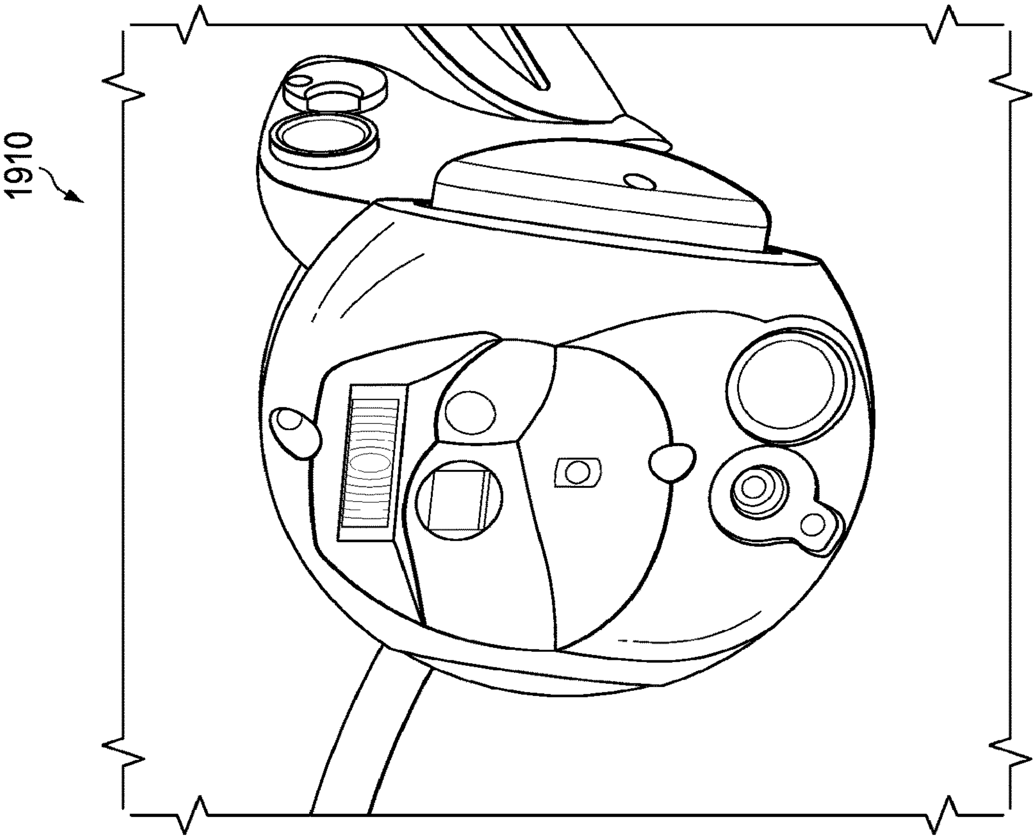
Figure 19B:
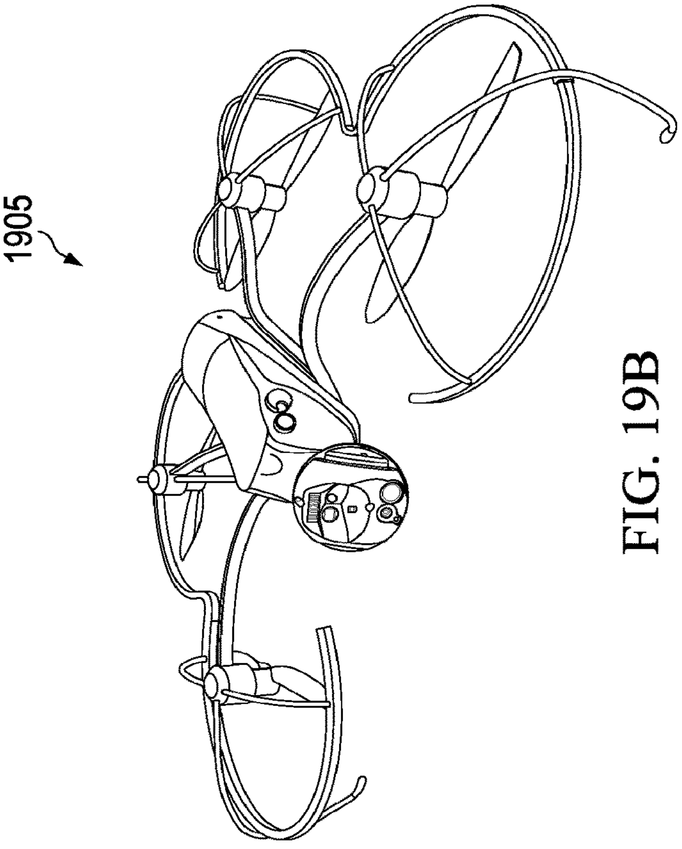

FIGS. 19A, 19B, and 19C illustrate exemplary UASs 1900, 1905, 1910 according to the various embodiments of the present disclosure. The embodiment of the UASs 1900, 1905, 1910 shown in FIG. 19 is for illustration only. Other embodiments of the UASs could be used without departing from the scope of this disclosure.

Figure 20:
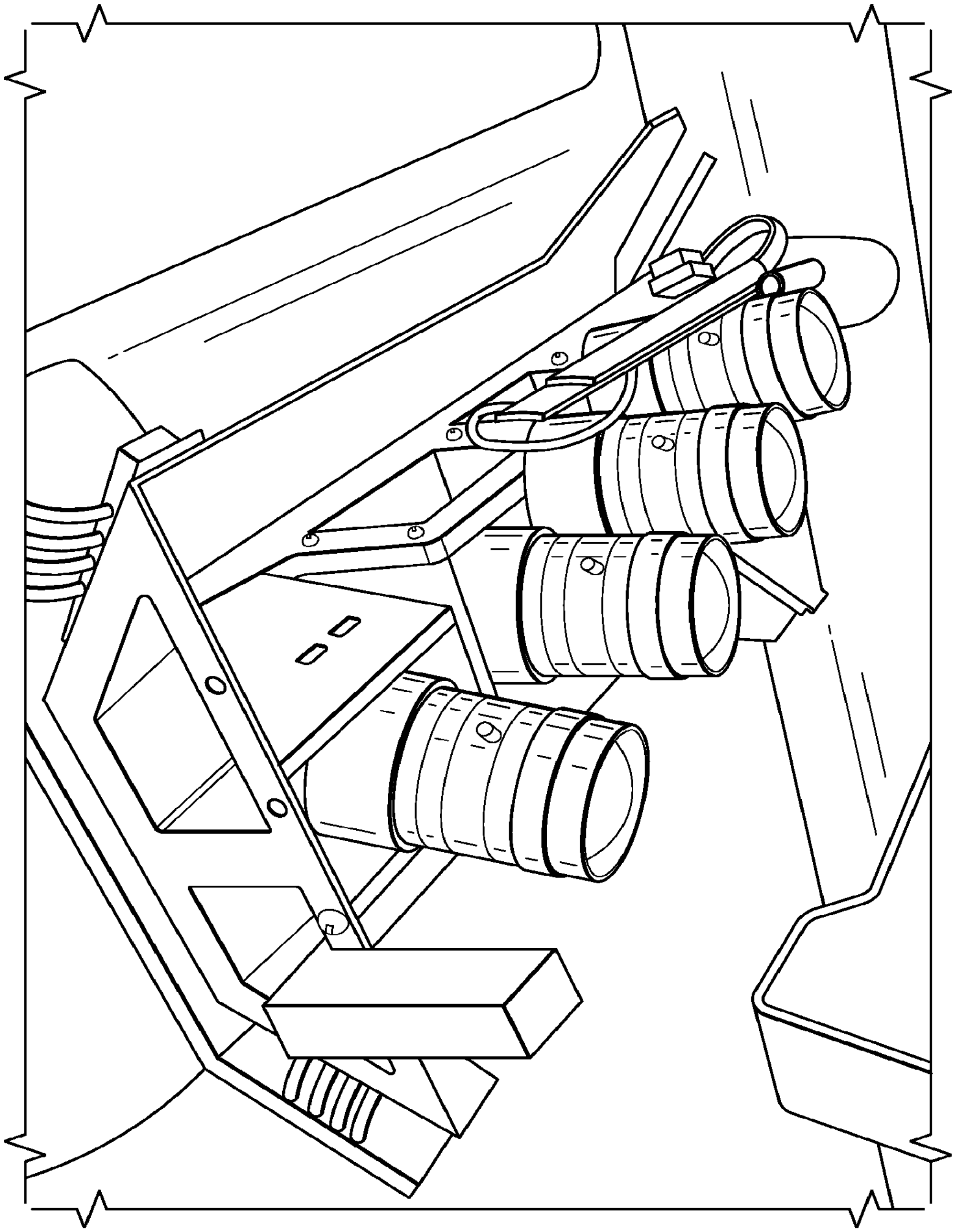
FIG. 20 illustrates an exemplary optical sensor according to the various embodiments of the present disclosure.

FIG. 20 illustrates an exemplary optical sensor 2000 according to the various embodiments of the present disclosure. The embodiment of the optical sensor 2000 shown in FIG. 20 is for illustration only. Other embodiments of the optical sensor 2000 could be used without departing from the scope of this disclosure.

Figure 21A:
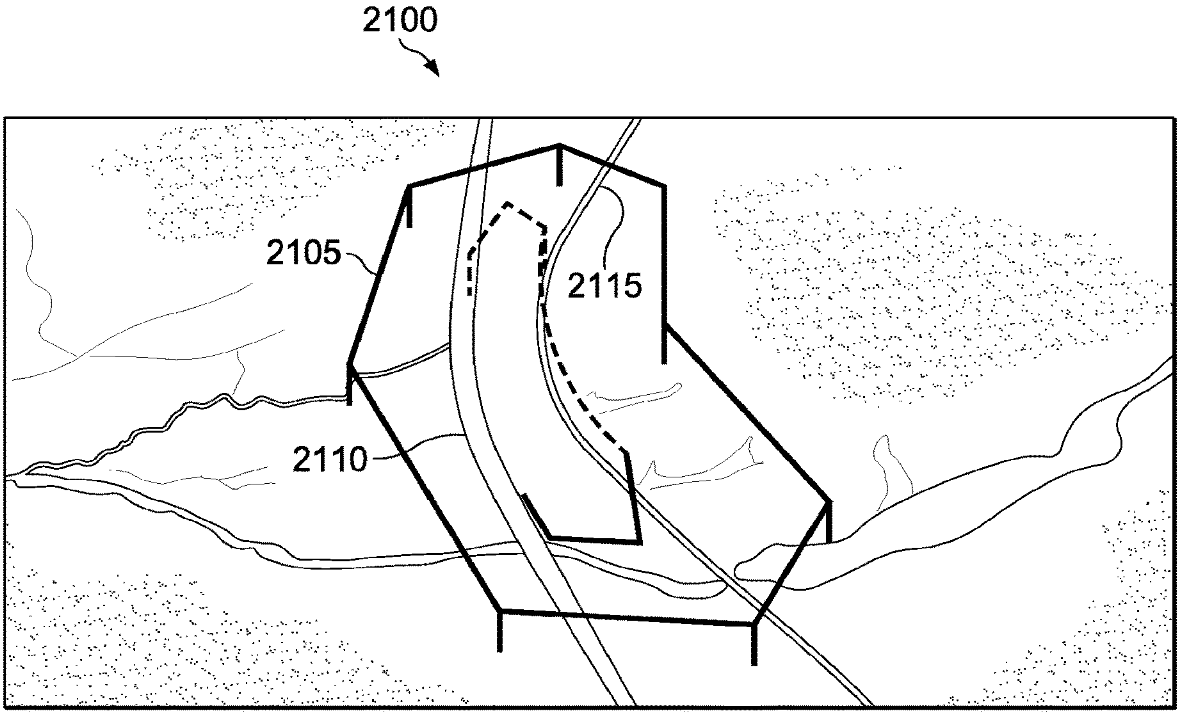
FIGS. 21A and 21B illustrate an exemplary UAS safety boundaries according to the various embodiments of the present disclosure.
Figure 21B:
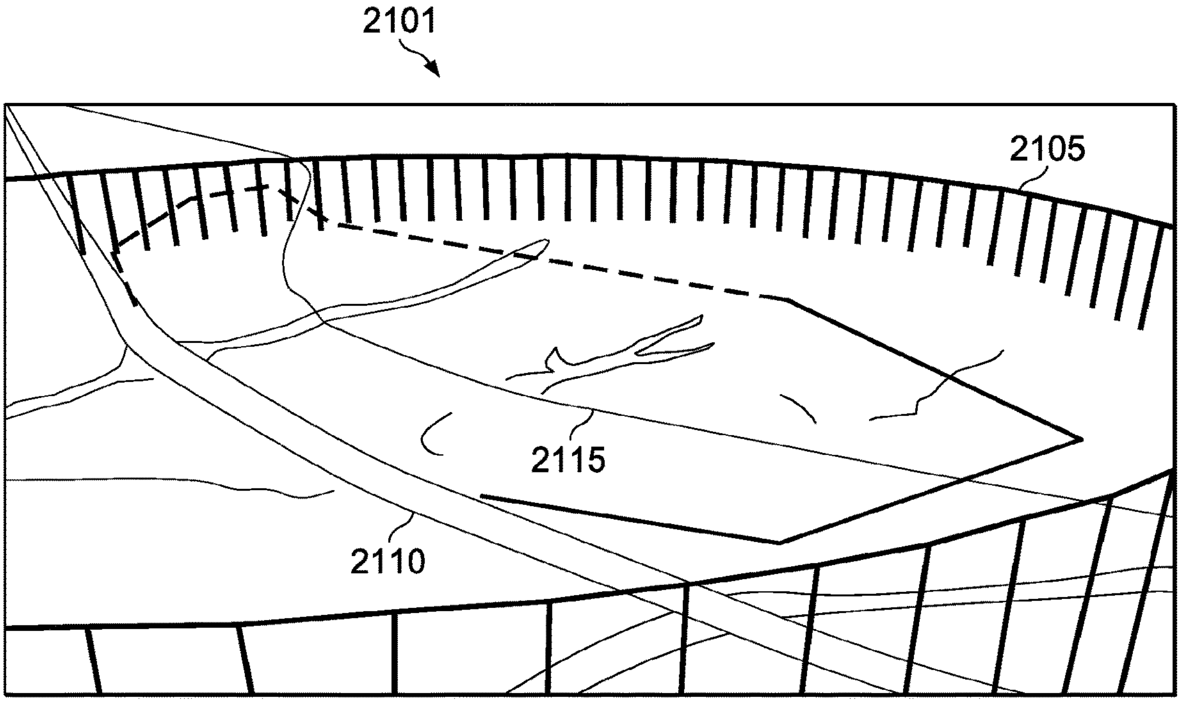

FIGS. 21A and 21B illustrate exemplary UAS safety boundaries 2100 and 2101 according to the various embodiments of the present disclosure. The embodiment of the UAS safety boundaries 2100 and 2101 shown in FIGS. 21A and 21B are for illustration only. Other embodiments of the UAS safety boundaries could be used without departing from the scope of this disclosure.

Figure 22A:
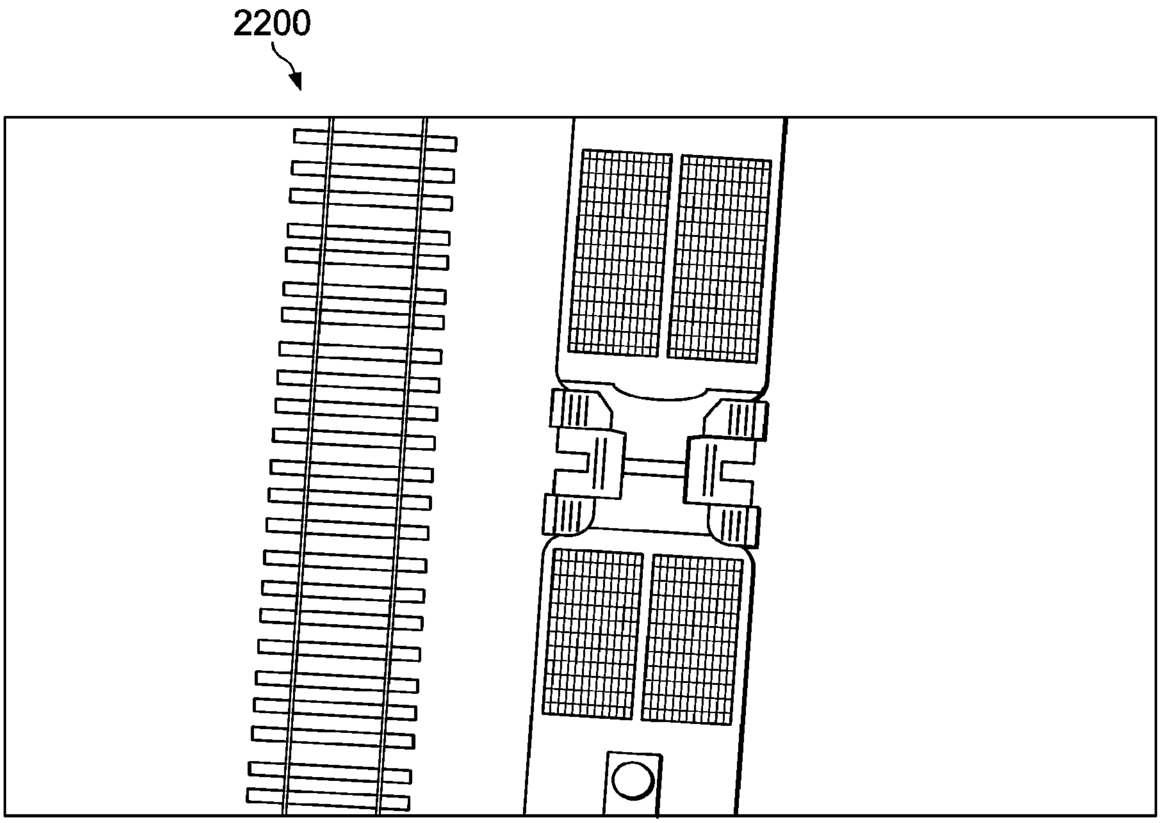
FIGS. 22A and 22B illustrate exemplary track integrity sensor images according to the various embodiments of the present disclosure.
Figure 22B:
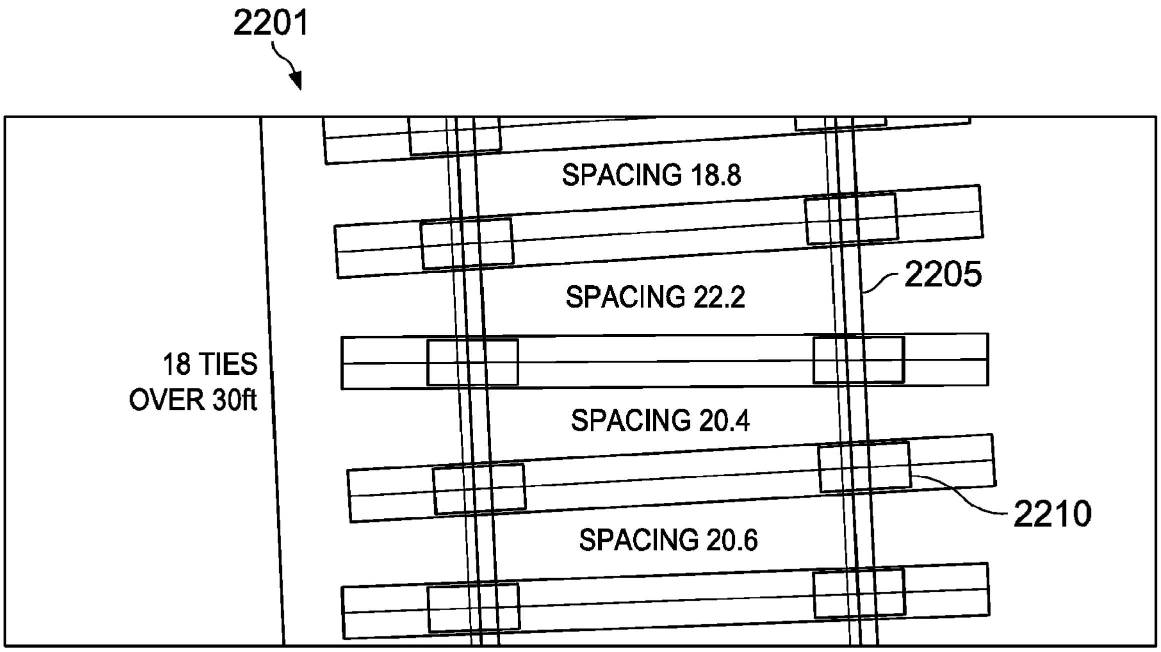
Figure 23A:
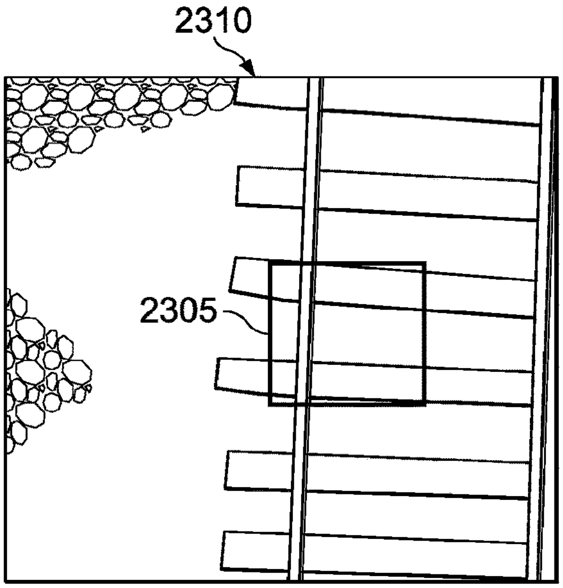
FIGS. 23A, 23B, 23C, and 23D illustrate an exemplary UAS potential rail head defect according to the various embodiments of the present disclosure.
Figure 23B:
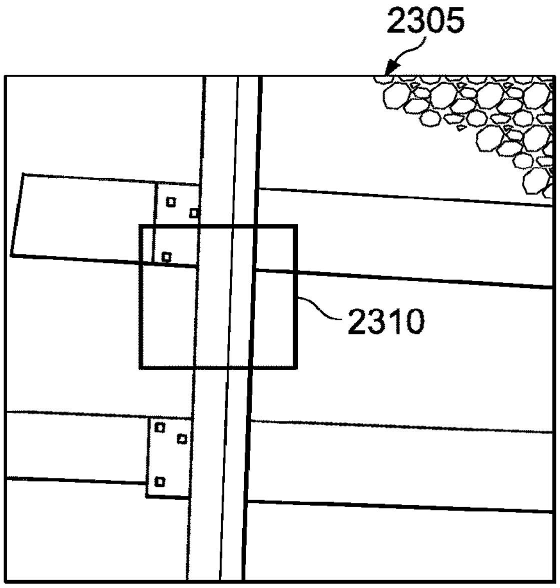
Figure 23C:
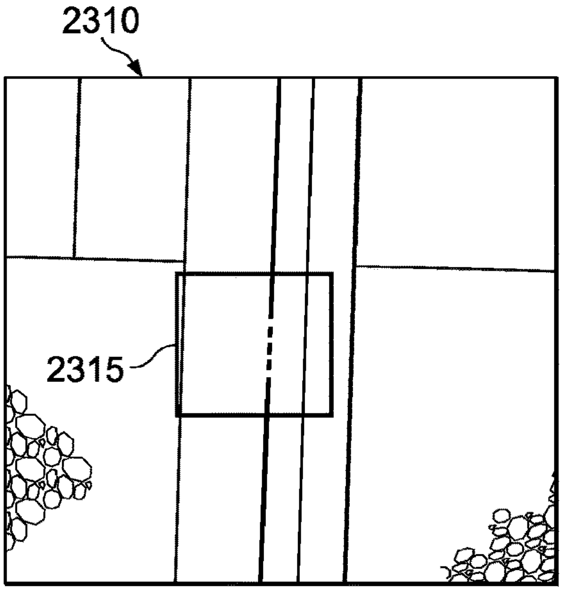
Figure 23D:
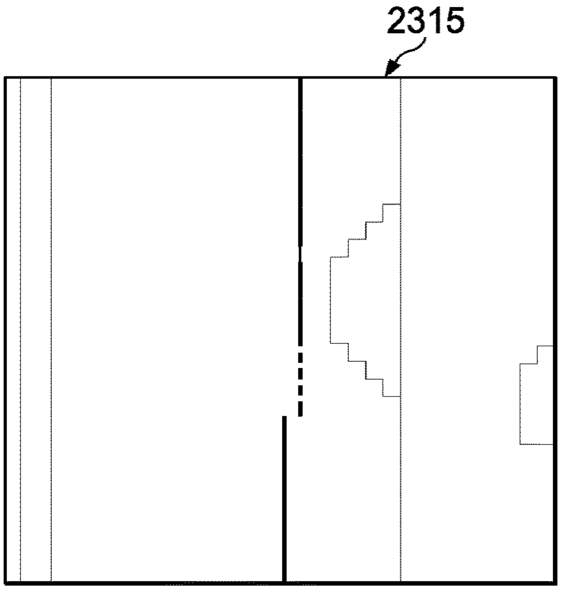

FIGS. 22A and 22B illustrate exemplary track integrity sensor images 2200, 2201 according to the various embodiments of the present disclosure. The embodiment of the track integrity sensor images 2200, 2201 shown in FIGS. 22A and 22B are for illustration only. Other embodiments of the track integrity sensor images could be used without departing from the scope of this disclosure.

In images 2200 and 2201, UAS is monitoring the rails 2205. The UAS inspects each joint 2210 for possible failures.

FIGS. 23A, 23B, 23C, and 23D illustrate an exemplary potential rail head defect 2300 according to the various embodiments of the present disclosure. The embodiment of the potential rail head defect 2300 shown in FIG. 23 is for illustration only. Other embodiments of the potential rail head defect could be used without departing from the scope of this disclosure.

Images 2300, 2305, 2310, and 2315 illustrate a UAS detecting a fault in the rail. In the first image 2300, the UAS system detects a possible fault. The UAS system zooms in on the rail to capture image 2305. The UAS system repeats the zooming for image 2315 and 2320 until a fault condition or non-fault condition is identified and confirmed. A non-fault condition is when the rail is determined to not require repair.

Figure 24:
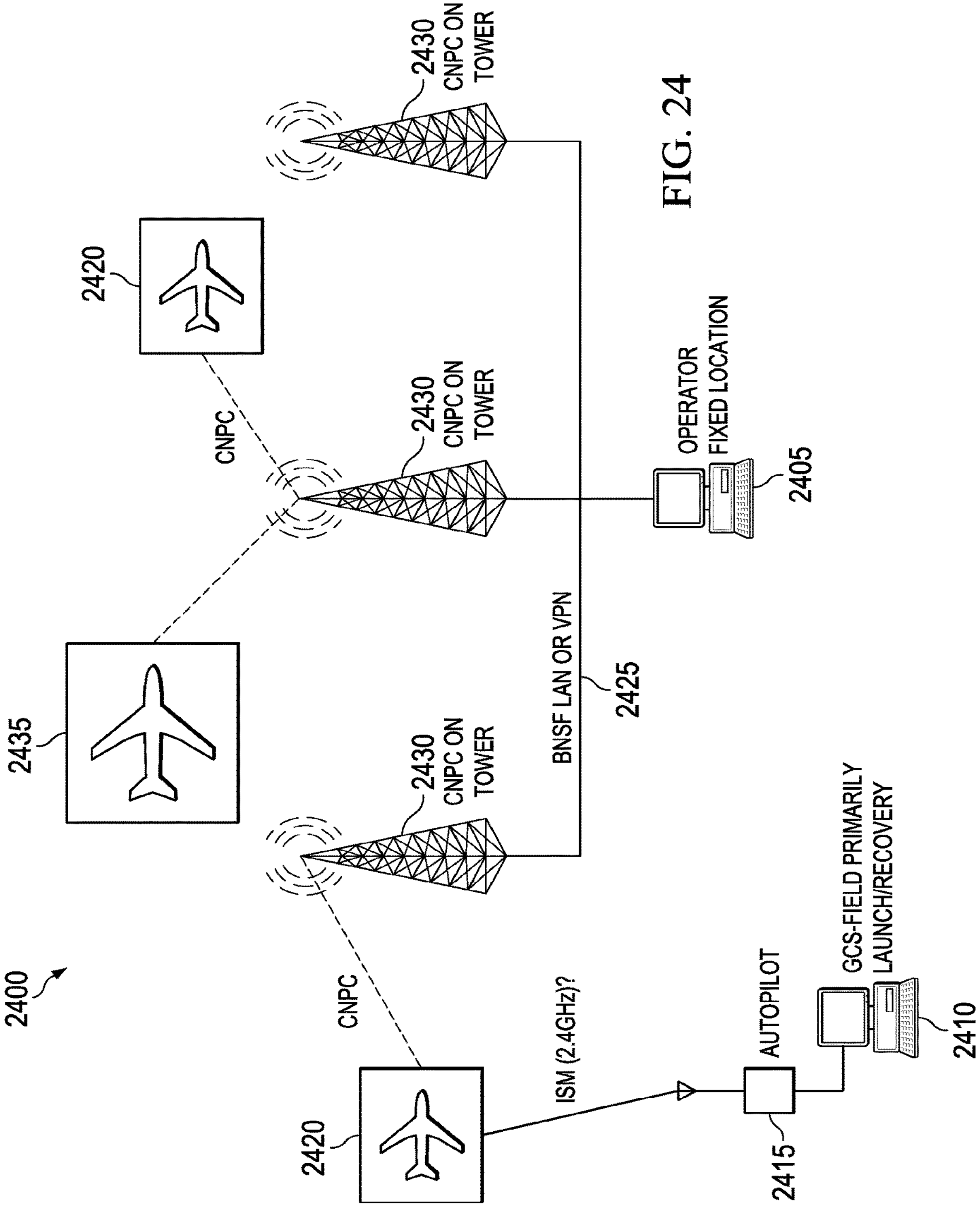
FIG. 24 illustrates an exemplary block diagram of control network according to the various embodiments of the present disclosure.

FIG. 24 illustrates an exemplary block diagram of control network 2400 according to the various embodiments of the present disclosure. The embodiment of the control network 2400 shown in FIG. 24 is for illustration only. Other embodiments of the control network could be used without departing from the scope of this disclosure.

The control network 2400 includes, but is not limited to, fixed operator location 2405, field operator location 2410, autopilot 2415, UAS 2420, wired network 2425, tower 2430, aviation band radio 2435, etc. The control network 2400 is used to monitor a rail system for faults or obstructions. The aviation band radio 2435 communicates with another aerial vehicle 2440, which could be manned or unmanned.

A fixed operator location 2405 is a command center that is permanently located. The fixed operator location 2405 can be wired or wirelessly connected to a tower 2430 for communication with the UAV.

A field operator location 2410 is a command center that is temporarily located. In other words, the field operator location 2410 can be remote from the command center and monitor the UAS in the field. The field operator location 2405 is wirelessly connected to a tower 2430 for communication with the UAS 2420. The field operator location 2410 can also communicate or control the UAS directly, without use of a tower. The field operator location 2410 can also communicate with the fixed operator location 2405

An autopilot 2415, while illustrated as located with the field operator location 2410, could also be located at the fixed operator location 2405. The autopilot 2415 is used for controlling the UAS 2420.

The UAS 2420 flies over the rail system monitoring for faults or obstructions. The UAS 2420 can also include an autopilot 2415. The UAS 2420 can communicate directly with the autopilot 2415 (if located at the field operator location 2410) or the systems of the field operator location 2410 or towers 2430.

The UAS 2420 can be programmed to remain in communication with a plurality of towers, for example, two towers at a minimum. This would mean that a transfer to a third tower would be required before dropping one of the two connected towers. The UAS 2420 (or the autopilot 2415, systems at the fixed operator location 2410 or the field operator location 2405) could determine the number of towers or which towers to connect based on a signal strength, a quality of the signal, etc.

Wired network 2425 connects the operator fixed location with the plurality of tower 2430. The towers 2430 are each individually connected to the other towers through the wired network 2425. Because the towers 2430 are connected with the wired network 2425, the field operator location 2410 can remain in communication with the UAS 2420 after the UAS has flown out of range of the wireless signal of the field operator location 2410.

Tower 2430 transmit and receive wireless signals with the UAS, the other towers 2430, and the systems of the field operator location 2410. The towers 2430 are also connected to the wired network 2425 for communication with the fixed operator location 2405 and the other towers 2430.

Figure 25:
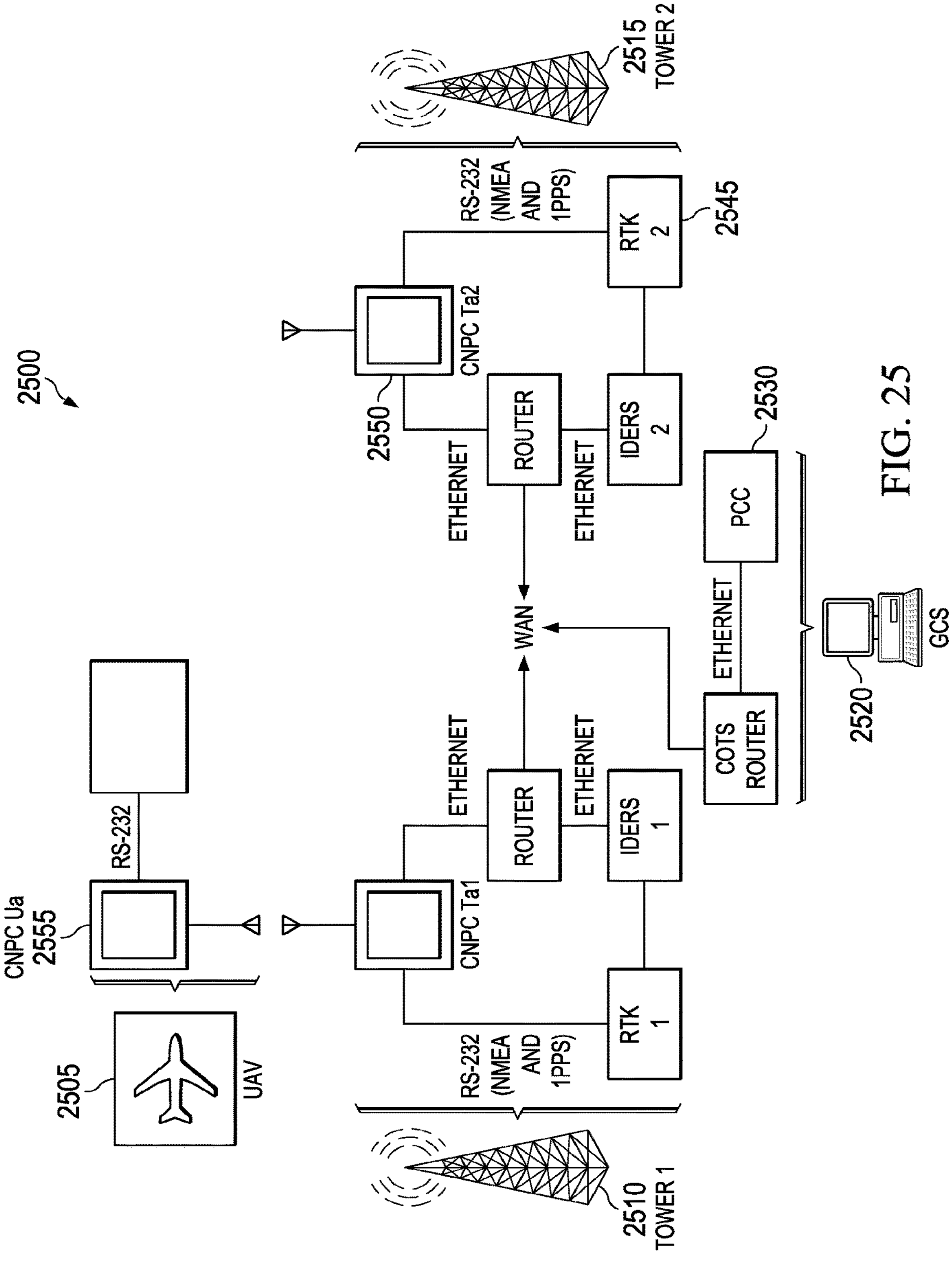
FIG. 25 illustrates an exemplary right of way/aerial system control network according to the various embodiments of the present disclosure.

FIG. 25 illustrates an exemplary right of way/aerial system control network 2500 according to the various embodiments of the present disclosure. The embodiment of the right of way/aerial system control network 2500 shown in FIG. 25 is for illustration only. Other embodiments of the right of way/aerial system control network could be used without departing from the scope of this disclosure.

The right of way/aerial system control network 2500 includes, but is not limited to, UAS 2505, a primary tower 2510, a secondary tower 2515, ground control system 2520, an autopilot 2530, an RTK 2545, a tower wireless transceiver 2550, a UAV wireless transceiver 2555, and an autopilot 2560, etc.

Long range UAS deployments have been focused on military operations in either military airspace or within the theatre of foreign combat where rules pertaining to commercial aviation are not as prevalent. Aircraft location precision, terrain avoidance, communication/command and control latency and aircraft payload considerations are radically different and in many cases not applicable to commercial, low altitude, domestic use.

In developing the ways/means to pursue long range flight operations, a solution of systems was created that had several key features:

First, control network 2500 provides the ability to ingest FAA air traffic data (where available) and merge the data with additional air traffic and obstruction data gathered from proprietary geographical information data and supplemental aviation voice/data receivers mounted on the various tower sites along the right of way.

Second, navigational assurance for both the aircraft and the various data gathering sensors—at below 500 ft. AGL, the control network 2500 assembled in FIG. 25 provides mission planners and pilots with navigational assurance that assists with terrain avoidance, navigational precision, sensor/payload focus and location precision and altitude above ground validation. The sum of the parts of RTK 2545, UAS 2505, PCC 2530, tower wireless transceiver 2550, UAV wireless transceiver 2555, ground control system 2520, primary tower 2510 and secondary tower 2515 provide this awareness for remote plots to have perspective on the aircraft's performance, the surroundings, accuracy of flight, sensor performance and adherence to FAA aviation regulations and our flight requirements. Lastly, if an emergency situation or malfunction arises, the sum of the systems will allow the pilot to safely land the plane on the right of way.

Third, in addition to the network used to transmit/receive data from tower wireless receiver 2550 and UAV wireless receiver 2555 as well as autopilot 2560 and ground control 2520, an aviation band radio 2435 is mounted near every airport within proximity to 2510 and 2515 which provides the pilot with the ability to communicate with other planes in proximity of the airport and therefore avoid low altitude interactions near rural/un-towered airports—a critical safety feature and quite unique to this deployment.

Figure 26:
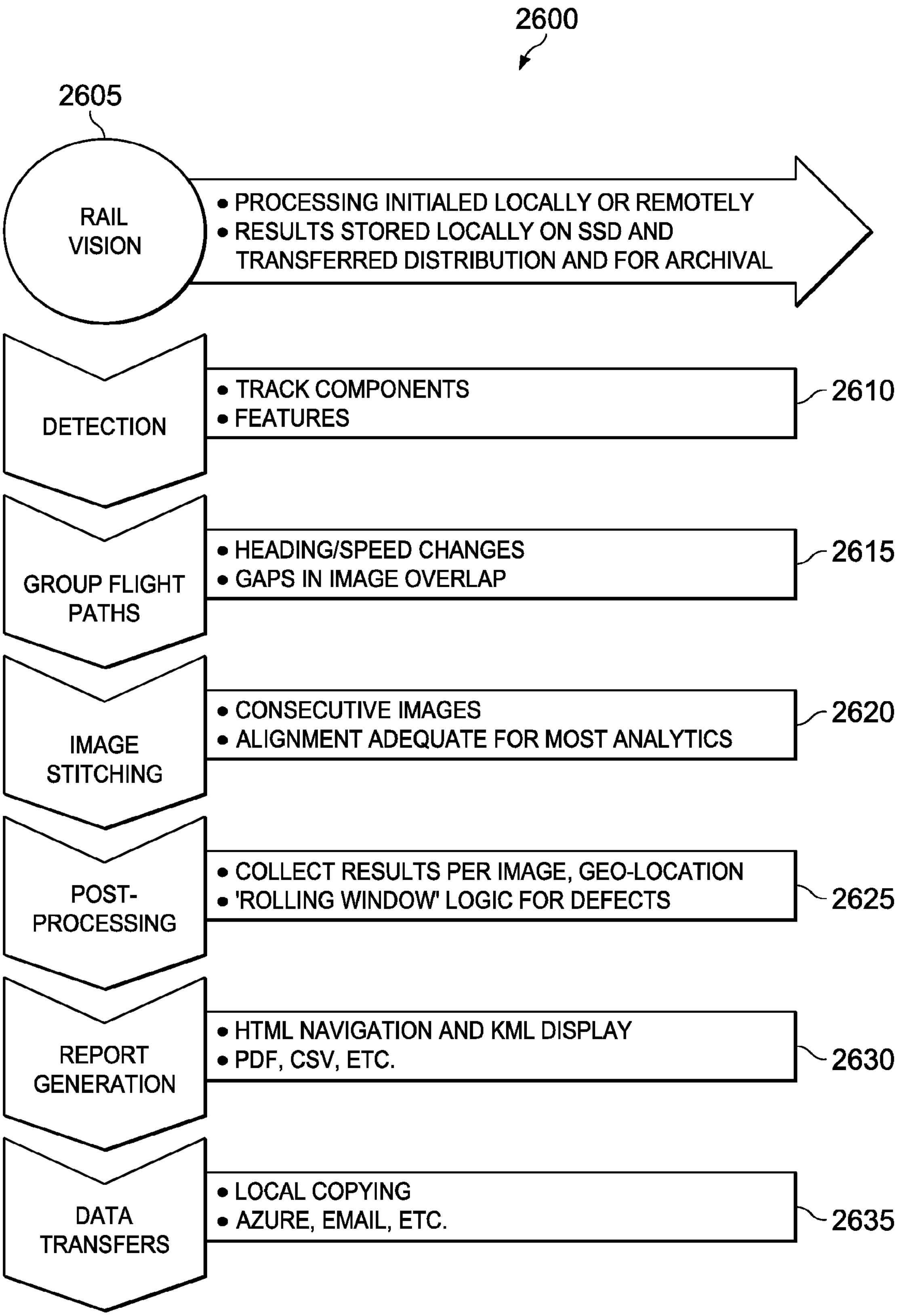
FIG. 26 illustrates an example process for inspecting railroad assets using an unmanned aerial vehicle in accordance with various embodiments of the present disclosure.

FIG. 26 illustrates an example process for inspecting railroad assets using an unmanned aerial vehicle in accordance with various embodiments of the present disclosure. For example, the process 2600 could be performed using the UAS.

In operation 2605, the system performs rail vision. The rail vision includes processing images locally or remotely for the detection of obstructions or faults in the rail system. Rail vision also includes storing the results locally and transferring the results for archiving at the command center. The system transmits, via a plurality of communication towers, a flight plan including a rail system and a flight path. The rail system can include a plurality of rails across a geographic location. The flight path is the path the UAV will travel to monitor the rail system. The flight path can include flying along tracks, around bridges, through tunnels, etc. The flight path can begin and end at a set location or different locations.

In operation 2610, the system monitors the rail system for detection of track components and other features. The system can receive, via the plurality of communication towers, data while the UAV is monitoring the rail system. The UAV can be connected to multiple towers, with a minimum amount of two towers. The communication towers can be connected to based on a signal strength, a signal quality, etc. The plurality of communication towers includes an aviation band radio configured to communicate data with other aerial vehicles.

The system can detect an interference along the flight path based on the received data. The received data can include data from other sources, such as a local airport of the FAA, other aerial vehicles, etc. The received data can be combined with operator data to decrease the change of collision or interference with the UAV or in general flight plan. The received data can includes current air traffic data, obstruction data, geographic information data, aviation voice data, weather data, etc.

In operation 2615, the system performs group flight paths. The group flight paths include changing heading or speed and adjusting to avoid gaps in image overlap.

In operation 2620, the system performs image stitching. Consecutive images are stitched together for a full understanding of the rail system. The image stitching also provide for alignment adequate for analytics.

In operation 2625, the system performs post-processing on the images. The results of the images, including geolocation, time, etc., are collected from the camera and GPS receiver. The system can detect a fault along the flight path based on the received data. A rolling window logic for defects is used. The rolling window logic is comparing consecutive or successive images for changes in pixel color, pixel density, pixel length between rails, etc. The system recognizes the pixel color and pixel density for a rail is different from the pixel color and pixel density of a rail tie, a ballast, component from the surrounding environment (e.g., rocks, dirt, mud), etc. The system also recognizes distances from common components. An example, the system recognizes the distance between rails and the distance between rail ties, etc. In operation 2630, the system performs report generation. The report generation includes HTML navigation and KML display. The report can be published in any known format, including PDF, CSV, etc.

In operation 2635, the system performs data transfer. The data is stored on a local storage in the UAS, which is removed or downloaded at one of the fixed operator location or the field operator location.

Although FIG. 26 illustrates one example of a process 2600 for inspecting railroad assets using an unmanned aerial vehicle, various changes may be made to FIG. 26. For example, although depicted herein as a series of steps, the steps of the process could overlap, occur in parallel, occur in a different order, or occur multiple times.

Certain embodiments of the present disclosure are based on a UAS capable of vertical takeoff and landing. Among other things, the UAS includes an autopilot system that interfaces with the system command and control infrastructure. The UAS also processes navigation information generated from geographic information systems, and supports various onboard sensors providing location information. In particular, these sensors are capable of transmitting and receiving information with an onboard navigation beacon (ADSB) and a mode C transponder or its equivalent.

Embodiments of the UAS have sufficient onboard electrical power generation capability to provide reliable power to all of the other various aircraft systems, such as the sensor, communications, and control subsystems. In addition, the UAS preferably has sufficient liquid fuel capacity to support flight durations in excess of 8 hours. The UAS also has the payload capability needed to support multiple sensors for gathering information and the communications and control subsystems need to pass that information in real time to a flight operations center. The UAS preferably also includes onboard information storage media for local storage of gathered information. In addition, the system includes both onboard and external subsystems for facilitating emergency maneuvering and landing of the UAS on the flight corridor.

In general, the onboard sensors take high resolution precise location photos no less than two times a second and ¼ foot or greater resolution from the operating altitude. Preferably, the sensor system also has built-in local computational capability, its own navigation system, and independent communication capability for communicating with other onboard subsystems including the autopilot. The sensors may include a photo sensor, a video camera, a thermal imager, and/or a multispectral sensor. In particular, the sensor system includes a real time day and night video camera for pilot situational awareness, which includes at least some limited real time protection capability.

The system also includes software focused on rail detection and analysis of right of way conditions, which advantageously support the inspection of linear assets, such as track, bridges, and the like. Among other things, the system software, both onboard and remote, includes machine vision software trained to understand and recognize critical conditions within an area with at least two linear borders. The system software is also capable of validating normal functional conditions on the linear area.

More specifically, the onboard software runs on the UAS in a line between the sensors and the ground based communications systems. The onboard software processes data collected by sensors, which is then loaded onto ground based computational systems that in turn output quantitative and qualitative data about what the sensors have seen. The software system processes bulk data, creates another set of geo-located data, and then creates a 3rd set of data. The system software finally creates several reports that are associated with the data of interest, creates a geo-location file that can allow the users to easily map the location of selected conditions of interest. Preferably, the bulk data remains unprocessed and the receivers receive only useable data that they truly need.

The system software also includes field information software, which could be used separately of this system or even with multiple UASs. The field information software embodies an algorithm that maps functionality and determines what order the software should perform operations, which advantageously eliminates human error. In particular, the field information software receives media generated by the sensor system, transfers those data into a laptop or other processing system, and then starts the local software. The local software automatically codes, labels and transfers the data to a drive and files and appropriately transmits those data to whoever requires them (e.g., different departments in an organization). The field information software may be used for any gathered data related to a field location. The field information software is preferably based on a networked system, including a server or set of hardware devices. In some embodiments, the field information software runs after conclusion of a flight by the UAS (i.e., performs post-flight data processing). Data may be distributed among the networked resources, which perform further analysis and ensure that the data are properly coded and stored. This helps maintain a chain of custody and minimizes data errors.

Right of way, corridors, and towers are important factors in an aerial railroad inspection system. The present system accesses the 900 MHz channels used for the Automatic Train Control System (ATCS) implemented through the AAR, although that is not a strict requirement for practicing the present principles. The hardware and software of the present system are optimized to use the low bandwidth AAR channel in a highly functional manner. For systems using the preferred AAR channels, the user normally requires a license, and redundant Ethernet controls including appropriate channels to communicate with the UAS. These can be implemented with railroad telecommunications assets.

The UAS is preferably a vertical takeoff and landing aircraft and operates (including landings) anywhere along a railroad asset network. Once the UAS is in the air, the pilot commands the autopilot to start the flight. The flight commences and the UAS flies according to a route programmed by geographical information systems to an actual railroad row and follows that row. In other words, when the pilot actuates the autopilot, the system software takes over and flies the UAS as close as possible once over track. The software system also automatically enables the sensors to start taking 2 pictures per second of the track. At the same time, the sensor and software systems control the pitch, yaw, and roll of UAS such that the appropriate sensor or sensors remain focused and placed over the track to ensure the required resolution and overlapping imagery. If analytics software determines after the flight that there was not enough overlap, or if sections of track were missed due to right of way occupancy, then the route is quickly re-flown and the sensor takes more images.

While the autopilot is on and the sensor are taking photos, the UAS control system is leveraging space-based GPS, and where available, ground based GPS error correction, to keep the UAS positioned over the row and maintain operating altitude and linear flight path compliance, which both guarantees sensor resolution and compliance with regulatory requirements regarding heights and width of flight path.

Again, preferably the UAS and sensor have independent navigation systems. Advantageously, when both the UAS and sensor(s) have independent navigational systems, computational power is preserved for critical items tasked to each component. For example, the sensor system may include sensor stabilization software and hardware.

Preferably, the UAS broadcasts its location, speed, altitude and heading via the existing FAA surveillance network (SBS) and also to other aircrafts equipped to receive these signals. In addition, the railroad's infrastructure may support supplementing the FAA SBS system using supplemental ADSB/transponder receivers, radar and other elements along the right of way. While the UAS is in flight, its operating condition, location and overall health are transmitted to the pilot via the command and control link. During all phases of the flight, the UAS has access to multiple command and control transceiver locations assuring a level of redundancy of command and control.

If the UAS loses connection to the command and control system, after a period of time as determined by the operator and/or FAA rules, the UAS can initiate its "lost link profile" and auto descend and set itself down along the railroad row. The pilot can be aware of lost link condition and based on the last transmission form the UAS would notify users on the row and dispatchers of the aircraft eminent landing. The sensors secondary communications and navigation systems may also assist with locating the UAS.

If during flight there are other critical systems failures, the UAS either automatically initiates one of several pre-determined flight termination procedures returns to its launching location or other location of safety as programmed. During the course of flight, the pilot has the option of utilizing a second sensor for real time imagery of the row. This secondary sensor can also be used for some condition analysis, but is primarily for pilot awareness. If during the course of flight a critical condition is identified, the UAS's sensor can utilize a secondary communications channel not connected to the primary to send immediate notification to the pilots.

At the end of a specified mission, the pilot engages the landing procedures, the UAS leverages all of the aforementioned systems to arrive at the landing site, and engages the landing procedures for vertical landing. The landing procedure includes the enablement of an air to ground laser providing the UAS with precision landing information. In final stages of fight before landing, the pilot uses the UAS command and control system to assure a safe landing. The UAS has multiple support systems on board to assure a safe landing. If anything is present on the ground or area of landing that would preclude a safe landing, the landing abort procedure is initiated and alternate landing site is identified. After a safe landing, the pilot removes the sensor data storage drives and plugs them into a server. The UAS then commences an automated process of analytics and data delivery that results in delivery of customized reports and actionable data sets.

Although the invention has been described with reference to specific embodiments, these descriptions are not meant to be construed in a limiting sense. Various modifications of the disclosed embodiments, as well as alternative embodiments of the disclosure, can become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

It is therefore contemplated that the claims can cover any such modifications or embodiments that fall within the true scope of the disclosure.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods can be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An unmanned aerial vehicle (UAV) for inspecting a railroad track, the UAV comprising:
- a camera; and
- a computer configured to perform a plurality of operations locally on the UAV, the plurality of operations comprising:
  - commanding the UAV to fly a route according to a flight plan;
  - automatically capturing, using the camera, a plurality of images of the railroad track;
  - maneuvering the UAV to obtain a level of overlap between at least two images of the plurality of the images;
  - stitching the plurality of images to identify at least one potential fault condition of the railroad track; and
  - zooming the camera into an area of the railroad track that includes the identified at least one potential fault condition until a confirmed faulty condition or a confirmed non-fault condition is determined, wherein the zooming is stopped once the identified at least one potential fault condition is confirmed as a faulty condition or as a non-fault condition.

2. The UAV of claim 1, wherein maneuvering the UAV obtain the level of overlap between at least two images of the plurality of images captured by the camera comprises controlling a pitch, a yaw, and a roll of the UAV.

3. The UAV of claim 1, wherein maneuvering the UAV obtain the level of overlap between at least two images of the plurality of images captured by the camera comprises utilizing ground-based GPS error correction.

4. The UAV of claim 1, wherein the plurality of operations performed locally on the UAV further comprise:
- controlling movements of the UAV as the UAV flies the route to ensure that a required resolution of the plurality of images captured by the camera is obtained.

5. The UAV of claim 1, wherein the plurality of operations performed locally on the UAV further comprise:
- analyzing the plurality of images in order to determine whether the level of overlap between at least two images of the plurality of images captured by the camera was obtained.

6. The UAV of claim 1, the operations further comprising determining that the level of overlap between the at least two images of the plurality of images was not obtained, wherein in response to determining that the level of overlap between the at least two images of the plurality of images captured by the camera was not obtained:
- commanding the UAV to re-fly at least part of the route; and
- automatically capturing, using the camera, a plurality of additional images of the railroad track as the UAV re-flies the route.

7. The UAV of claim 1, wherein analyzing the plurality of images in order to identify one or more faulty conditions of the railroad track further comprises comparing successive images for changes in a pixel color, a pixel density, or a pixel length between rails of the railroad track.

8. The UAV of claim 1, wherein the plurality of operations performed locally on the UAV further comprise controlling movements of the UAV as the UAV flies the route in order to meet regulatory requirements regarding a height and a width of the route.

9. The UAV of claim 1, wherein the image stitching provides for alignment adequate for analytics.

10. The UAV of claim 1, wherein the UAV includes both onboard subsystems and receives information from external subsystems for facilitating emergency maneuvering and landing on a flight corridor.

11. A method of inspecting a railroad track using an unmanned aerial vehicle (UAV), comprising:

commanding a UAV to fly a route according to a flight plan;

automatically capturing, using a camera, a plurality of images of a railroad track;

maneuvering the UAV to obtain a level of overlap between at least two images of the plurality of images;

stitching the plurality of images to identify at least one potential fault condition of the railroad track; and zooming the camera into an area of the railroad track that includes the identified at least one potential fault condition until a confirmed faulty condition or a confirmed non-fault condition is determined, wherein the zooming is stopped once the identified at least one potential fault condition is confirmed as a faulty condition or as a non-fault condition.

12. The method of claim 11, wherein maneuvering the UAV obtain the level of overlap between at least two images of the plurality of images captured by the camera comprises controlling a pitch, a yaw, and a roll of the UAV.

13. The method of claim 11, wherein maneuvering the UAV obtain the level of overlap between at least two images of the plurality of images captured by the camera comprises utilizing ground-based GPS error correction.

14. The method of claim 11, wherein the plurality of operations performed locally on the UAV further comprise:

controlling movements of the UAV as the UAV flies the route to ensure that a required resolution of the plurality of images captured by the camera is obtained.

15. The method of claim 11, wherein the plurality of operations performed locally on the UAV further comprise:

analyzing the plurality of images in order to determine whether the level of overlap between at least two images of the plurality of images captured by the camera was obtained.

16. The method of claim 11, further comprising determining that the level of overlap between the at least two images of the plurality of images was not obtained, wherein in response to determining that the level of overlap between the at least two images of the plurality of images captured by the camera was not obtained:

commanding the UAV to re-fly at least part of the route; and automatically capturing, using the camera, a plurality of additional images of the railroad track as the UAV re-flies the route.

17. The method of claim 11, wherein analyzing the plurality of images in order to identify one or more faulty conditions of the railroad track further comprises comparing successive images for changes in a pixel color, a pixel density, or a pixel length between rails of the railroad track.

18. The method of claim 11, wherein the plurality of operations performed locally on the UAV further comprise controlling movements of the UAV as the UAV flies the route in order to meet regulatory requirements regarding a height and a width of the route.

* * * * *